US011190949B2

(12) United States Patent
Sevindik et al.

(10) Patent No.: US 11,190,949 B2
(45) Date of Patent: Nov. 30, 2021

(54) METHODS AND APPARATUS FOR MONITORING CONTESTED SPECTRUM AND/OR RESPONDING TO THE DETECTION OF AN INCUMBENT USER

(71) Applicant: Charter Communications Operating, LLC, St. Louis, MO (US)

(72) Inventors: Volkan Sevindik, Parker, CO (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/693,221

(22) Filed: Nov. 22, 2019

(65) Prior Publication Data

US 2021/0160698 A1    May 27, 2021

(51) Int. Cl.
*H04W 24/10* (2009.01)
*H04W 16/14* (2009.01)
*H04W 28/16* (2009.01)

(52) U.S. Cl.
CPC ........... *H04W 16/14* (2013.01); *H04W 24/10* (2013.01); *H04W 28/16* (2013.01)

(58) Field of Classification Search
CPC ..... H04W 16/14; H04W 24/00; H04W 24/04; H04W 24/10; H04W 52/00
See application file for complete search history.

(56) References Cited

U.S. PATENT DOCUMENTS

| 2006/0013285 | A1* | 1/2006 | Kobayashi | H04B 1/7143 375/132 |
| 2007/0243823 | A1* | 10/2007 | Oodachi | H04B 7/15535 455/20 |
| 2010/0173663 | A1* | 7/2010 | Umeda | H04L 1/0002 455/522 |
| 2014/0021940 | A1* | 1/2014 | Hong | G01R 21/06 324/142 |
| 2016/0119934 | A1* | 4/2016 | Uchino | H04L 1/0027 455/452.1 |
| 2017/0269044 | A1* | 9/2017 | Diekmann | G01N 33/0011 |
| 2019/0394678 | A1* | 12/2019 | Syed | H04L 5/0035 |

* cited by examiner

*Primary Examiner* — Jinsong Hu
*Assistant Examiner* — Farideh Madani
(74) *Attorney, Agent, or Firm* — Straub & Straub; Michael P. Straub; Stephen T. Straub

(57) ABSTRACT

A base station, e.g., a CBSD, selects or more user equipment (UE) devices, e.g., cell phones, to operate in monitoring mode. In monitoring mode the UE device, in addition to its normal communications with the base station, performs received power measurements in a frequency band, e.g., a CBRS band. The UE reports to the base station information indicating a UE determined measured power level attributed to incumbent user or measurement information used to derive a power level attributed to incumbent user. One or more base stations report received power measurement values attributed to incumbent user to a system management device, e.g., a SAS. The system management device processes the received information, e.g. combining information, and comparing a result to a threshold level. If the result exceeds the threshold the system management device sends a command to one or more base station to shut down DL traffic in the CBRS band.

19 Claims, 30 Drawing Sheets

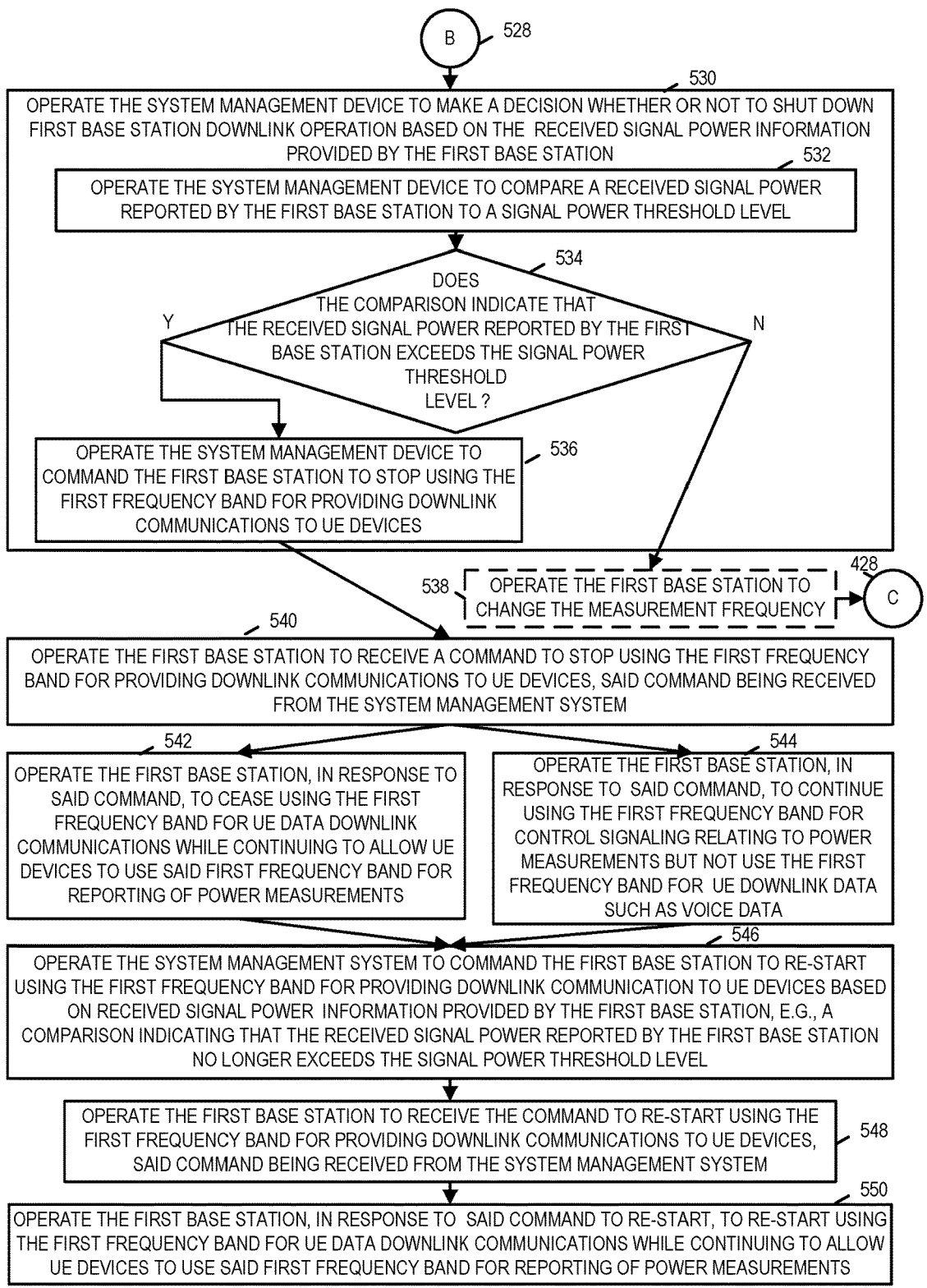

| FIGURE 6A |
| FIGURE 6B |
| FIGURE 6C |

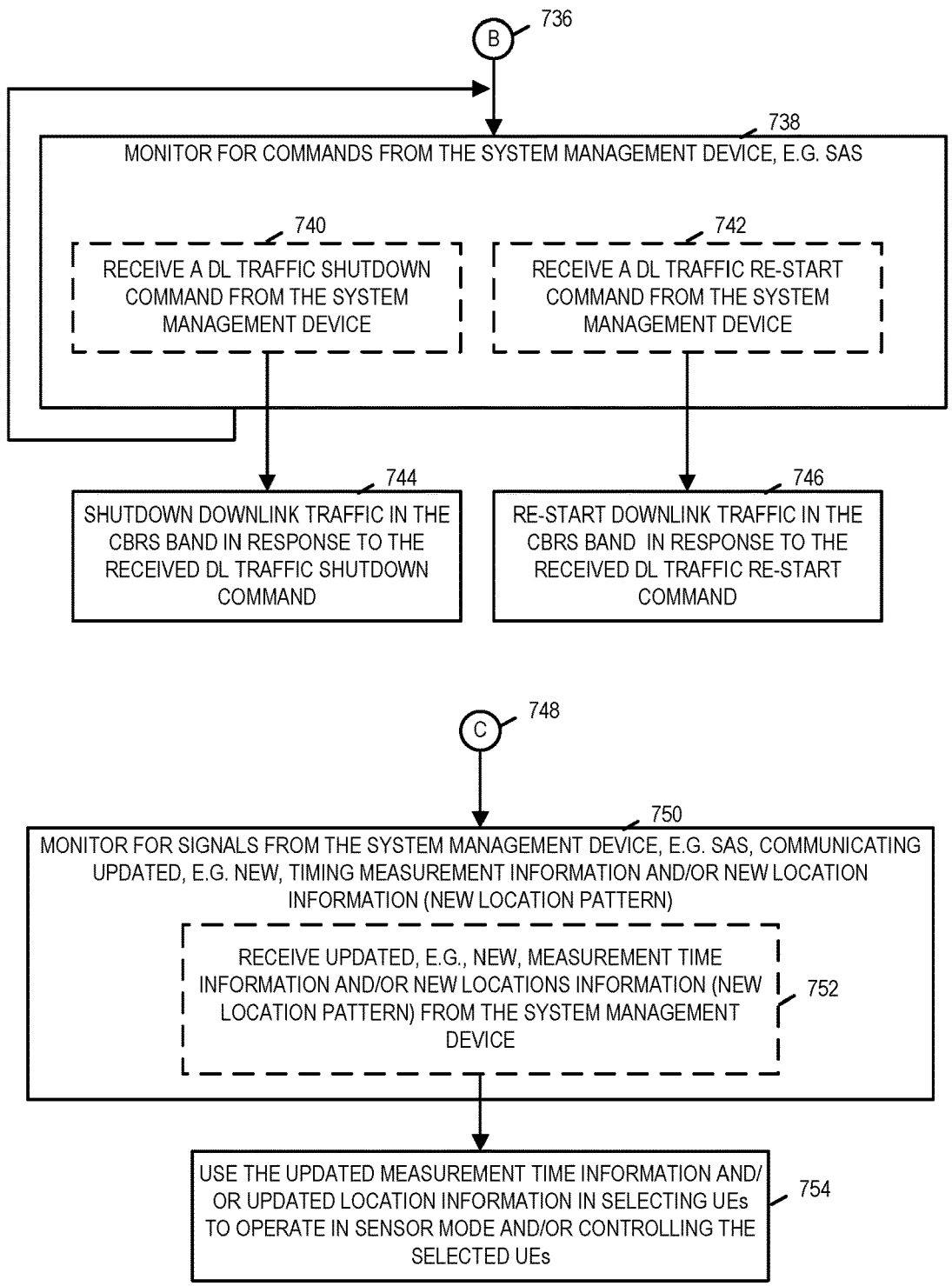

| FIGURE 13A | FIGURE 13B | FIGURE 13C | FIGURE 13D | FIGURE 13E |

| FIGURE14A | FIGURE 14B | FIGURE 14C | FIGURE 14D |

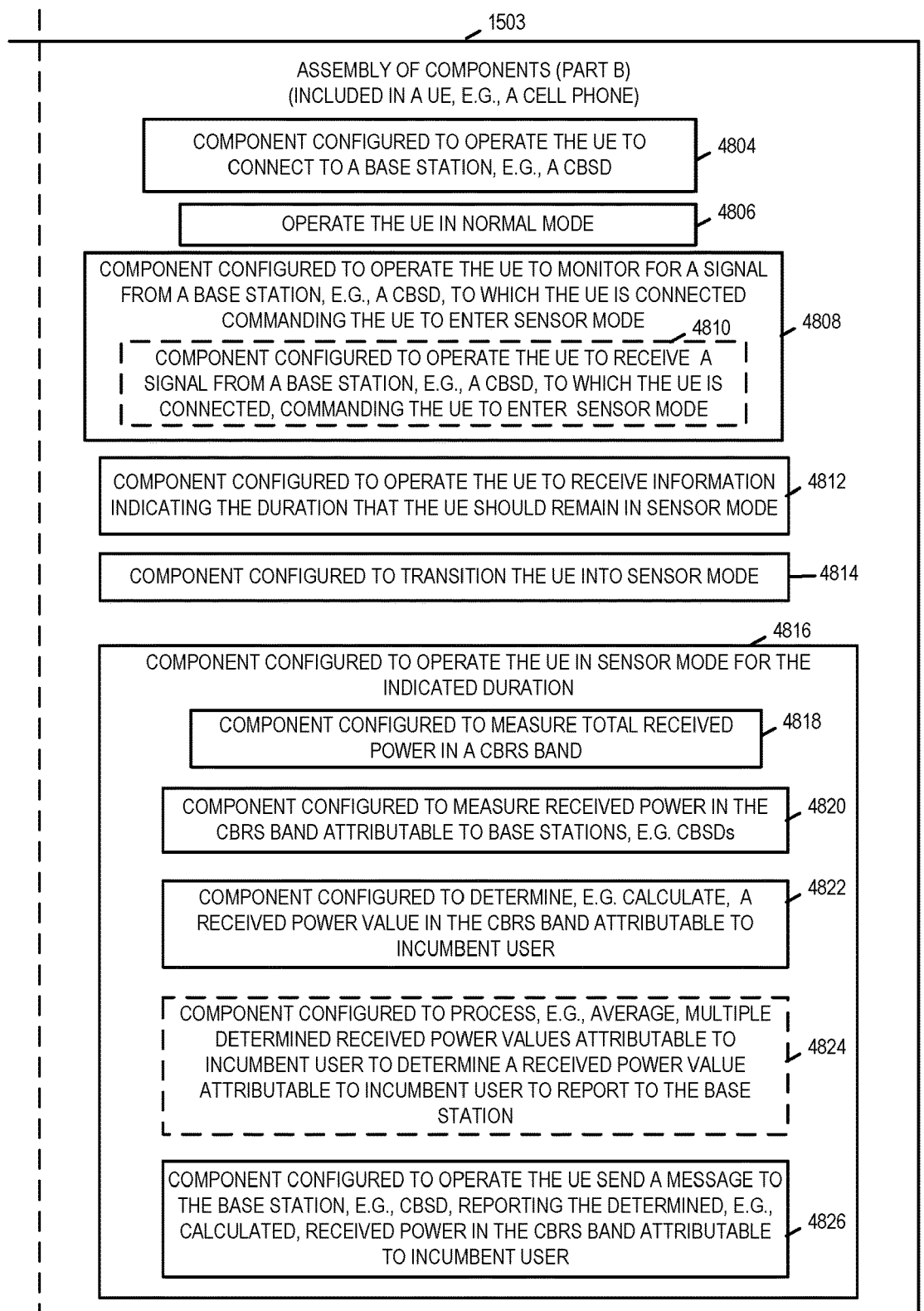

METHODS AND APPARATUS FOR MONITORING CONTESTED SPECTRUM AND/OR RESPONDING TO THE DETECTION OF AN INCUMBENT USER

FIELD OF INVENTION

The present invention relates to methods and apparatus for monitoring contested spectrum in a communications system, and more particularly, to method and apparatus for determining the current availability of a CBRS communications band, based on reported measurements indicative of received power attributed to incumbent user.

BACKGROUND

In a Citizens Broadband Radio Service (CBRS) network, Citizens Broadband Radio Service Devices (CBSDs) serve as access points which can support communications between a user equipment device (UE) and a service provider network.

A CBRS network often includes one or more Citizens Broadband Radio Service Devices (CBSDs) with relatively small coverage areas as compared to a macro base station or access point. In a CBRS network, interference is managed through power management of CBSD devices by a management device in the network referred to as a Spectrum Access System (SAS).

Currently, in the United Statues, Citizens Broadband Radio Service networks utilize 150 megahertz in the 3550-3700 MHz band referred to as the 3.5 GHz Band.

The spectrum corresponding to some CBRS bands is part of spectrum which is allocated to incumbent users, e.g., military users such as ships operating on the oceans. In many cases incumbent users have priority to the spectrum over CBRS system devices, e.g., CBSDs. The CBRS system devices may use the spectrum when the incumbent users are not making use of the spectrum but must yield the spectrum when the incumbent users are in the area.

On approach to determining if contended spectrum is currently available for CBRS system users is to install many expensive high accuracy large fixed monitoring stations, which can accurately detect the presence of incumbent users along a coastline and report monitoring results to one or more SASs. However, this approach requires installation of the fixed monitoring stations and corresponding networking infrastructure (which involves land access rights and construction costs), as well at continual maintenance for these stations. Also, an individual fixed site monitoring station may be expected to occasionally go down causing gaps in the monitoring coverage unless there is redundancy built into the infrastructure which requires additional cost.

Based on the above, there is a need for new methods and apparatus for detecting, reporting and responding to incumbent user activity in CBRS communications bands.

SUMMARY

Various embodiments relate to a first base station, e.g., a first CBSD, selecting for monitoring mode operation some, but not necessarily all, UEs attached to the first base station, each selected UE is used as a measurement device. The first base station, e.g., a first CBSD, selects a subset of UEs which are at different locations. UE selection for monitoring mode operation is based on one, more or all of: 1) UE location, 2) battery power available at a UE, and 3) whether the UE is in an active or inactive state at the time selection of UEs for use as monitoring devices is made by the first base station, e.g., first CBSD. The UEs report a received power that is based on the measured total received energy in the signal band used by the first base station, e.g. first CBSD. The reported value in some cases is reduced by the detected signal energy that the UE detects as corresponding to base stations, e.g. CBSDs (e.g., measured pilot signal energy which can be attributed to base stations, e.g. CBSDs, based on the signal) thereby providing a better indication in such embodiments of power due to incumbent devices having priority to use the first frequency band than if a total signal energy including received base station, e.g. CBSD, signal power was reported. The first base station, e.g. first CBSD, generates a received signal energy to be reported to a system management device, e.g., a SAS, e.g., based on multiple received signal energy reports. The received signal energy reported to the system management device, e.g. a SAS, may be, and sometimes is, an average received power level. The system management device, e.g., a SAS, determines whether or not the first base station, e.g. first CBSD, can continue to use the first frequency band to support UE communications by comparing the received signal energy to a threshold. If the reported received signal energy reported by the first base station, e.g. a first CBSD, exceeds the signal energy threshold the first base station, e.g. first CBSD, is commanded to stop using the first frequency band in which the energy exceeding the threshold was detected. The first base station, e.g. the first CBSD, and UE continue to use the first frequency band for purposes relating to the reporting of signal energy measurements, e.g., the first base station, e.g. the first CBSD, may, and sometimes does, command UEs to perform received signal energy measurements and report the results to the first base station, e.g. the first CBSD, in the first frequency band. The rate at which the UEs are commanded to perform and report signal energy measurements varies in some embodiments based on whether the first base station, e.g. the first CBSD, is operating in a restricted mode of operation in which UE downlink data communications are not supported in the first frequency band or a mode of operation in which UEs are allowed to use the first frequency band for uplink and downlink communications.

An exemplary method, in accordance with some embodiments, comprises: selecting, at a first base station (e.g., a first CBSD) that uses a first frequency band for communication (e.g., 3.5 GHz band used for CBSD communication), one or more user equipment (UE) devices (e.g., cell phones) to operate as power measurement devices, said one or more UE devices including a first UE device (e.g. a first cell phone); receiving, at the first base station, first received power measurement information from the UE device, said first received power measurement information being based on a total received power in the first frequency band measured by the first UE device; and communicating to a system management device (e.g., a SAS), received signal power information, said received signal power information being based on at least said first received power measurement information.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 5C is a third part of a flowchart of an exemplary method of operating a communications system, e.g., a communications system including a plurality of base stations, e.g. CBSDs, a plurality of user equipment (UE) devices, e.g., cell phones, which may, and sometimes do operate as monitoring devices for measuring and reporting incumbent user signal information corresponding to a CBRS band, and a system management device, e.g., a SAS, in accordance with an exemplary embodiment.

FIG. 5 comprises the combination of FIG. 5A, FIG. 5B and FIG. 5C.

FIG. 7C is a third part of a flowchart of an exemplary method of operating a base station, e.g., a CBSD, in accordance with an exemplary embodiment.

FIG. 7 comprises the combination of FIG. 7A, FIG. 7B and FIG. 7C.

FIG. 15B is a drawing of a second part of an exemplary assembly of components which may be included in an exemplary user equipment (UE) device, e.g., a cell phone, in accordance with an exemplary embodiment.

FIG. 15 comprises the combination of FIG. 15A and FIG. 15B.

DETAILED DESCRIPTION

Figure 1:
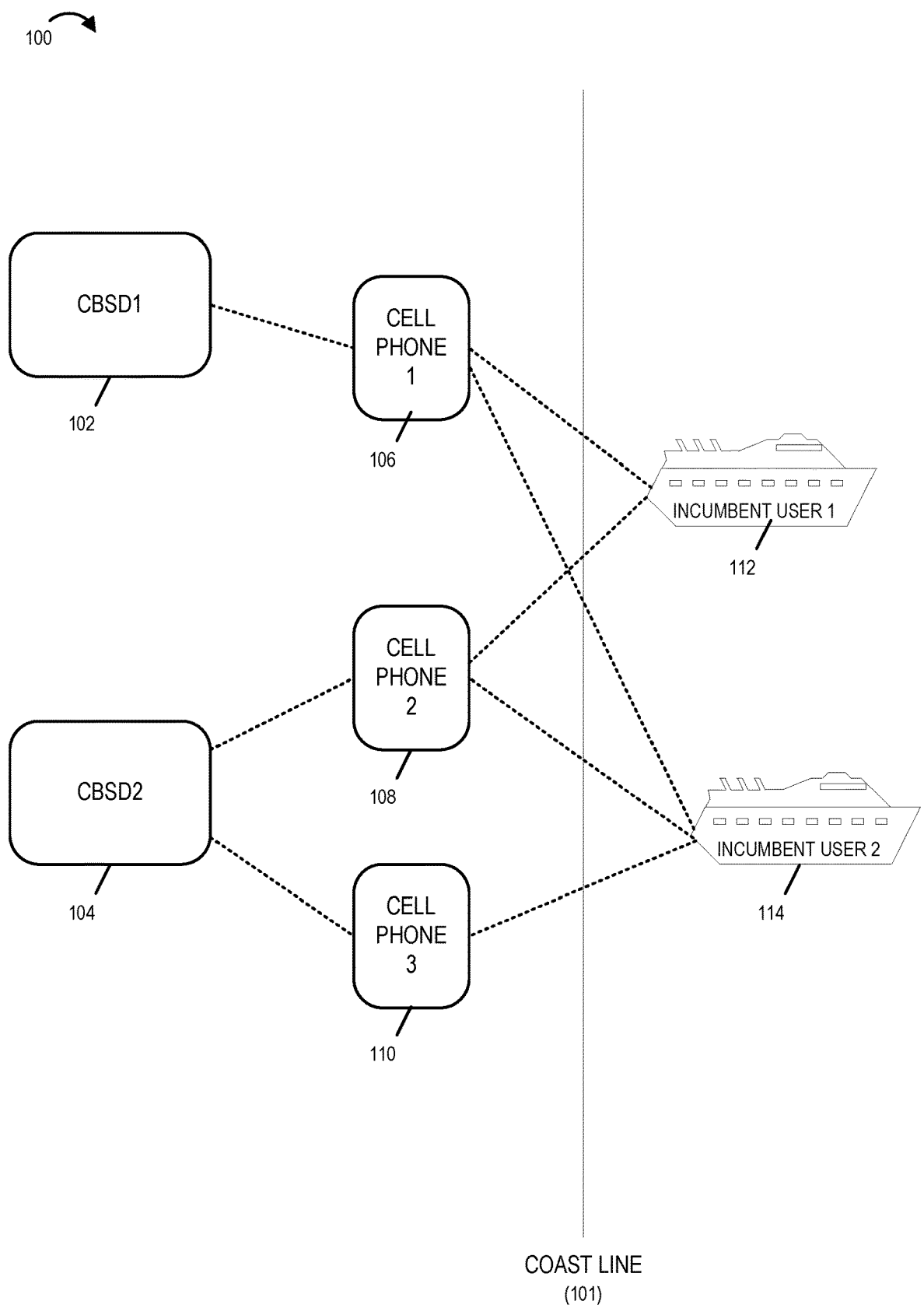
FIG. 1 is a drawing illustrating a plurality of CBSDs located along a coast line which are using cell phones as monitoring devices to detect the presence of incumbent users in accordance with an exemplary embodiment.

FIG. 1 is a drawing 100 illustrating a plurality of CBSDs (CBSD1 102, CBSD2 104) located along a coast line 101 which are using cell phones (cell phone 1 106, cell phone 2 108, cell phone 3 110) as monitoring devices to detect the presence of incumbent users. Incumbent users 112 and 114 are in the vicinity of coastline 101. CBSD 1 102 has selected to use cell phone 1 106, as a measurement device, and has commanded cell phone 1 106 to be in a sensor mode of operation. CBSD 2 104 has selected to use cell phone 2 108 and cell phone 3 110, measurement devices, and has commanded cell phone 2 108 and cell phone 3 110 to be in a sensor mode of operation. Each cell phone (106, 108, 110) serving as a monitoring device measures the total power of received signals in a CBSD frequency band, subtracts power attributed to CBSD base stations, e.g., based on known pilot signals which are detected, and reports received signal power attributed to incumbent users to the CBSD to which it is attached. Cell phone 1 106 reports received power attributed to incumbent users to CBSD 1 102. Cell phone 2 108 reports received power attributed to incumbent users to CBSD 2 104. Cell phone 3 110 reports received power attributed to incumbent users to CBSD 2 104. Each CBSD (102, 104) processes the reported power level information received from its cell phone operating in sensor mode, and determines a incumbent power level report to communicate to a system management device, e.g. a SAS. The SAS processes the received reported, e.g., comparing reported incumbent power levels to a threshold and makes a determination as to whether or not one more CBSDs along the coast line should be turned off, e.g. with regard to downlink data transmissions to the UEs.

Figure 2:
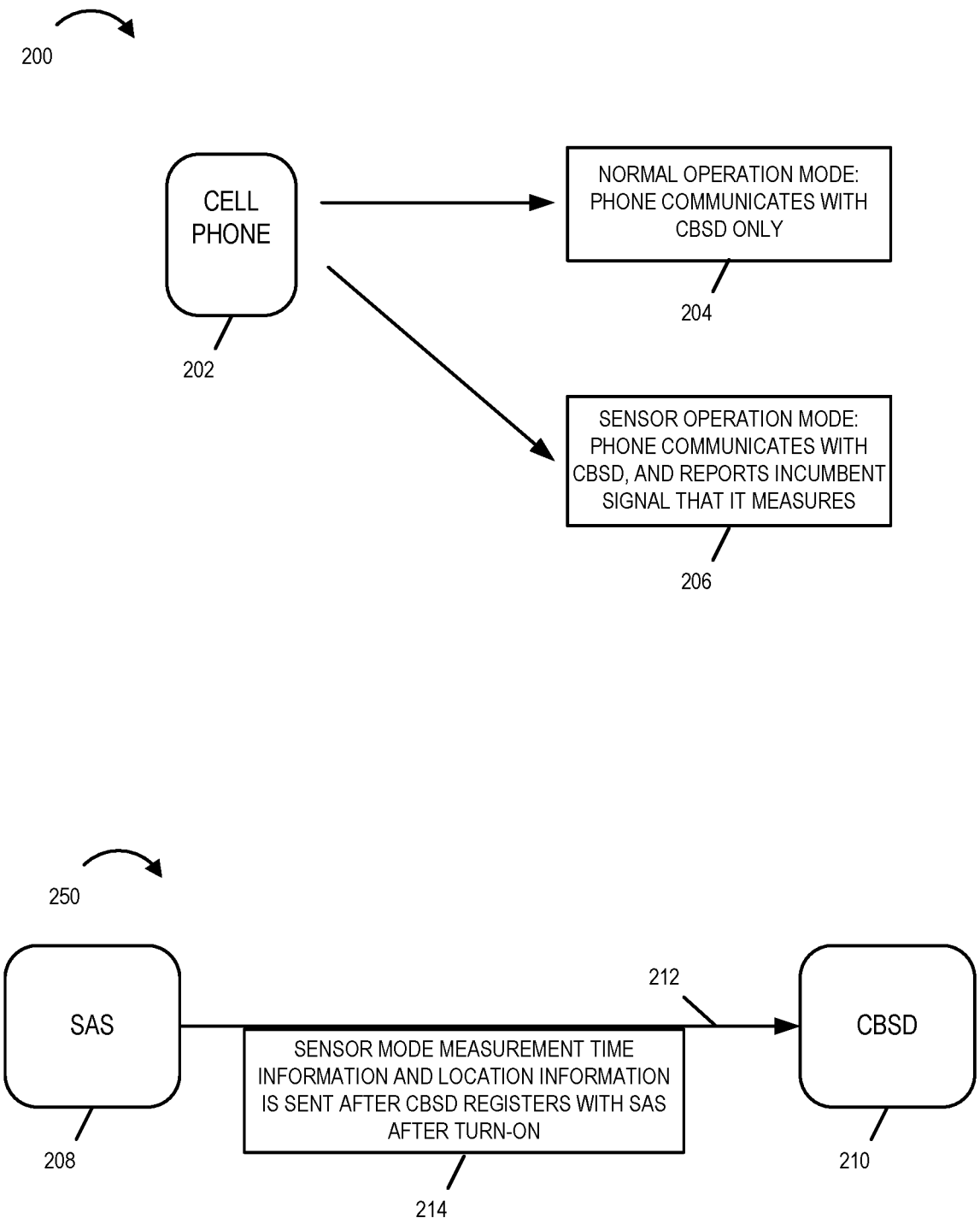
FIG. 2 illustrates two exemplary modes for exemplary cell phones, implemented in accordance with an exemplary embodiment, said two modes including: i) a normal mode of operation and ii) a sensor operation mode of operation and further illustrates an exemplary SAS communicating control information signals to an exemplary CBSD, said signals including time information and location information (location pattern) to be used by the CBSD to select UEs for sensor mode and to control operations related to a signal measurement and reporting of power/energy attributable to incumbent users in a CBRS band.

Drawing 200 of FIG. 2 illustrates two exemplary modes for exemplary cell phone 202 including i) a normal mode of operation 204 in which the phone communicates with a CBSD only and does not perform sensor monitoring operations used to detect incumbent users and ii) a sensor operation mode in which the phone communicates with the CBSD and further reports incumbent signal information, e.g., received power or received energy attributed to incumbent users, e.g., based on received signal s that the UE measures in a CBRS band. Drawing 250 of FIG. 2 illustrates an exemplary SAS 208 communicating, after registration, signals 212 to exemplary CBSD 210 including sensor mode measurement time information and location information 214 to be used by the CBSD 210 to search for incumbent users. Measurement time and location pattern is determined by SAS 250 and is sent to CBSDs including CBSD 210. If incumbent user signal is determined accurately by SAS 208, same measurement time and location pattern is kept the same; if incumbent user signal is not determined accurately by SAS 208; then measurement time and location pattern is changed by SAS 208 and is sent to each of the CBSDs including CBSD 210 as new measurement time and location pattern.

Figure 3:
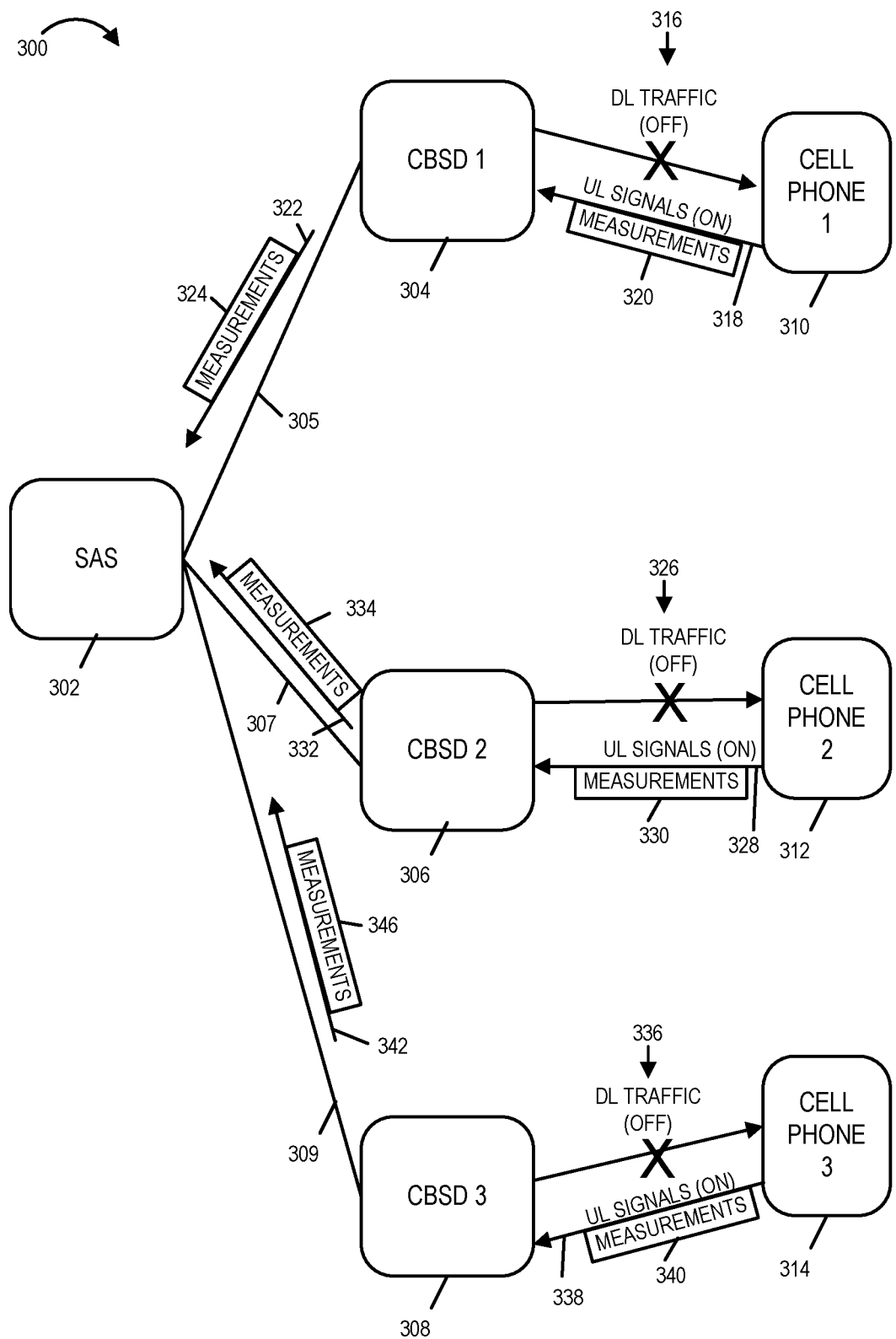
FIG. 3 is a drawing illustrating an exemplary SAS, a plurality of CBSDs, which have been commanded to shutdown DL traffic signaling, and a plurality of cell phones, operating in sensor mode, and further illustrating that the measuring and reporting of received power/energy level attributable to incumbent user is continuing, in accordance with an exemplary embodiment.

FIG. 3 is a drawing 300 illustrating an exemplary SAS 302 coupled to a plurality of CBSDs (CBSD 1 304, CBSD 2 306, CBSD 3 306) via communications links (305, 307, 309), respectively. Each of the CBSDs(CBSD 1 304, CBSD 2 306, CBSD 3 306) has commanded a cell phone (cell phone 1 310, cell phone 2 312, cell phone 3 314), respectively, to be in sensor mode of operation. Based on received power measurements attributed to incumbent users in the CBSD band, the SAS 302 has sent a DL traffic shutdown command to the CBSDs (304, 306, 308), and in response, the CBSD (304, 306, 308) have turned-off downlink traffic as indicated by Xs 316, 326, and 336 on downlink signal arrows. However, the cell phones (310, 312, 314) continue to monitor and measure received power levels in the CBSD band attributed to incumbent users, and continue reporting. Cell phones (cell phone 1 310, cell phone 2 312, cell phone 3 314) generate and sends uplink signals (320, 329, 340) to CBSDs (304, 306, 308), respectively. The uplink signals (318, 328, 330) include measurement information (320, 330, 340), e.g., measured power level attributed to incumbent users. The CBSDs (304, 306, 308) generate and send incumbent user power level measurement reports (324, 334, 342) to the SAS 302, which processes the received information. The SAS 302 determines based on the received reports (324, 334, 342) if one or more or all of the CBSDs (304, 306, 308) should be re-started with regard to DL traffic signaling. For example, the SAS restarts a CBSD in response to a reported power level attributed to incumbent user being below a predetermined threshold.

Figure 4A:
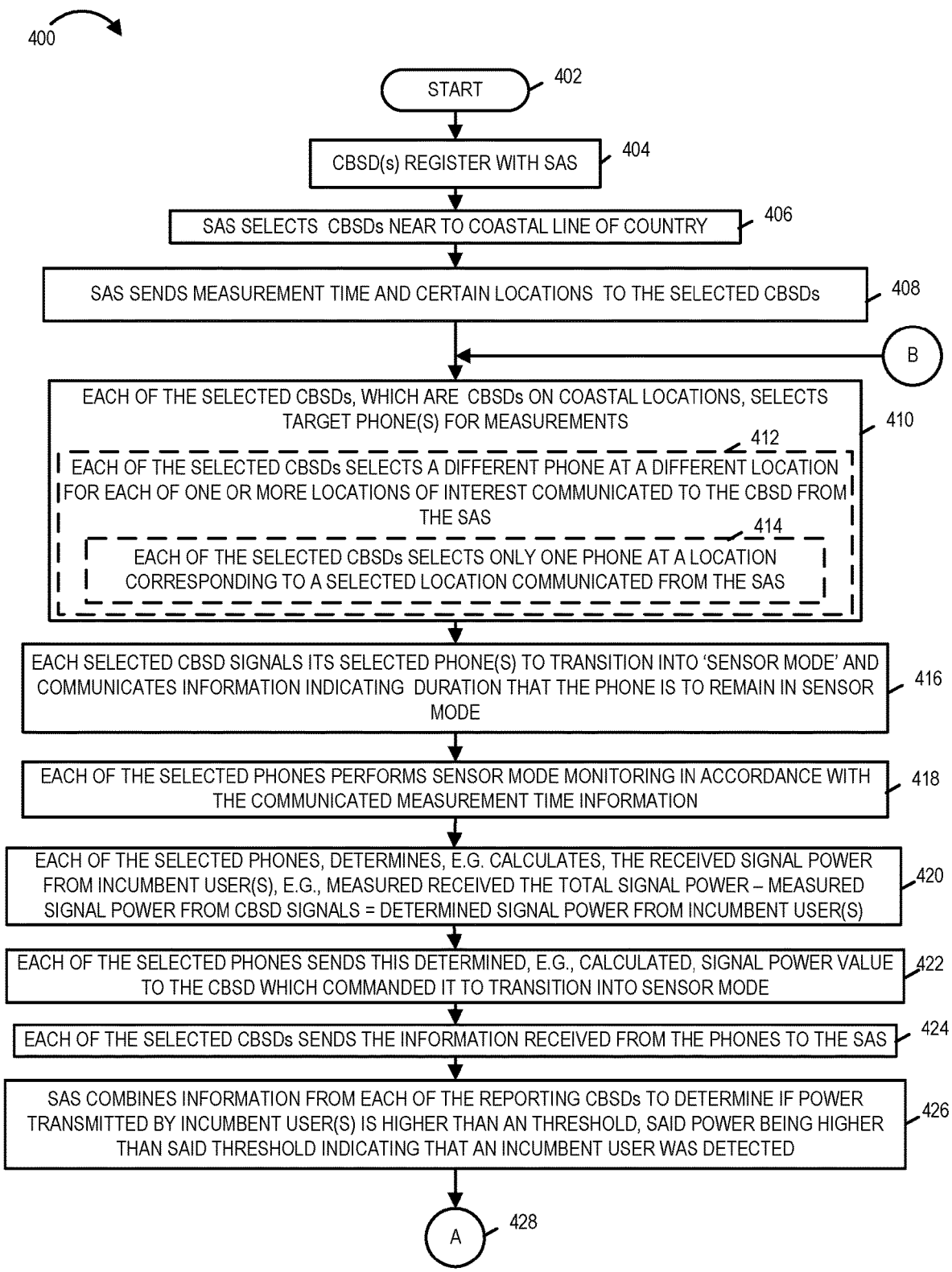
FIG. 4A is a first part of a flowchart of an exemplary method of operating a communications system, e.g., a communications system including a plurality of base stations, e.g., CBSDs, a plurality of user equipment (UE) devices, e.g., cell phones, and a system management device, e.g., a SAS, to monitor for incumbent users in a CBRS frequency band (e.g., a 3.5 GHz band), detect incumbent users and respond to the detected incumbent users, e.g., commanding one or more CBSDs to shut down to protect the detected incumbent user, in accordance with an exemplary embodiment.
Figures 4, 4A, 4B:
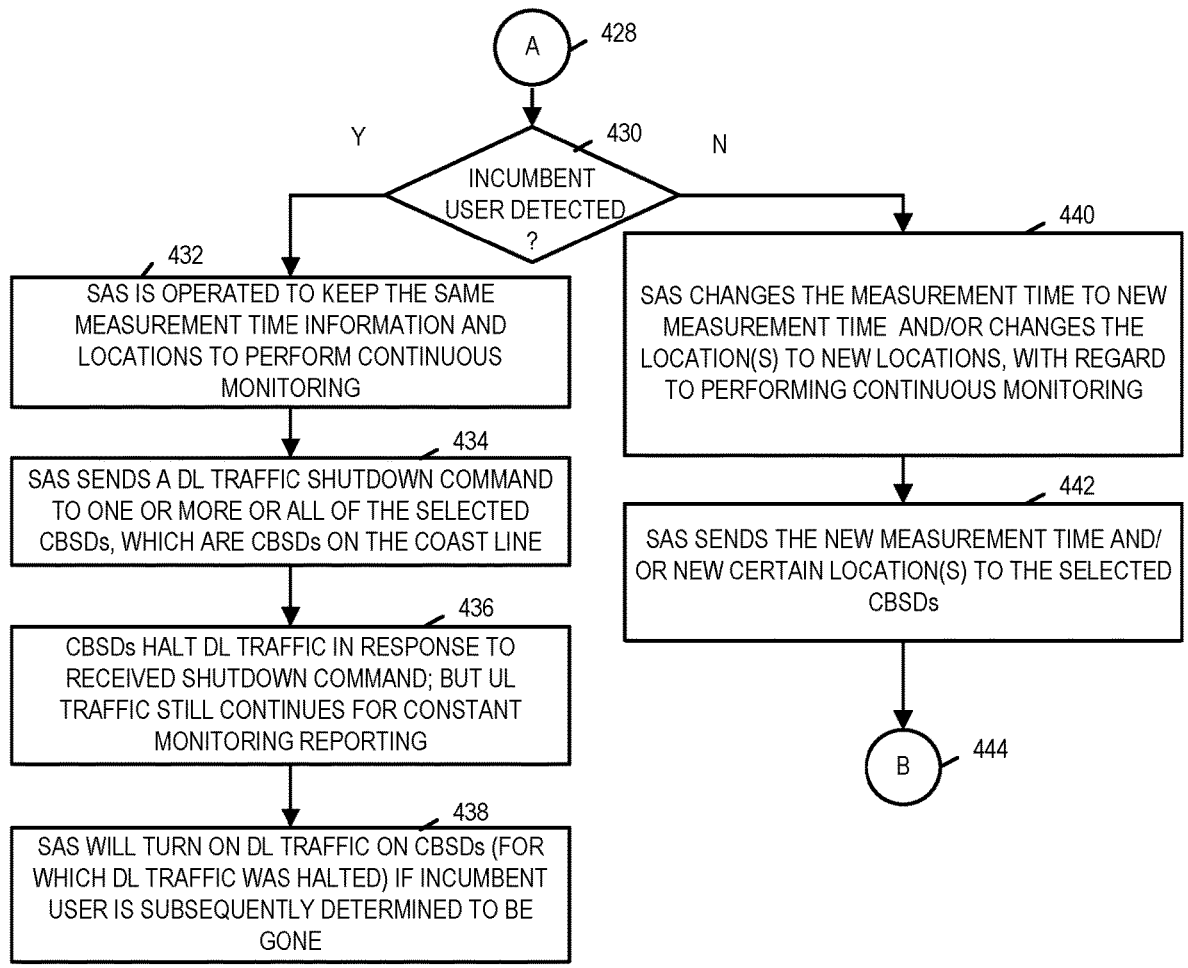
FIG. 4B is a second part of a flowchart of an exemplary method of operating a communications system, e.g., a communications system including a plurality of base stations, e.g., CBSDs, a plurality of user equipment (UE) devices, e.g., cell phones, and a system management device, e.g., a SAS, to monitor for incumbent users in a CBRS frequency band (e.g., a 3.5 GHz band), detect incumbent users and respond to the detected incumbent users, e.g., commanding one or more CBSDs to shut down to protect the detected incumbent user, in accordance with an exemplary embodiment.
FIG. 4 comprises the combination of FIG. 4A and FIG. 4B.

FIG. 4, comprising the combination of FIG. 4A and FIG. 4B, is a flowchart 400 of an exemplary method of operating a communications system, e.g., a communications system including a plurality of base stations, e.g., CBSDs, a plurality of user equipment (UE) devices, e.g., cell phones, and a system management device, e.g., a SAS, to monitor for incumbent users in a CBRS frequency band (e.g., a 3.5 GHz band), detect incumbent users and respond to the detected incumbent users, e.g., commanding one or more CBSDs to shut down to protect the detected incumbent user, in accordance with an exemplary embodiment. Operation starts in step 402 in which the communications system is powered on and initialized. Operation proceeds from start step 402 to step 404. In step 404 CBSDs register with the SAS. Operation proceeds from step 404 to step 406. In step 406 the SAS selects CBSDs near to the coastal line of the country. Operation proceeds from step 406 to step 408.

In step 408 the SAS sends measurement time and certain locations (e.g., a location pattern) to the selected CBSDs. Operation proceeds from step 408 to step 410.

In step 410 each of the selected CBSDs, which are CBSDs on coastal locations, selects target phone(s) for measurements. In some embodiments, step 410 includes step 412. In step 412 each of the selected CBSDs selects a different phone at a different location for each of one or more locations of interest communicated to the CBSD from the SAS. In some embodiments, step 412 includes step 414 in which each of the selected CBSDs selects only one phone at a location corresponding to a selected location communicated from the SAS to the CBSD. Operation proceeds from step 410 to step 416.

In step 416 each selected CBSD signals its selected phone(s) to transition into "sensor mode' and communicates information indicating the duration that the phone is to remain in sensor mode. Operation proceeds from step 416 to step 418.

In step 418 each of the selected phones transitions in sensor mode and performs sensor mode monitoring in accordance with measurement time information. Operation proceeds from step 418 to step 420. In step 420 each of the selected phone(s) determines, e.g., calculates, the received signal power from incumbent user(s), e.g., measured received total signal power–measured signal power from CBSD signals=determined signal power from incumbent user(s). Operation proceeds from step 420 to step 422.

In step 422 each of the selected phones sends this determined, e.g., calculated, signal power value to the CBSD which commanded it to transition into sensor mode. Operation proceeds from step 422 to step 424.

In step 424 each of the selected CBSDs sends the information received from the phones to the SAS. Operation proceeds from step 424 to step 426.

In step 426 the SAS combines information from each of the reporting CBSDs to determine if power transmitted by incumbent user(s) is higher than a threshold, said power being higher than a threshold indicating that an incumbent user was detected. Operation proceeds from step 426, via connecting node A 428 to step 430.

If an incumbent user was detected, then operation proceeds from step 430 to step 432; otherwise operation proceeds from step 430 to step 440. In step 432 the SAS is operated to keep the same time measurement information and locations to perform continuous monitoring. Operation proceeds from step 432 to step 434. In step 434 the SAS sends a Downlink (DL) traffic shutdown command to one or more or all of the selected CBSDs on the coast line, e.g., to shut down CBSDs corresponding to the region(s) in which the incumbent user was detected. Operation proceeds from step 434 to step 436.

In step 436 CBSDs halt DL traffic in response to the received shutdown command; but uplink (UL) traffic still continues for constant monitoring reporting. Operation proceeds from step 436 to step 438. In step 438 the SAS turns on DL traffic on CBSDs (for which DL traffic was halted) if the incumbent user is subsequently determined to be gone.

Returning to step 440, in step 440, the SAS changes the measurement time to new measurement time and/or changes the location(s) to new locations with regard to performing continuous monitoring. Operation proceeds from step 440 to step 442. In step 442 the SAS sends the new measurement time and/or new certain location(s) to the selected CBSDs. Operation proceeds from step 442, via connecting node B 444 to step 410, in which each of the selected CBSDs selects target phone(s) fro measurement.

Various aspects and/or features of some embodiments of the present invention are further discussed below.

Mobile phones are used as sensors to determine if incumbent users are transmitting in 3.5 GHz band. Selected phones connected to a base station, e.g., a CBSD, will be transitioned into 'sensor mode' to measure the signal of incumbent users, and will send the measured signal back to the base station, e.g. the CBSD. The base stations, e.g. the CBSDs, will send each of the measurement reports to system management device, e.g. a SAS, and the system management device, e.g., the SAS, will combine the signals to determine if the signal received from incumbent users are above certain threshold, if it is determined that the signal received from the incumbent user is above the threshold; then the system management device, e.g., the SAS will shutdown the base stations, e.g., the CBSDs to protect incumbent user.

The base station, e.g., the CBSD, signals one or more selected phones to transition the phone(s) into 'sensor mode', and a phone in sensor mode constantly sends signal back to base station, e.g. the CBSD, when in this mode. The phone stays in this mode for some duration of time which is also sent by base station, e.g., the CBSD to the phone, and this is sent from system management device, e.g. the SAS, to base stations, e.g., CBSDs, on the border, e.g., on a coastline. The system management device, e.g., the SAS, knows which base stations, e.g., which CBSDs, are located on the border, e.g., the coastline, based on the base station, e.g., CBSD, locations.

In some embodiments, there are different measurement modes:

Mode 1—Only one phone at a time measures the signal, and phones at different locations are selected. Phone locations are determined by CBSD, e.g., by using Sounding Reference Signals (SRS) sent by the phone in UL. Measurement time and location pattern is determined by SAS and is sent to CBSDs. If incumbent user signal is determined accurately by SAS, the measurement time and location pattern is kept the same; however, if incumbent user signal is not determined accurately by SAS; then measurement time and/or location pattern is changed by SAS and is sent to all CBSDs as new measurement time and/or new location pattern.

Mode 2—More than one phone measures the signal at the same or at different locations. Signals from phones are combined by each CBSD. The number of phones is increased by a certain number until the power level that adding more phones does not increase the accumulated power at SAS any more.

When SAS shuts down the CBSDs on the coast because of potential incumbent user, UL traffic of the phones will be still alive. Power in the downlink is much higher than the power in the UL since phone battery is limited. In UL, phones in monitoring mode will keep performing measurements and will keep reporting to CBSDs the power levels of incumbent user. Based on the reported measured power level, if the SAS believes that incumbent user is no longer using the CBRS band; then SAS will turn on DL power on CBSDs on the coast.

Figure 5A:
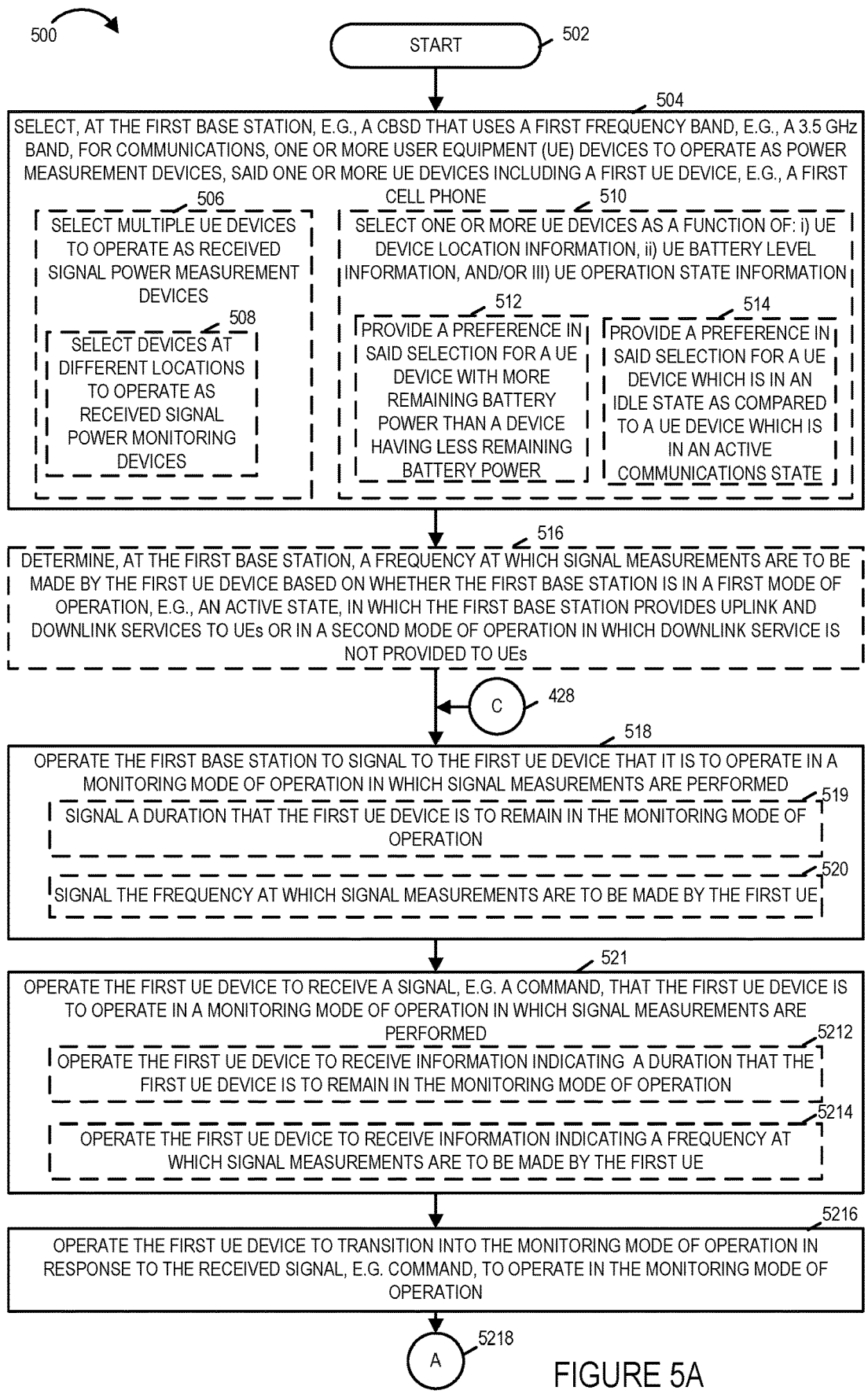
FIG. 5A is a first part of a flowchart of an exemplary method of operating a communications system, e.g., a communications system including a plurality of base stations, e.g. CBSDs, a plurality of user equipment (UE) devices, e.g., cell phones, which may, and sometimes do operate as monitoring devices for measuring and reporting incumbent user signal information corresponding to a CBRS band, and a system management device, e.g., a SAS, in accordance with an exemplary embodiment.
Figure 5B:
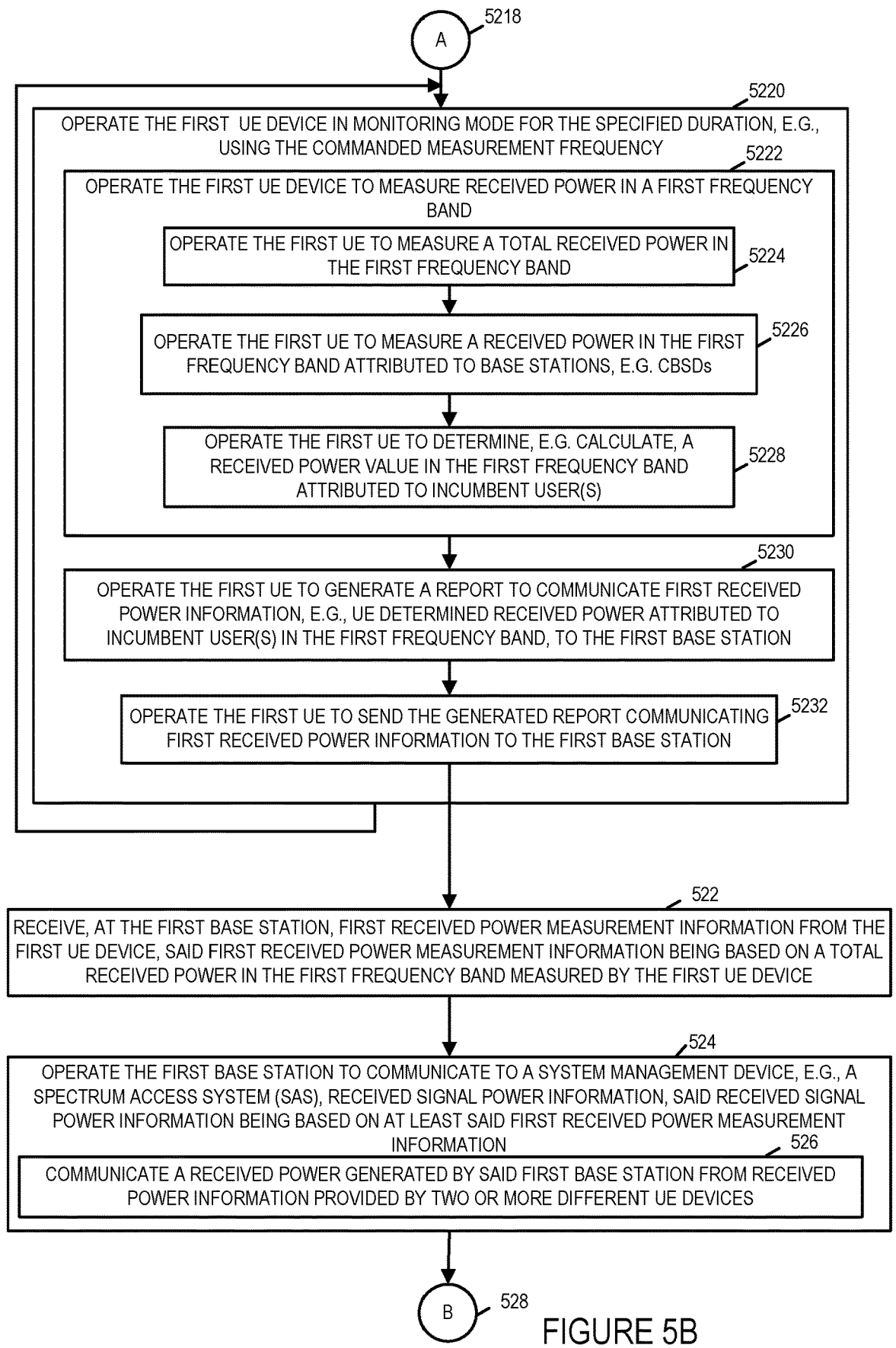
FIG. 5B is a second part of a flowchart of an exemplary method of operating a communications system, e.g., a communications system including a plurality of base stations, e.g. CBSDs, a plurality of user equipment (UE) devices, e.g., cell phones, which may, and sometimes do operate as monitoring devices for measuring and reporting incumbent user signal information corresponding to a CBRS band, and a system management device, e.g., a SAS, in accordance with an exemplary embodiment.

FIG. 5, comprising the combination of FIG. 5A, FIG. 5B and FIG. 5C, is a flowchart 500 of an exemplary method of operating a communications system, e.g., a communications system including a plurality of base stations, e.g. CBSDs, a plurality of user equipment (UE) devices and a system management device, in accordance with an exemplary embodiment. Operation starts in step 502 in which the communications system is powered on and initialized. Operation proceeds from step 502 to step 504. In step 504 a first base, e.g., a CBSD that uses a first frequency band, e.g., a 3.5 GHz frequency band, for communications, selects one or more user equipment (UE) devices to operate as power measurement devices, said one or more UE devices including a first UE device, e.g., a first cell phone. In some embodiments, the first base station is a small cell base station, e.g., a small cell CBSD. In some embodiments, the selected one or more UE devices is a subset of UE devices attached to said first base station. In some embodiments, said one or more UE devices does not include at least some UE devices attached to said first base station which are receiving service from said first base station.

Step 504 may, and sometimes does, include one or both of steps 506 and 510. In step 506 the first base station selects multiple UE devices to operate as received signal power measurement devices. Step 506 may, and sometimes does, include step 508 in which the first base station selects UE devices at different locations to operate as received signal power monitoring devices. In step 510 the first base station selects one or more UE devices as a function of: i) UE device location information, ii) UE battery level information, and/ or iii) UE operation state information (e.g., active or idle state information indicating what mode the UE is in). Step 512 may, and sometimes does, include one or both of step 512 and step 514. In step 512 the first base station provides a preference in said selection for a UE device with more remaining battery power, e.g., a first remaining battery power level, than a device having less remaining battery power, e.g., a second remaining battery power level which is lower than said first remaining battery power level. In step 514 the first base station provides a preference in said selection for a UE device which is in an idle state, e.g., a device in a state in which voice traffic is not currently supported, as compared to a UE device which is in an active communications state, a device in a state in which uplink voice traffic is currently supported.

Operation proceeds from step 504 to step 516. In step 516 the first base station determines a frequency at which signal measurements are to be made by the first UE device based on whether the first base station is in a first mode of operation, e.g., an active state, in which the first base station provides uplink and downlink services to UEs or in a second mode of operation in which downlink service is not provided to UEs. Operation proceeds from step 516 to step 518.

In step 518 the first base stations signals to the first UE device that the first UE device is to operate in a monitoring mode of operation in which signal measurements are performed, e.g., received power signal measurements in a first frequency band, e.g., a CBRS band in which there may be, and sometimes are, incumbent users, are performed. Step 518 includes step 519 and step 520. In step 519 the first base station signals to the first UE a duration that the first UE is to remain in the monitoring mode of operation, which is sometimes referred to as sensor mode or sensor operation mode. In step 520 the first base station signals to the first UE the frequency at which signal measurements are to be made by the first UE. In some embodiments, the first base station signals to the first UE the frequency at which signal measurement reports are to be sent from the first UE to the first base station. Operation proceeds from step 518 to step 521.

In step 521 the first UE device receives a signal, e.g., a command, that the first UE device is to operate in a monitoring mode of operation in which signal measurements are performed and results are reported to the first base station. Step 521 includes steps 5212 and 5214. In step 5212 the first UE device receives information indicating a duration that the first UE device is to remain in the monitoring mode of operation. In step 5214 the first UE device receives information indicating a frequency at which signals measurements are to be performed by the first UE device. In some embodiments, the first UE device receives information indicating the frequency, e.g., rate, at which generated measurement reports are to sent to the first base station. Operation proceeds from step 521 to step 5216.

In step 5216 the first UE device transitions into the monitoring mode of operation, e.g., from normal mode of operation, in response to the received signal, e.g., command to operate in the monitoring mode of operation. Operation proceeds from step 5216, via connecting node A 5218 to step 5220.

In step 5220 the first UE device is operated in monitoring mode for the specified duration, e.g., using the commanded frequency for performing measurements and/or the commanded frequency for sending reports. Step 5220 includes steps 5222, 5230 and step 5232. In step 5222 the first UE device measures received power in a first frequency band, e.g. a CBRS frequency band in which there may be, and sometimes are incumbent users, in addition to base station signals, e.g. CBSD signals. Step 5222 includes steps 5224, 5226 and 5228. In step 5224 the first UE measures a total received power in the first frequency band. In step 5226 the first UE device measures a received power in the first frequency band attributed to base stations, e.g., CBSDs, e.g., based on received pilot signals. In step 5228, the first UE determines, e.g., calculates a received power in the first frequency band attributed to incumbent user(s), e.g., first UE determined received power attributed to incumbent user(s)= measured total received power−measured received power attributed to base stations, e.g., CBSDs. Operation proceeds from step 5222 to step 5230. In step 5230 the first UE device generates a report to communicate first received power information, e.g. first UE determined received power attributed to incumbent user(s) in the first frequency band, to the first base station. Operation proceeds from step 5230 to step 5232. In step 5232 the first UE sends, e.g., transmits, the generated report communicating the first received power information, e.g., first UE determined received power attributed to incumbent user(s), to the first base station. In response to step 5232, operation proceeds to step 522.

The operations of step 5220 are repeated, e.g., repetitively in accordance with the commanded measurement rate and/or commanded reporting rate, until the specified monitoring mode duration expires, at which time the first UE device transitions to normal operating mode.

In step 522 the first base station receives first received power measurement information from the first UE device, said first received power measurement information being based on a total received power in the first frequency band measured by the first UE device. In some embodiments, the first received power measurement information includes signal energy information indicating a first total received signal energy in the first frequency. In some embodiments, the first received power measurement information includes signal energy information indicating a first total received signal energy in the first frequency band reduced by an amount of signal energy of base station signals, e.g., CBSD signals, e.g., as determined from pilot signals measured by the first UE device, said first received power measurement information being received from the first UE device. Operation proceeds from step 522 to step 524.

In step 524 the first base station communicates to a system management device, e.g., a spectrum access system (SAS), received signal power measurement information, said received signal power measurement information being based on at least said first received power measurement information. In some embodiments, step 524 includes step 526, in which the first base station communicates a received power generated by said from received power information provided by two or more different UE devices. In some embodiments, the received signal power measurement information includes an average received power generated by the first base station from multiple reported received powers. In some such embodiments, the average power excludes from consideration received signal power corresponding to base station signals, e.g., CBSD signals, detected as being received by the UE devices, said base stations providing the UEs reporting received signal power information.

Operation proceeds from step 524, via connecting node B 528, to step 530. In step 530 the system management system, e.g., the SAS, is operated to make a decision whether or not to shut down first base station downlink operation based on the received signal power measurement information provided by the first base station. Step 530 includes step 532, 534, 536, and in some embodiments, step 538.

In step 534 the system management system compares a received signal power reported by the first base station to a signal power threshold level. Operation proceeds from step 532 to step 534.

In step 534 if the comparison indicates that the received power reported by the first base station exceeds the signal power threshold level, then operation proceeds from step 534 to step 536; otherwise, operation proceeds from step 534 to step 538.

Returning to step 536, in step 536 the system management device commands the first base station to stop using the first frequency band for providing downlink communications to UE devices. Operation proceeds from step 536 to step 540.

In step 540 the first base station receives a command to stop using the first frequency band for providing downlink communications to UE devices, said command being received from the system management system. Operation proceeds from step 540 to step 542 and 544. In step 542 the first base station, in response to said command, is operated to cease using the first frequency band for UE data downlink communications while continuing to allow UE devices to use said first frequency band for reporting of power measurements. In step 544 the first base station, in response to said command, is operated to continue using the first frequency band for control signaling relating to power measurements but not use the first frequency band for UE downlink data such as voice data. Operation proceeds from step 542 and 544 to step 546.

In step 546 the system management system, e.g. a SAS, commands the first base station to re-start using the first frequency band for providing downlink communication to UE devices based on received signal power measurement n information provided by the first base station, e.g., a comparison indicates that received signal power reported by the first base station no longer exceeds the signal power threshold level. Operation proceeds from step 546 to step 548.

In step 548 the first base station receives the command to re-start using the first frequency band for providing downlink communications to UE devices, said re-start command being received from the system management system. Operation proceeds from step 548 to step 550.

In step 550 the first base station, in response to said command to re-start, re-starts using the first frequency band for UE data downlink communications while continuing to allow UE devices to uses said first frequency band for reporting of power measurements.

Returning to step 538, in step 538 the first base station changes the measurement frequency which is to be used by the first UE device. Operation proceeds from step 538, via connecting node B 428 to step 518.

Figure 6A:
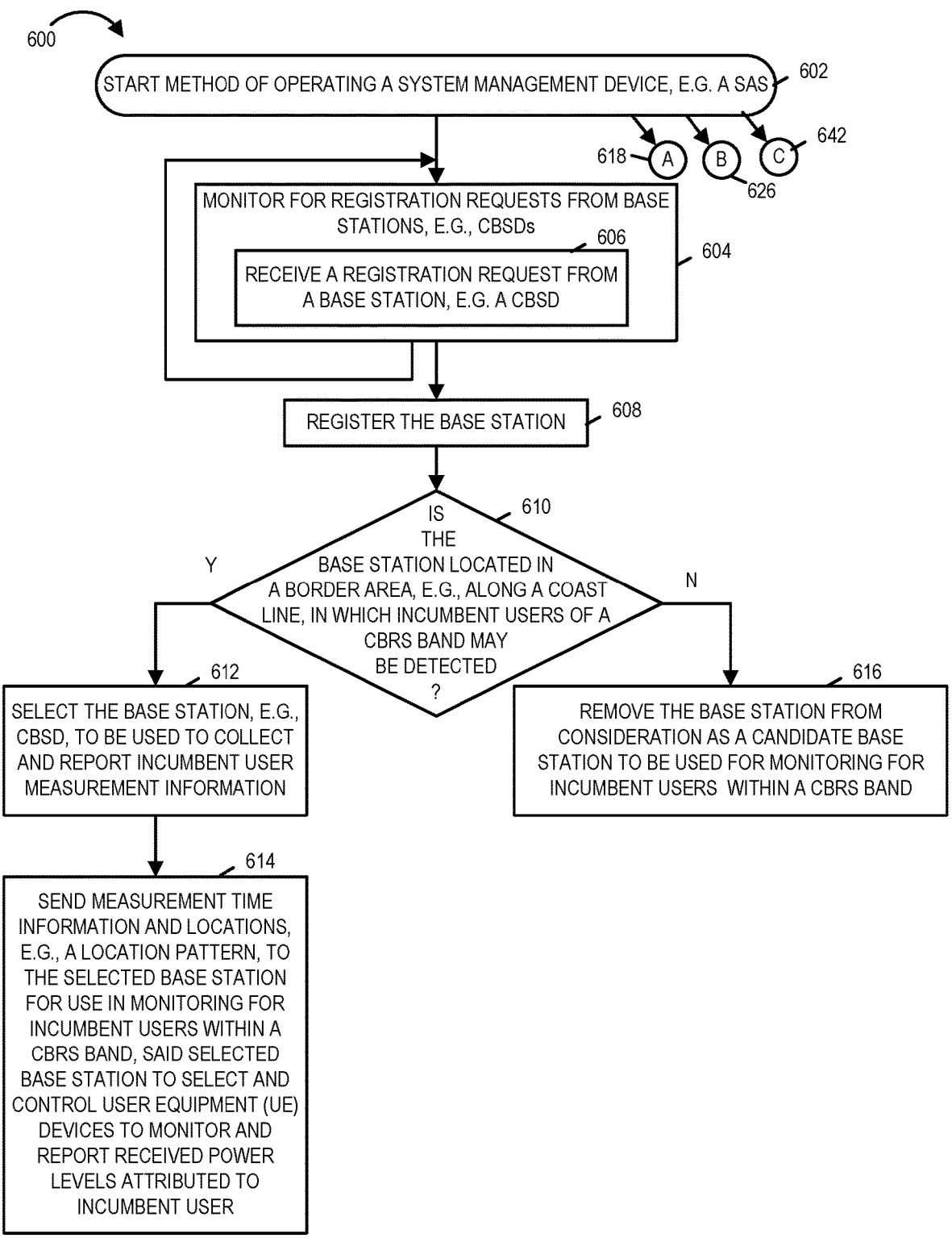
FIG. 6A is a first part of a flowchart of an exemplary method of operating a system management device, e.g., a SAS, in accordance with an exemplary embodiment.
Figure 6B:
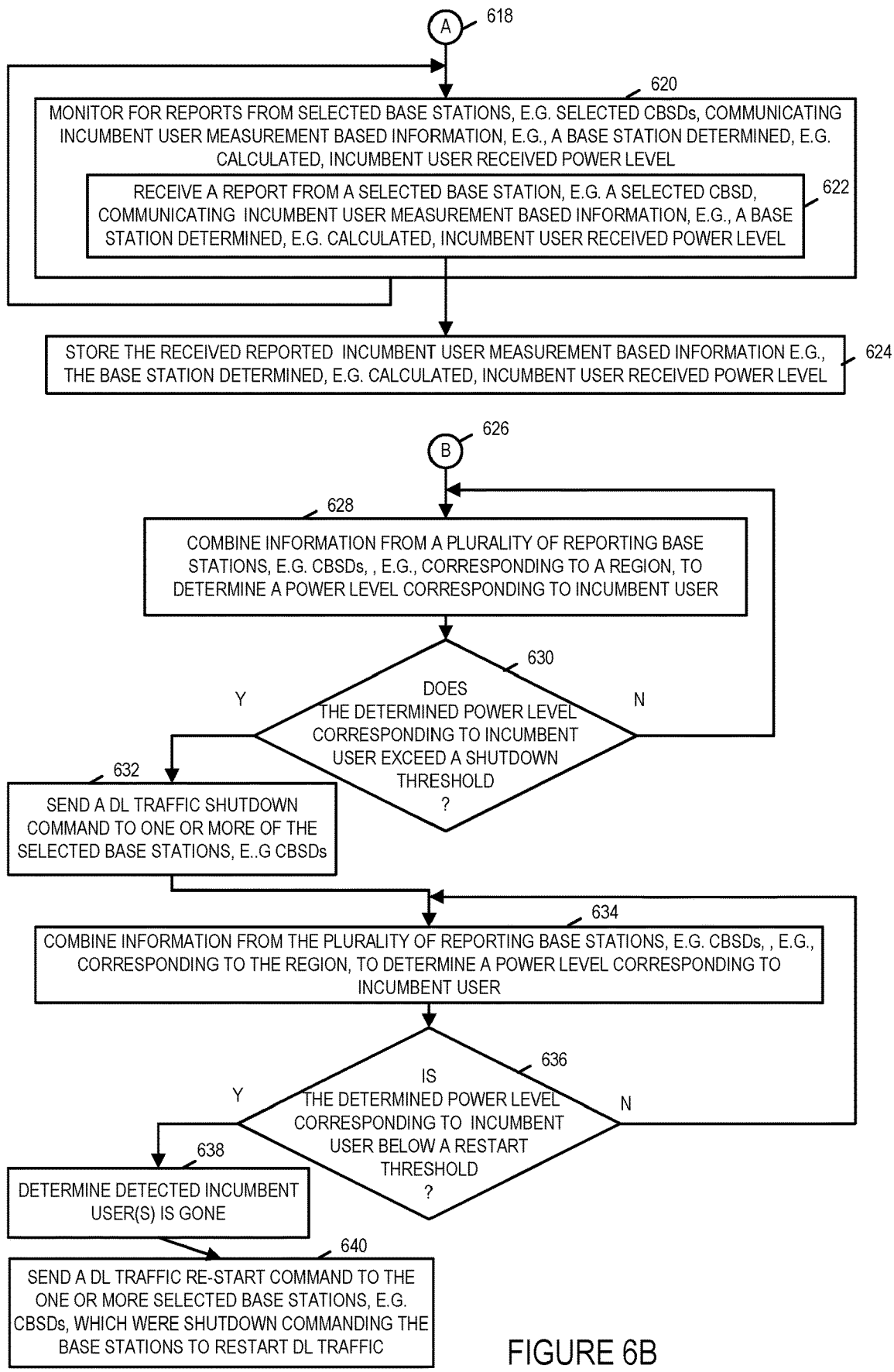
FIG. 6B is a second part of a flowchart of an exemplary method of operating a system management device, e.g., a SAS, in accordance with an exemplary embodiment.
Figures 6, 6C:
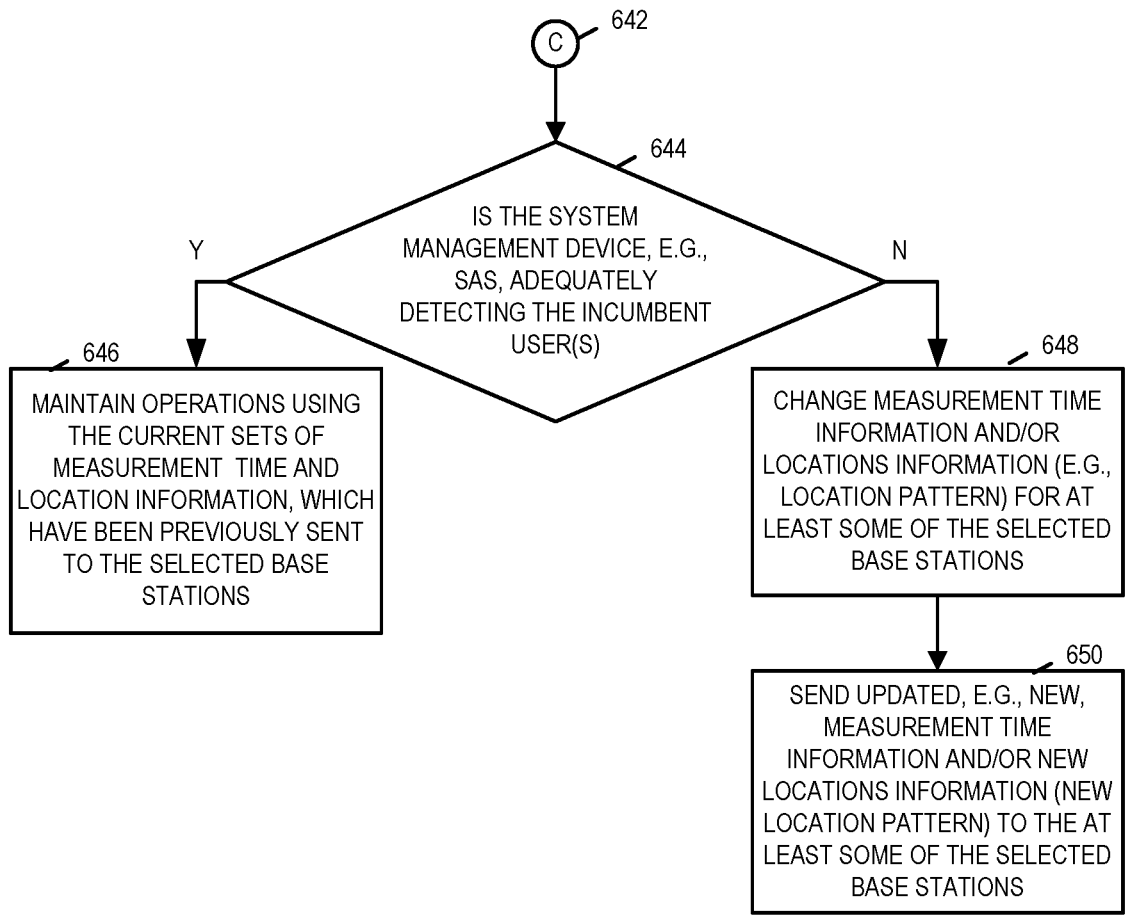
FIG. 6C is a third part of a flowchart of an exemplary method of operating a system management device, e.g., a SAS, in accordance with an exemplary embodiment.
FIG. 6 comprises the combination of FIG. 6A, FIG. 6B and FIG. 6C.

FIG. 6, comprising the combination of FIG. 6A, FIG. 6B and FIG. 6C, is a flowchart 600 of an exemplary method of operating a system management device, e.g., a SAS, in accordance with an exemplary embodiment. Operation starts in step 602, in which the system management device, e.g. the SAS, is powered on and initialized. Operation proceeds from step 602 to step 604, via connecting node A 618 to step 620, via connecting node B 626 to step 628 and via connecting node C 642 to step 644.

In step 604 the system management device monitors for registration requests from base stations, e.g., CBSDs. Step 604 is performed repetitively on an ongoing basis. Step 604 includes step 606 in which the system management device receives a registration request from a base station, e.g. a CBSD. Operation proceeds from step 606 to step 608 in which the system management device registers the base station, e.g., the CBSD. Operation proceeds from step 608 to step 610.

In step 610 the system management device determines if the base station is located in a border area, e.g., along a coast line, in which incumbent users of a CBRS band may be detected. If the system management device determines that the base station is located in a border area, e.g., along a coast line, in which incumbent users of a CBRS band may be detected, then operation proceeds from step 610 to step 612; otherwise operation proceeds from step 610 to step 616.

In step 612 the system management device selects, the base station, e.g. CBSD, to collect and report incumbent user measurement information. Operation proceeds from step 612 to step 614. In step 614 the system management device, e.g., a SAS, sends measurement time information and locations, e.g., a location pattern, to the selected base station for use in monitoring for incumbent users within a CBRS band, said selected base station to select and control user equipment (UE) devices to monitor and report received power levels attributed to incumbent users.

Returning to step 616, in step 616 the system management device removes the base from consideration as a candidate base station to be used for monitoring for incumbent users with a CBRS band.

Returning to step 620, in step 620 the system management device, e.g., a SAS, monitors for reports from selected base stations, e.g. selected CBSDs, communicating incumbent user measurement based information, e.g., a base station determined, e.g., calculated, incumbent user received power level. Step 620 is performed on an ongoing basis, e.g., repetitively. Step 620 includes step 622 in which the system management device receives a report from a selected base station, e.g., a selected CBSD, communicating incumbent user measurement based information, e.g., a base station determined, e.g., calculated, incumbent user received power level. Operation proceeds from step 622 to step 624.

In step 624 the system management device, e.g., a SAS, stores the reported incumbent user measurement base information, e.g., the base station determined, e.g., calculated, incumbent user received power level.

Returning to step 628, in step 628 the system management device, e.g. a SAS, combines information from a plurality of reporting base stations, e.g., reporting CBSDs, e.g., corresponding to a region, to determine a power level corresponding to incumbent user. Operation proceeds from step 628 to step 630.

In step 630 the system management system, e.g., a SAS, determines if the determined power level corresponding to incumbent user exceeds a shutdown threshold. If the determined power level corresponding to incumbent user exceeds the shutdown threshold, then operation proceeds from step 630 to step 632; otherwise, operation proceeds from step 630 to step 628.

In step 632 the system management device, e.g., a SAS, sends a downlink (DL) traffic shutdown command to one or more of the selected base stations, e.g., selected CBSDs, e.g., the plurality of base stations corresponding to the region. Operation proceeds from step 632 to step 634.

In step 634 the system management device, e.g., a SAS, combines information from the plurality of reporting base stations, e.g., CBSDs, e.g., corresponding to the region, to determine a power level corresponding to incumbent user. Operation proceeds from step 634 to step 636.

In step 636 the system management system, e.g., a SAS, determines if the determined power level corresponding to incumbent user is below a restart threshold. If the determined power level corresponding to incumbent user is below the restart threshold, then operation proceeds from step 636 to step 638; otherwise, operation proceeds from step 638 to step 634.

In step 638 the system management device, e.g., a SAS, determines that the detected incumbent user(s) is gone. Operation proceeds from step 638 to step 640.

In step 640 the system management device, e.g., a SAS, sends a DL traffic restart command to one or more selected base stations, e.g. CBSDs, which were shutdown with regard to DL traffic, said restart command commanding the base stations to restart sending DL traffic signals on the CBRS band.

Returning to step 644, in step 644, the system management device, e.g., a SAS, evaluates and determines if the system management device is adequately detecting incumbent users. If the determination is that the system management device is adequately detecting incumbent users, then operation proceeds from step 644 to step 646. In step 646 the system management device maintains operations using the current sets of measurement time and location information which have been previously sent to the selected base stations. However, if the determination is that the system management device is not adequately detecting incumbent users, then operation proceeds from step 644 to step 648. In step 648 the system management device, e.g., a SAS, changes measurement time information and/or locations information (e.g., location pattern) for at least some of the selected base stations. Operation proceeds from step 648 to step 650. In step 650 the system management system, e.g., a SAS, send updated, e.g., new, measurement time information and/or updated, e.g., new, location information (new location pattern) to the at least some of the selected base stations.

Figure 7A:
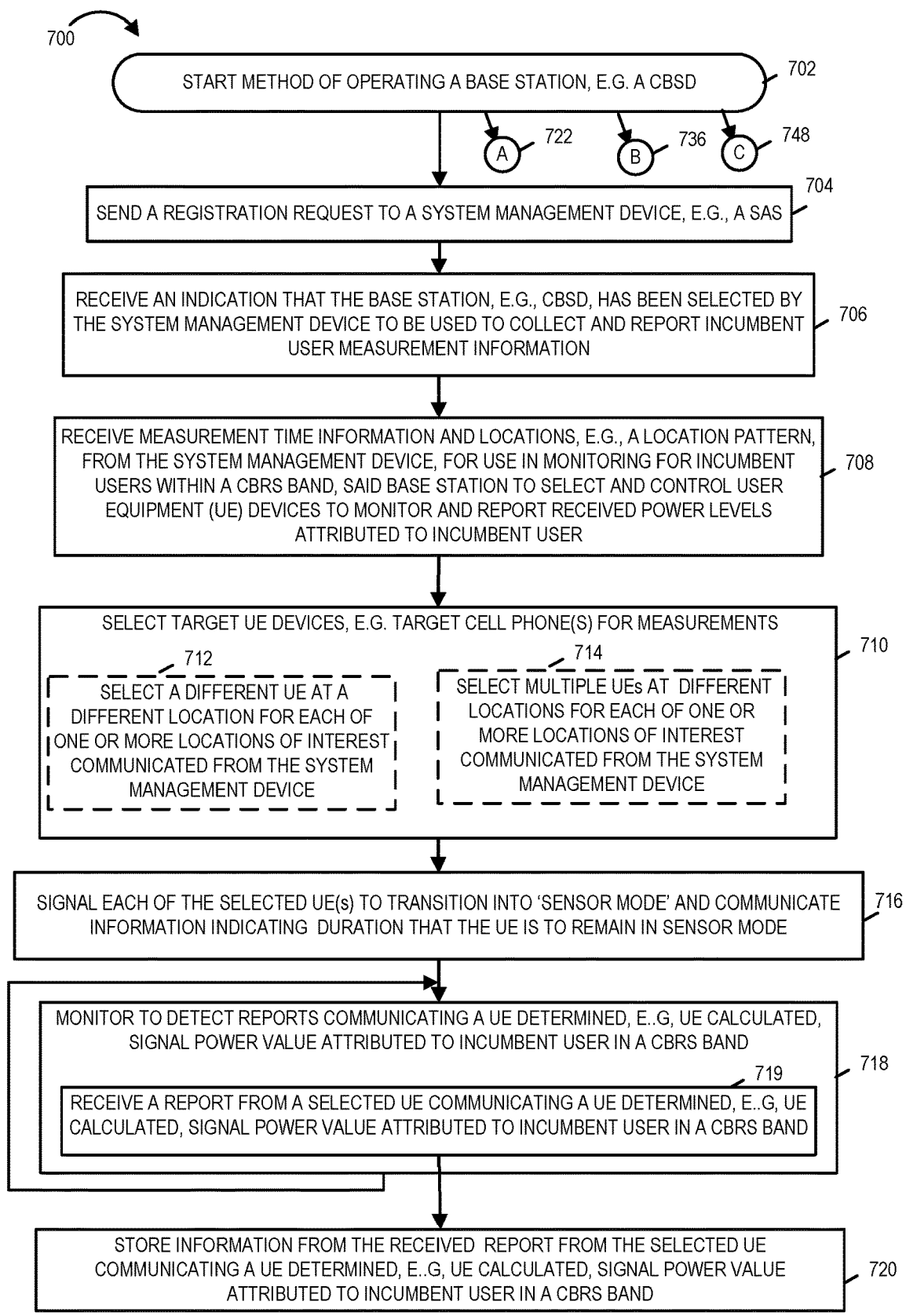
FIG. 7A is a first part of a flowchart of an exemplary method of operating a base station, e.g., a CBSD, in accordance with an exemplary embodiment.
Figure 7B:
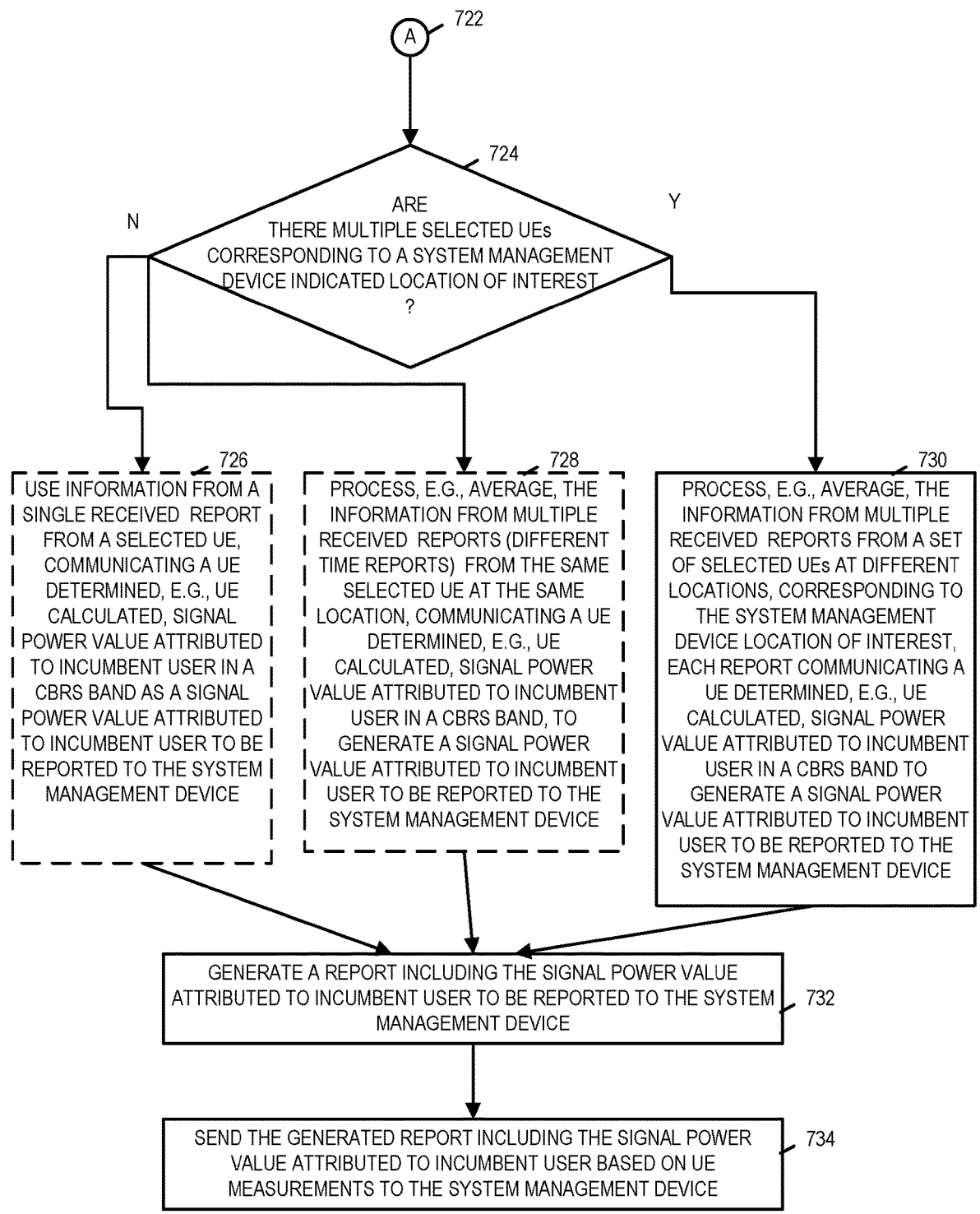
FIG. 7B is a second part of a flowchart of an exemplary method of operating a base station, e.g., a CBSD, in accordance with an exemplary embodiment.

FIG. 7, comprising the combination of FIG. 7A, FIG. 7B and FIG. 7C, is a flowchart 700 of an exemplary method of operating a base station, e.g., a CBSD, in accordance with an exemplary embodiment. Operation starts in step 702 in which the base station, e.g., the CBSD, is powered on and initialized. Operation proceeds from start step 702 to step 704, to step 724 via connecting node A 722, to step 738 via connecting node B 736, and to step 750 via connecting node C 748.

In step 704 the base station sends a registration request to a system management device, e.g., a SAS. Operation proceeds from step 704 to step 706.

In step 706 the base station receives an indication that the base station has been selected by the system management device to be used to collect and report incumbent user measurement information, e.g., energy and/or power measurements attributed to incumbent user in a CBRS band. Operation proceeds from step 706 to step 708.

In step 708 the base station receives measurement time information and locations, e.g., a location pattern, from the system management device, for use in monitoring for incumbent user(s) within a CBRS band, said base station to select and control user equipment (UE) devices, e.g., cell phones, to monitor and report received power attributed to incumbent user. Operation proceeds from step 708 to step 710.

In step 710 the base station selects target UE devices, e.g., target cell phones, which are to act as sensor devices and perform measurements. In some embodiments, step 710 includes step 712, in which the base station selects a different UE at a different location for each of one or more locations of interest communicated from the system management device. In some embodiments, step 710 includes step 714 in which the base station selects multiple UEs at different location for each of one or more locations of interest communicated from the system management device. Operation proceeds from step 710 to step 716.

In step 716 the base station signals each of the selected UEs to transition into sensor mode and base station further communicates to each of the selected UEs information indicating a duration that the UE is to remain in sensor mode. In some embodiments, the base station further communicates to the UE time information corresponding to the monitoring, measuring, and/or reporting of results relating to sensor mode operations, e.g., when to perform measurements in accordance with a timing structure, frequency between monitoring intervals, duration of a monitoring interval, frequency between monitoring reports, number of samples used to generate a monitoring report, etc. Operation proceeds from step 716 to step 718.

In step 718 the base station monitors to detect reports communicating a UE determined, e.g., UE calculates, signal power value attributed to incumbent user in a CBRS band. Step 718 is performed on an ongoing basis, e.g., repetitively. Step 718 include includes step 719 in which the base station receives a report from a selected UE communicating a UE determined, e.g., UE calculated, signal power value attributed to incumbent user in a CBRS band. Operation proceeds from step 719 to step 720 in which the base station stores information from the received report from the selected UE communicating a UE determined, e.g., UE calculated signal power value attributed to incumbent user in a CBRS band.

Returning to step 724, in step 724 the base station determines if there are multiple selected UEs corresponding to a system management indicated location of interest. If there are multiple selected UEs corresponding to a system management indicated location of interest, then operation proceeds from step 724 to 730; otherwise, operation proceeds from step 724 to step 726 or step 728 depending upon the particular embodiment.

In step 730 the base station processes, e.g., averages, the information from multiple received reports from a set of selected UEs at different locations, corresponding to the system management device location of interest, each report communicating a UE determined, e.g., a UE calculated, signal value power attributed to incumbent user in a CBRS band, to generate a signal power value attributed to incumbent user to be reported to the system management device.

In step 726 the base station uses information from a single received report from a selected UE communicating a UE determined, e.g., UE calculated, signal power value attributed to incumbent user in a CBRS band as a signal power value attributed to incumbent user to be reported to the system management device.

In step 729 the base station processes, e.g., averages, the information from multiple received reports (different time reports) from the same selected UE at the same location, communicating a UE determined, e.g. UE calculated, signal power value attributed to incumbent user in a CBRS band, to generate a signal power value attributed to incumbent user to be reported to the system management device.

Operation proceeds from one of steps 726, 728 or 730 to step 732. In step 732 the base station generates a report including the signal power value attributed to incumbent user to be reported to the system management device. Operation proceeds from step 732 to step 732 in which the base station sends the generated report including the signal power attributed to incumbent user based on UE measurements to the system management device.

In step 738 the base station monitors for commands from the system management device. Step 738 is performed on an ongoing basis, e.g., repetitively. Step 738 includes steps 740 and step 742. One of step 740 or step 742 is performed during some of iterations of step 738.

In step 740 the base station receives a DL traffic shutdown command from the system management device. Operation proceeds from step 740 to step 744. In step 744 the base station shuts down downlink traffic in the CBRS band in response to the received DL traffic shutdown command. UL reports from sensor mode UEs in the CBRS band are allowed to continue, and in some embodiments, emergency uplink signaling, e.g., 911 related signaling is also allowed to continue.

In step 742 the base station receives a DL traffic re-start command from the system management device. Operation proceeds from step 742 to step 746. In step 746 the base station shuts re-starts downlink traffic in the CBRS band in response to the received DL traffic shutdown command.

Returning to step 750, in step 750 the base station monitors for signals from the system management device communicating updated, e.g. new, timing measurement information and/or new location information (new location pattern information). Step 750 is performed on an ongoing basis, e.g. repetitively. Some iterations of step 750 includes step 752 in which the base station receives updated, e.g. new, timing measurement information and/or new location information (new location pattern) from the system management device. Operation proceeds from step 752 to step 754 in which the base station uses the updated measurement time information and/or updated location information in selecting UEs to operate in sensor mode and/or controlling the selected UEs.

Figure 8:
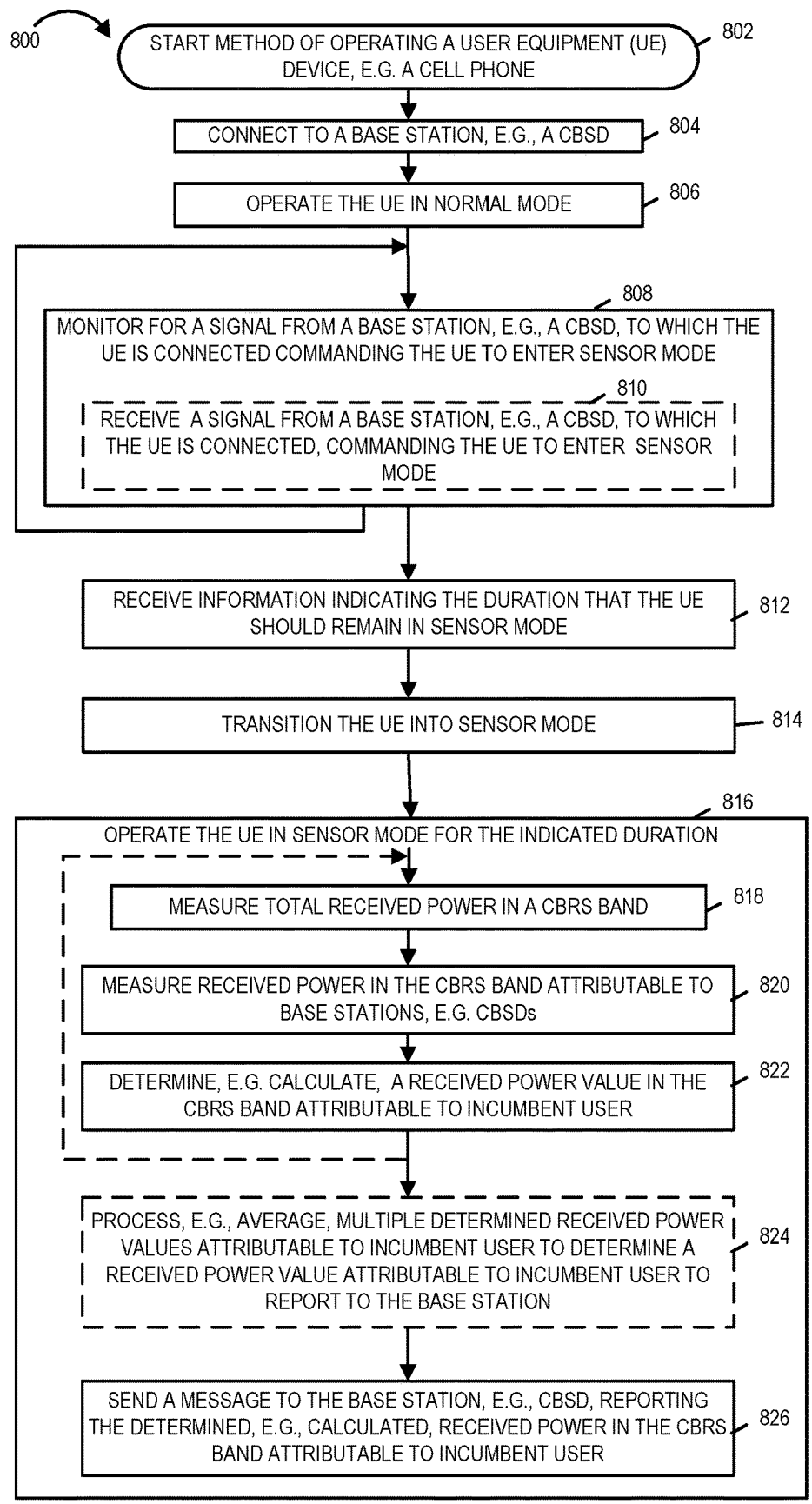
FIG. 8 is a flowchart of an exemplary method of operating a user equipment (UE) device, e.g., a cell phone, in accordance with an exemplary embodiment.

FIG. 8 is a flowchart 800 of an exemplary method of operating a user equipment (UE) device, e.g., a cell phone, in accordance with an exemplary embodiment. Operation starts in step 802 in which the UE is powered on and initialized. Operation proceeds from step 802 to step 804. In step 804 the UE connects to a base station, e.g. a CBSD. Operation proceeds from step 804 to step 806. In step 806 the UE operates in normal mode. In normal mode the UE may, and sometimes does, receive DL traffic signals in a CBRS band from the base station and send UL traffic signals in the CBRS band to the base station. In normal mode the UE does not report to the base station a UE determined, e.g., UE calculated, a power level value or energy level value attributed to incumbent user in the CBRS band. Operation proceeds from step 806 to step 808.

In step 808 the UE monitors for a signal from a base station, e.g., a CBSD, to which the UE is connected commanding the UE to enter sensor mode. Step 808 is performed on an ongoing basis, e.g., repetitively. Some iterations of step 808 includes step 810 in which the UE receives a signal from the base station, e.g., the CBSD, to which the UE is connected, commanding the UE to enter sensor mode. Operation proceeds from step 810 to step 812.

In step 812 the UE receives information indicating the duration that the UE should remain in sensor mode. In some embodiments, step 812 is included as part of step 810. In some embodiments, the UE further receives information related to sensor mode operations to be performed by the UE, e.g. timing information for performing measurements, number of measurement samples, intervals between measurements, reporting format information, reporting interval information, etc.

In step 814 the UE transitions into the sensor mode. In sensor mode the UE may, and sometimes does, receive DL traffic signals in a CBRS band from the base station and send UL traffic signals in the CBRS band to the base station. In addition in sensor mode the UE reports to the base station a UE determined, e.g., UE calculated, power level value or energy level value attributed to incumbent user in the CBRS band based on its measurements. Operation proceeds from step 814 to step 816.

In step 816 the UE is operated in sensor mode for the indicated duration. Step 816 includes steps 818, 820, 822, 824, and 826. In step 818 the UE measures total received power in a CBRS band. In step 818 the UE measures received power in the CBRS band attributable to base stations, e.g., CBSDs. In step 822 the UE determines, e.g., calculates a received power in the CBRS band attributable to incumbent user, e.g. received power in the CBRS band attributable to incumbent user=total received power in the CBRS band–received power in the CBRS band attributable to CBSD base stations. In some embodiments, the power measurements are performed during intervals in which pilot or other known strength signals are transmitted by the base stations, e.g., the CBSDs.

In some embodiments, steps 818, 820 and 822 are performed multiple time, each iteration generating a power level value attributable to incumbent user, and then step 824 is performed. In some embodiments, one pass of steps 818, 820 and 822 is performed and then operation proceeds to step 826.

In step 824 the UE processes, e.g., averages, multiple determined received power values attributed to incumbent user to determine a received power value attributable to incumbent user to be reported to the base station. Operation proceeds from step 824 to step 826.

In step 826 the base station sends a message to base station, e.g. the CBSD, which commanded the UE into sensor mode, reporting the determined, e.g. calculated received power in the CBRS band attributable to incumbent user.

Figure 9:
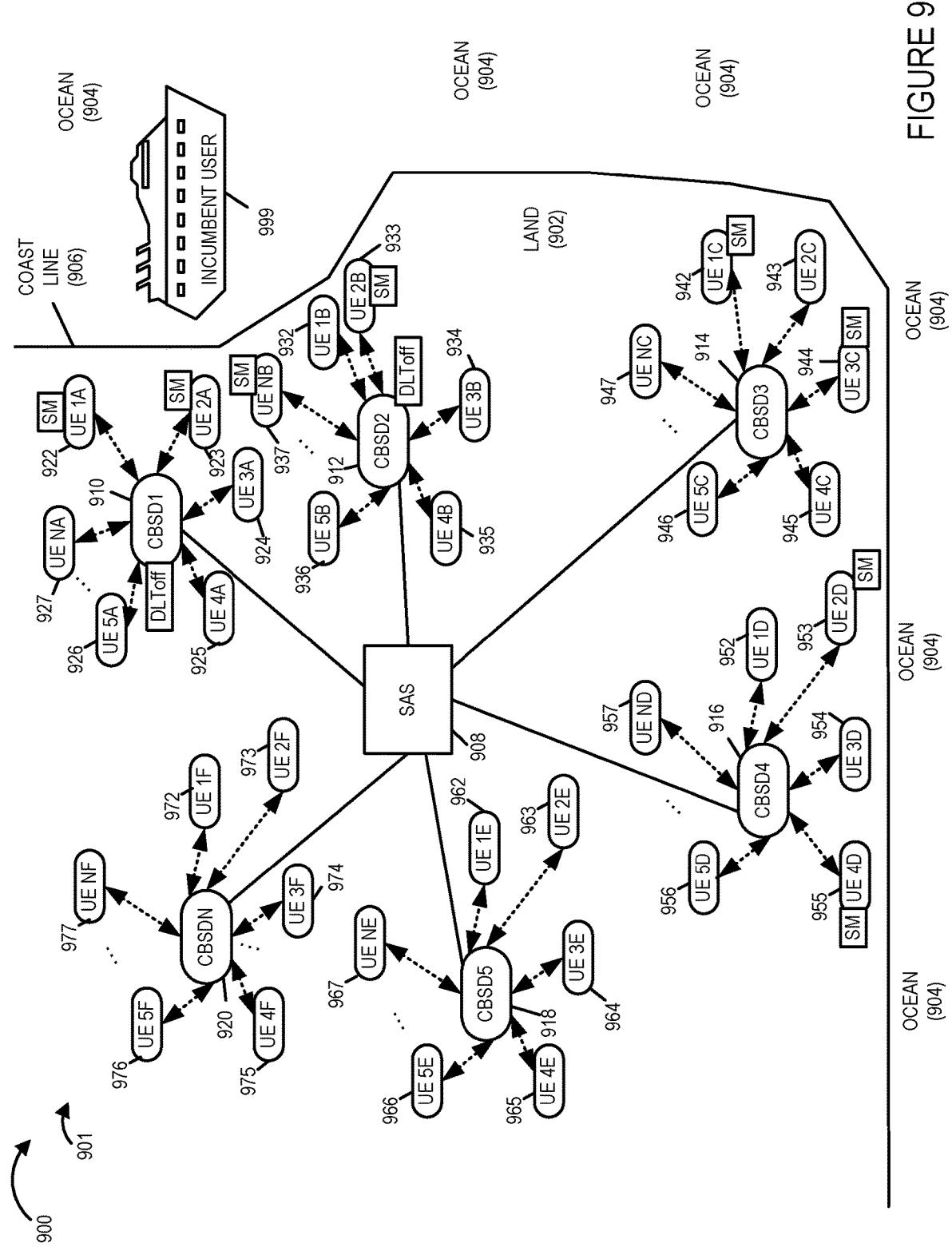
FIG. 9 is a drawing illustrating an exemplary communications system in accordance with an exemplary embodiment, which uses selected user equipment (UE) devices as sensor devices to measure received signals in a CBRS band, which may and sometimes do, include signals transmitted by an incumbent user, and which responds to a detected incumbent user by turning off downlink traffic at one or more base stations, e.g. CBSDs, in the vicinity of the incumbent user.

Although the flowchart of FIG. 8 has been described in terms of power measurements, it should be appreciated that energy measurements can also alternatively be measured and reported, e.g., with the energy measurement values corresponding to a predetermined time duration which known to the UE and base station FIG. 9 is a drawing 900 illustrating an exemplary communications system 901 in accordance with an exemplary embodiment, which uses selected user equipment (UE) devices as sensor devices to measure received signals in a CBRS band, which may and sometimes do, include signals transmitted by an incumbent user, and which responds to a detected incumbent user by turning off downlink traffic at one or more CBSDs, in the vicinity of the detected incumbent user. The exemplary communications system 901 shown in FIG. 9 includes a SAS 908, coupled to a plurality of CBSDs (CBSD 1 910, CBSD 2 912, CBSD 3 914, CBSD 4 916, CBSD 5 918, . . . , CBSD N 910) coupled together as shown. CBSDs (CBSD 1 910, CBSD 2 912, CBSD 3 914, CBSD 4 916) are consider by the SAS 908 to be coastal CBSDs and have been selected by the SAS 908 to: i) control selected UEs to operate as sensor devices and ii) to report determined power and/or determined energy level values attributed to incumbent user to the SAS for evaluation. In this example, CBSD 1 910 and CBSD 2 912 correspond to a first coast area and CBSD 3 and CBSD 4 916 correspond to a second coast area, said first and second coastal areas being disjoint coastal areas along coast line 906. Coast line 906 separates land 902 from ocean 904. CBSD 5 918 and CBSD N 920 are considered by the SAS 908 to be inland CBSDs and do not participate in the monitoring for incumbent users.

The exemplary system 901 of FIG. 9 further includes a plurality of UEs, e.g., cell phones. As shown in FIG. 9 UEs (UE 1A 922, UE 2A 923, UE 3A 924, UE 4A 925, UE 5A 926, . . . , UE NA 927) are coupled to CBSD 1 910. As shown in FIG. 9 UEs (UE 1B 932, UE 2B 933, UE 3B 934, UE 4B 935, UE 5B 936, . . . , UE NB 937) are coupled to CBSD 2 912. As shown in FIG. 9 UEs (UE 1C 942, UE 2C 943, UE 3C 944, UE 4C 945, UE 5C 946, . . . , UE NC 947) are coupled to CBSD 3 914. As shown in FIG. 9 UEs (UE 1D 952, UE 2D 953, UE 3D 954, UE 4D 955, UE 5D 956, . . . , UE ND 957) are coupled to CBSD 4 916. As shown in FIG. 9 UEs (UE 1E 962, UE 2E 963, UE 3E 964, UE 4E 965, UE 5E 966, . . . , UE NE 967) are coupled to CBSD 5 918. As shown in FIG. 9 UEs (UE 1F 972, UE 2F 973, UE 3F 974, UE 4F 975, UE 5F 976, . . . , UE NF 977) are coupled to CBSD N 920.

UE 1A 922 and UE 2A 923 have been selected and commanded by CBSD 1 910 to operate in sensor mode. UE NB 937 and UE 2B 933 have been selected and commanded by CBSD 2 912 to operate in sensor mode and are operating in sensor mode.

UE 1C 942 and UE 3C 944 have been selected and commanded by CBSD 3 914 to operate in sensor mode. UE 2D 953 and UE 4D 955 have been selected and commanded by CBSD 4 916 to operate in sensor mode and are operating in sensor mode.

Based on received signals measurements by UE 1A 922, UE 2A 923, UE NB 937 and UE 2B 933, and based on reported information from CBSD 1 910 and CBSD 2 912, SAS 908 has determined that a received power or received energy level value attributed to incumbent user(s) has exceeded a threshold, and the SAS has commanded CBSDs (CBSD1 910 and CBSD 2 912) to turn-off DL traffic in the CBRS communications band, and CBSD1 910 and CBSD 2 912 have suspended downlink traffic signaling. However; sensor mode related operation continue so that the SAS can determine when the incumbent user 999 has left the area, and then the SAS can command CBSD 1 910 and CBSD 2 912 to resume DL traffic signaling operations in the CBRS band. Thus incumbent user 999, which is in the vicinity of coastal region 1, is able to uses the CBRS band for its communications without excessive interference from CBSD 1 910 and CBSD 2 912, while it remains in the coastal region 1.

Based on received signals measurements by UE 1C 924, UE 3C 944, UE 2D 953 and UE 4D 955, and based on reported information from CBSD 4 916 and CBSD 3 914, SAS 908 has determined that a received power or received energy level value attributed to incumbent user(s) has not exceeded a threshold for shutting off downlink traffic. Therefore CBSD 3 914 and CBSD 4 916 continue operating communicating with their connected UEs, said communicating including sending downlink traffic signals and receiving uplink traffic signals.

It should be appreciated that the selection of a set of UEs by a coastal CBSD to operate in sensor mode may, and sometimes does, change over time, e.g., as conditions change, e.g., UEs change location, UE remaining battery power changes, and/or a UE changes its level of activity. In some embodiments, the coast CBSDs selects a set of UEs to operate in sensor mode in accordance with a location pattern specified by the SAS.

Figure 10:
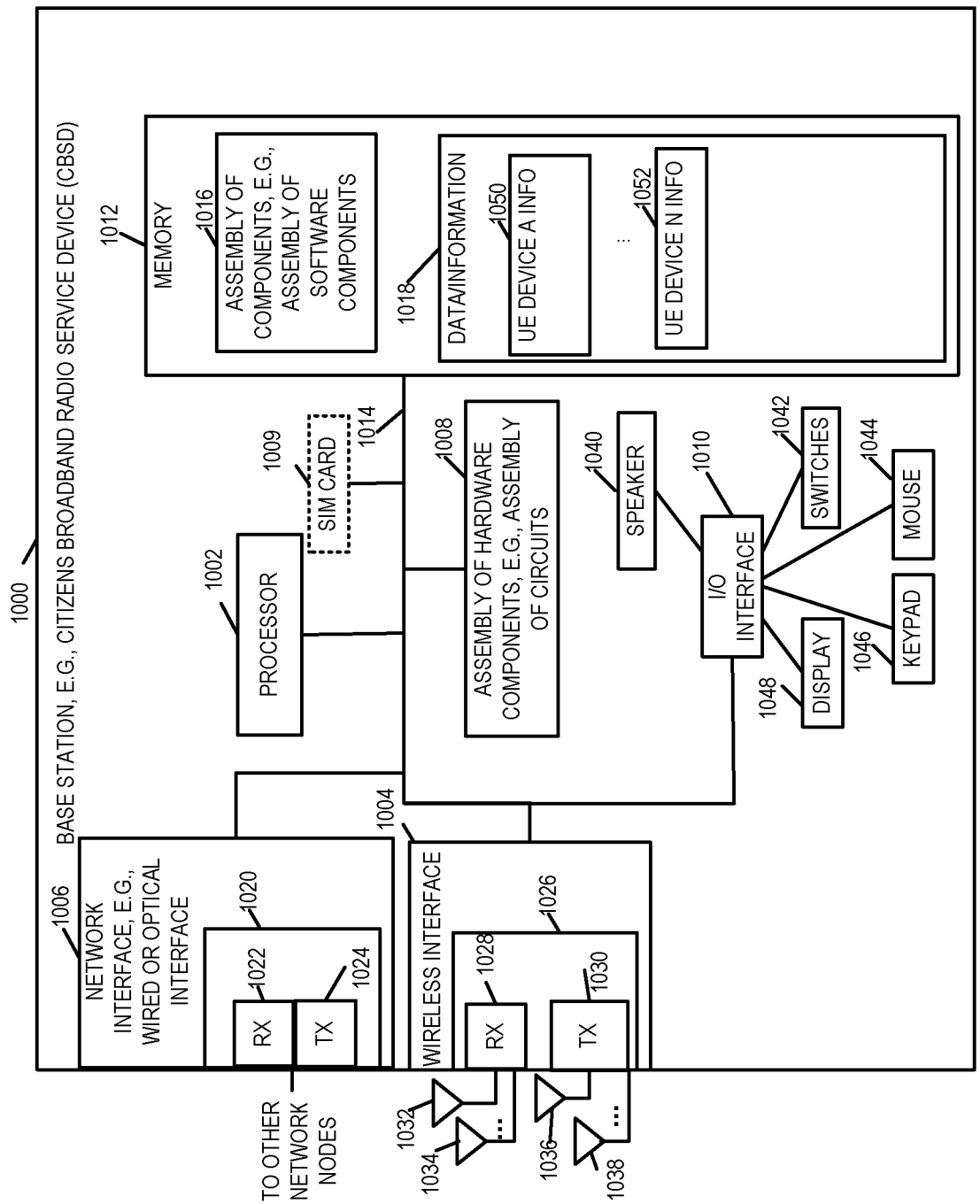
FIG. 10 is a drawing of an exemplary base station, e.g., an exemplary Citizens Broadband Radio Service Device (CBSD), in accordance with an exemplary embodiment.

FIG. 10 is a drawing of an exemplary base station 1000, e.g., an exemplary Citizens Broadband Radio Service Device (CBSD), in accordance with an exemplary embodiment. Exemplary base station 1000 is, e.g., any of CBSDs (102, 104) of FIG. 1, CBSD 210 of FIG. 2, any of CBSDs (304, 306, 308) of FIG. 3, a CBSD implementing steps of the method of FIG. 4, a base station, e.g., a first base station, e.g. a first CBSD, implementing steps of the method of FIG. 5, a base station, e.g. a CBSD implementing the steps of flowchart 700 of FIG. 7, and/or any of the CBSDs (910, 912, 914, 916) of FIG. 9 and/or a base station, e.g. a CBSD described with respect to any of the Figures. In some embodiments base station 1000 is a CBSD device which includes the capabilities of a CBSD as defined by the Federal Communications Commission's Rules with Regard to Commercial Operations in the 3550-3650 MHz Band. Exemplary base station 1000 includes a processor 1002, e.g., a CPU, wireless interface 1004, a network interface 1106, e.g., a wired or optical interface, an assembly of hardware components 1008, e.g., an assembly of circuits, an I/O interface 1010 and memory 1012 coupled together via a bus 1014 over which the various elements may interchange data and information. Base station 1000 further includes a speaker 1040, switches 1042, mouse 1044, keypad 1046 and a display 1048 coupled to I/O interface 1010, via which the various I/O devices (1040, 1042, 1044, 1046, 1048) may communicate with other elements (1002, 1004, 1006, 1008, 1012) of the base station 1000. Network interface 1006 includes a receiver 1022 and a transmitter 1024. In some embodiments, receiver 1022 and transmitter 1024 are part of a transceiver 1020. Wireless interface 1004 includes a wireless receiver 1028 and a wireless transmitter 1030. In some embodiments, receiver 1028 and transmitter 1030 are part of a transceiver 1026. In various embodiments, wireless interface 1004 includes a plurality of wireless receivers and a plurality of wireless transmitters. Wireless receiver 1028 is coupled to a plurality of receive antennas (receive antenna 1 1032, . . . , receive antenna M 1034), via which base station 1000 can receive wireless signals from other wireless communications devices including UE devices, e.g., cell phones. Wireless transmitter 1030 is coupled to a plurality of wireless transmit antennas (transmit antenna 1 1036, . . . , transmit antenna N 1038) via which the base station 1000 can transmit signals to other wireless communications devices including UE devices, e.g., cell phones. Exemplary base station 1000 in some embodiments includes a subscriber identification module (SIM) 1009, also known as a SIM card.

Memory 1012 includes an assembly of components 1016 e.g., an assembly of software components, and data/information 1018. Data/information 1018 includes UE device information corresponding to a plurality of user equipment devices (UE device A information 1050, UE device N information 1052 where A to N are the UE devices being serviced by the base station. The SIM card 460 is an integrated circuit that securely stores an international mobile subscriber identity (IMSI) number and its related key, which are used to identify and authenticate the base station. Through the use of the SIM card 460 the base station appears as a mobile user equipment device (UE) to a Mobile Virtual Network Operator (MVNO) network.

Figure 11:
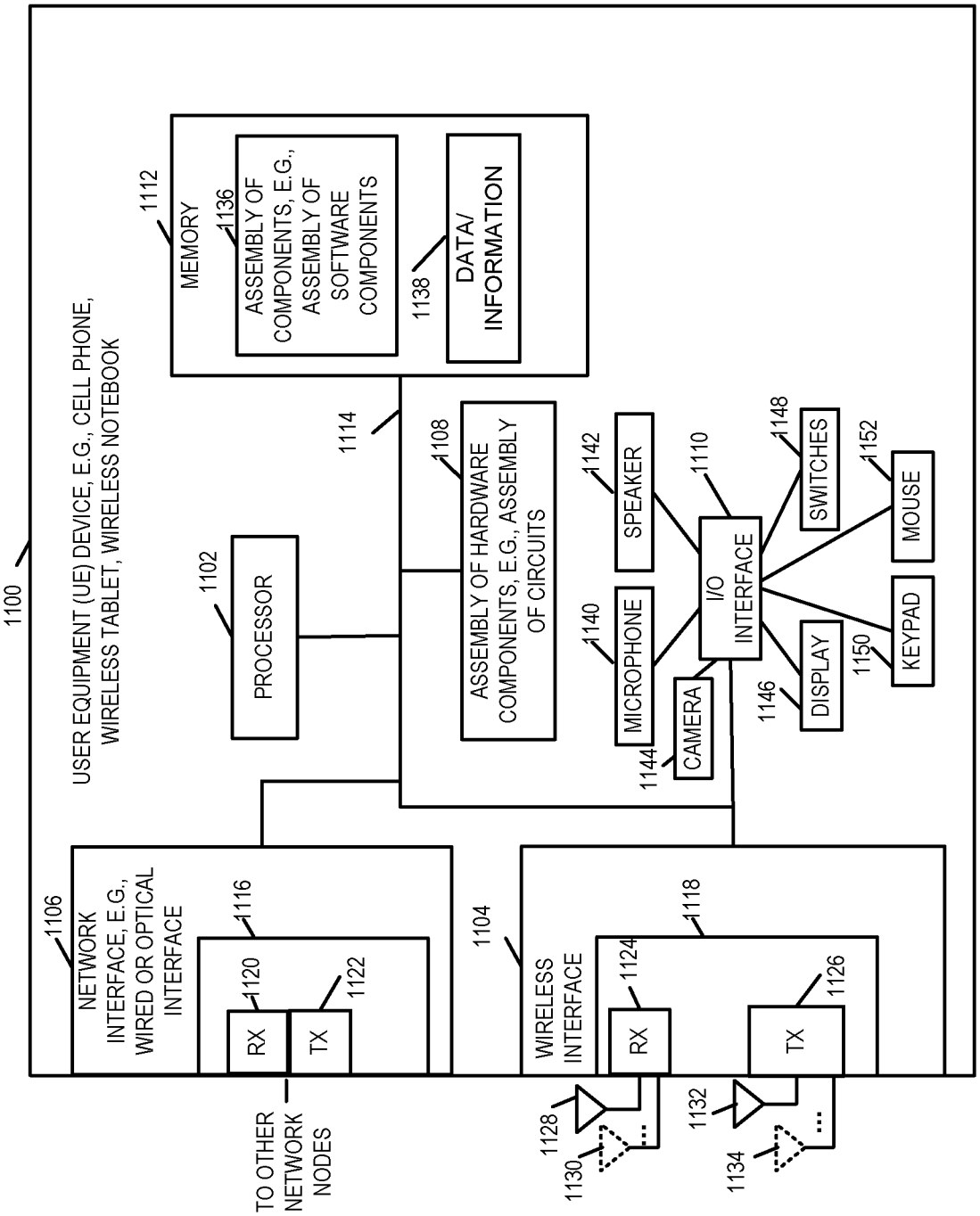
FIG. 11 is a drawing of an exemplary user equipment (UE) device, e.g., a cell phone, in accordance with an exemplary embodiment.
Figure 12:
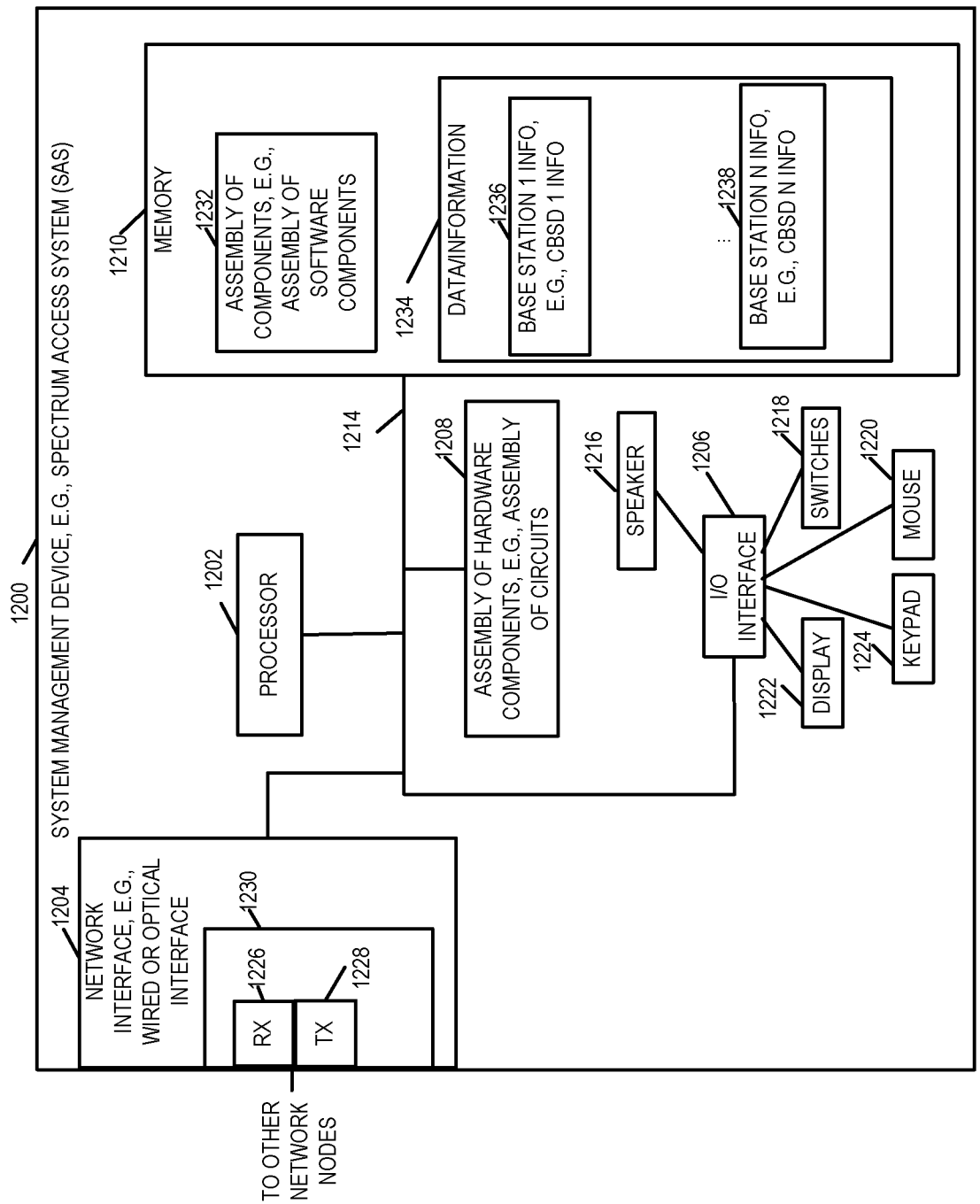
FIG. 12 is a drawing of an exemplary system management device, e.g., a Spectrum Access System (SAS) device, in accordance with an exemplary embodiment.

FIG. 11 is a drawing of an exemplary user equipment (UE) device 1100 in accordance with an exemplary embodiment. Exemplary UE device 1100 is, e.g., any of cell phones (106, 108, 110) of FIG. 1, cell phone 202 of FIG. 2, any of cell phones (310, 312, 314) of FIG. 3, a cell phone implementing steps or described in steps of the method of FIG. 4, a UE, e.g., a first UE, e.g. a first cell phone, implementing steps of the method of FIG. 5, a UE device, e.g. a cell phone implementing the steps of flowchart 800 of FIG. 8, and/or any of the UEs (922, 923, 924, 925, 926, 927, 942, 943, 944, 945, 946, 947, 952, 953, 954, 955, 956, 957, 962, 963, 964, 965, 966, 967, 972, 974, 975, 976, 977) of FIG. 9 and/or a UE device, e.g. a cell phone, described with respect to any of the Figures. UE device 1100 is, e.g., mobile device such as, e.g., a cell phone, a smart phone, wireless tablet or wireless notebook. UE device 1100, in some embodiments, includes Long Term Evolution (LTE), e.g., 4G LTE, mobile device capabilities. Exemplary UE device 1100 supports communications in a CBRS communications band. Exemplary UE device 1100 includes a processor 1102, e.g., a CPU, a wireless interface 1104, a network interface 1106, an assembly of hardware components 1108, e.g., an assembly of circuits, and I/O interface 1110 and memory 1112 coupled together via a bus 1114 over which the various elements may interchange data and information. UE device 1100 further includes a microphone 1140, speaker 1142, camera 1144, a display 1146, e.g., a touch screen display, switches 1148, keypad 1150 and mouse 1152 coupled to I/O interface 1110, via which the various I/O devices (1140, 1142, 1144, 1146, 1148, 1150, 1152) may communicate with other elements (1102, 1104, 1106, 1108, 1112) of the UE device 1100. Network interface 1106 includes a receiver 1120 and a transmitter 1122. In some embodiments, receiver 1120 and transmitter 1122 are part of a transceiver 1116. Wireless interface 1104 includes a wireless receiver 1124 and a wireless transmitter 1126. In some embodiments, receiver 1124 and transmitter 1126 are part of a transceiver 1118. In various embodiments, wireless interface 1104 includes a plurality of wireless receivers and a plurality of wireless transmitters. Wireless receiver 1124 is coupled to one or more receive antennas (receive antenna 1 1128, . . . , receive antenna M 1130), via which UE device 1100 can receive wireless signals from other wireless communications devices including, e.g., a base station, e.g., a CBSD transmitting into a CBRS band. Exemplary wireless signals received from a base station include, e.g., downlink traffic signals, pilot signals, and control signals including, e.g., a command to transition to a monitoring mode (sensor mode), a duration time to remain in the monitoring mode, measurement timing information and locations information (location pattern) to be used for performing monitoring and measurements with regard to incumbent user in a CBRS band. UE device 1100 may also receive signals from incumbent users, e.g., a ship off the coast, using spectrum in a CBRS communications band. Wireless transmitter 1126 is coupled to one or more wireless transmit antennas (transmit antenna 1 1132, . . . , transmit antenna N 1134) via which the UE device 1100 can transmit signals to other wireless communications device including a base station, e.g., a CBSD. Exemplary signals transmitted via wireless transmitter 1126 include, e.g., uplink traffic signals, signals conveying remaining battery power level, signals conveying a current state of operation of the UE, signals conveying location of the UE or information used to derive UE location, measurement information signals, e.g., power and/or energy measurement information, e.g., corresponding to a CBRS band being monitored by the UE, power and/or energy measurement information related to signals attributed to CBSDs, and a UE determined power or energy level attributed to incumbent user in a CBRS band. Memory 1112 includes an assembly of components 1136, e.g., an assembly of software components, and data/information 1138. FIG. 12 is a drawing of an exemplary system management device 1200, e.g., a Spectrum Access System (SAS) device, in accordance with an exemplary embodiment. Exemplary system management device 1200 is, e.g., SAS 208 of FIG. 2, SAS 302 of FIG. 3, a SAS implementing steps of the method of FIG. 4, a system management device, e.g. a SAS, implementing steps of the method of FIG. 5, a base station, e.g. a system management device, e.g., a SAS, implementing the steps of flowchart 600 of FIG. 6, and/or SAS 908 of FIG. 9 and/or a system management device, e.g. a SAS, described with respect to any of the Figures. The system management device 1200, in some embodiments, includes the capabilities of a SAS as defined by the Federal Communications Commission's Rules with Regard to Commercial Operations in the 3550-3650 MHz Band. Exemplary system management device 1200 includes a processor 1202, e.g., a CPU, a network interface 1204, e.g., a wired or optical interface, an I/O interface 1206, an assembly of hardware components 1208, e.g., an assembly of circuits, and memory 1210 coupled together via a bus 1214 over which the various elements may interchange data and information. The system management device 1200 further includes a speaker 1216, a switches 1218, mouse 1220, display 1222 and keypad 1224 coupled to I/O interface 1206, via which the various I/O devices (1216, 1218, 1220, 1222, 1224) may communicate with other elements (1202, 1204, 1208, 1210) of the system management device 1200. Network interface 1204 includes a receiver 1226 and a transmitter 1228. The network interface 1204 is typically used to communicate with other SAS devices and base stations, e.g. CBSDs. In some embodiments, receiver 1226 and transmitter 1228 are part of a transceiver 1230. Memory 1210 includes an assembly of component 1232, e.g., an assembly of software components, and data/information 1234. Data/information 616 includes base station, e.g., CBSD, information corresponding to a plurality of base stations, e.g., CBSDs (base station 1 information 1236, e.g., CBSD 1 information, . . . , base station 2 information 1238, e.g., CBSD 2 information).

Figure 13A:
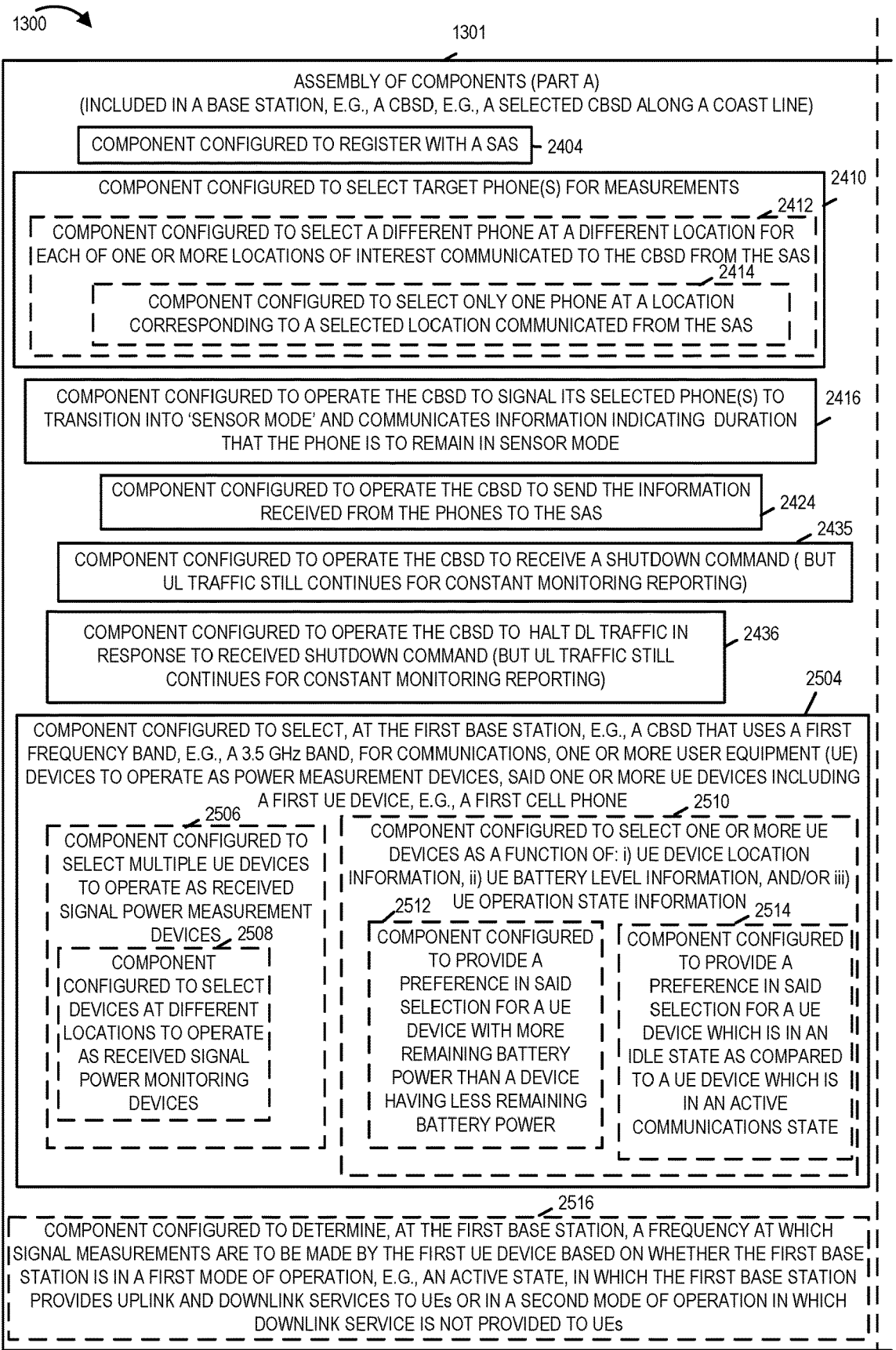
FIG. 13A is a drawing of a first part of an exemplary assembly of components which may be included in an exemplary base station, e.g., CBSD, in accordance with an exemplary embodiment.
Figure 13B:
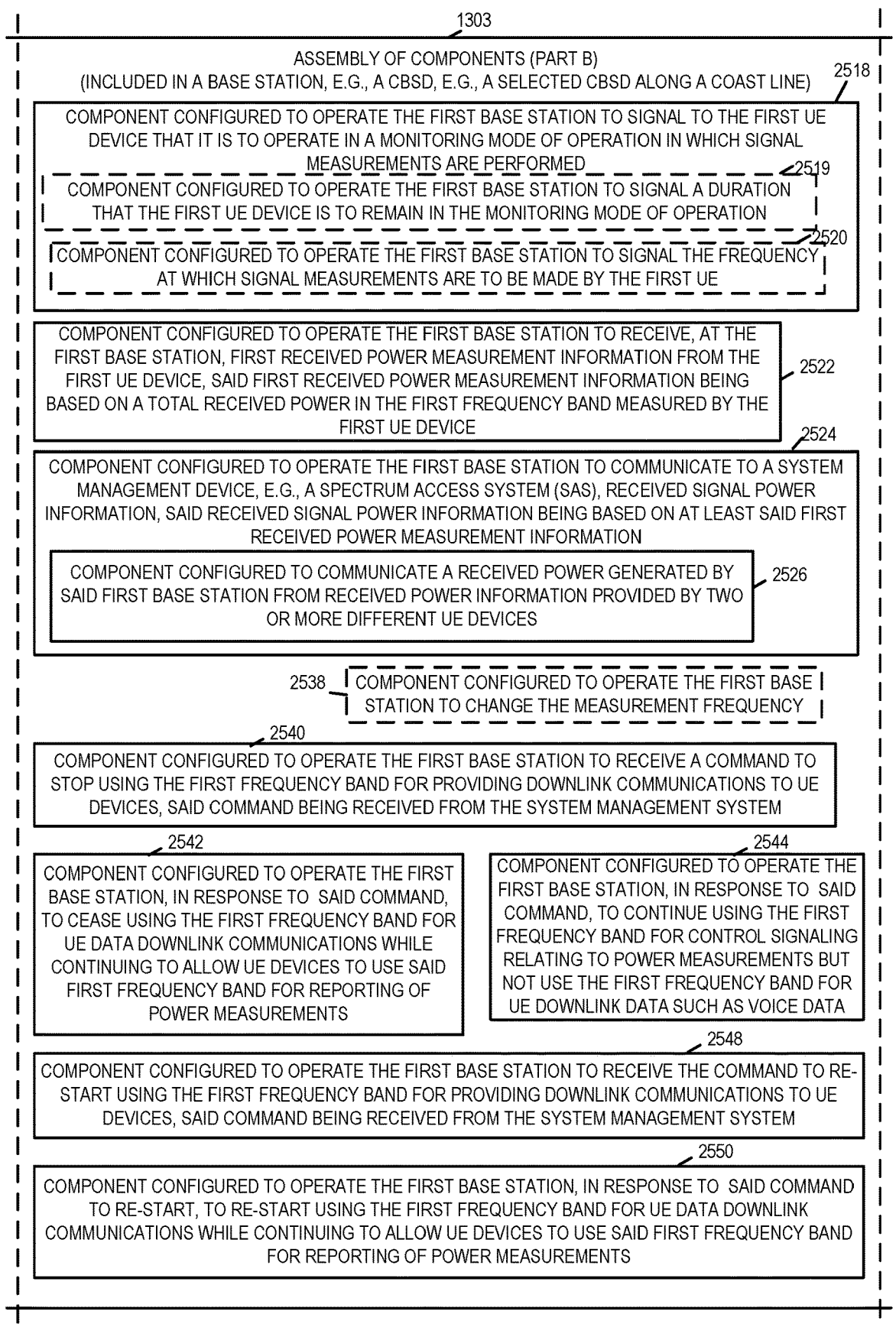
FIG. 13B is a drawing of a second part of an exemplary assembly of components which may be included in an exemplary base station, e.g., CBSD, in accordance with an exemplary embodiment.
Figure 13C:
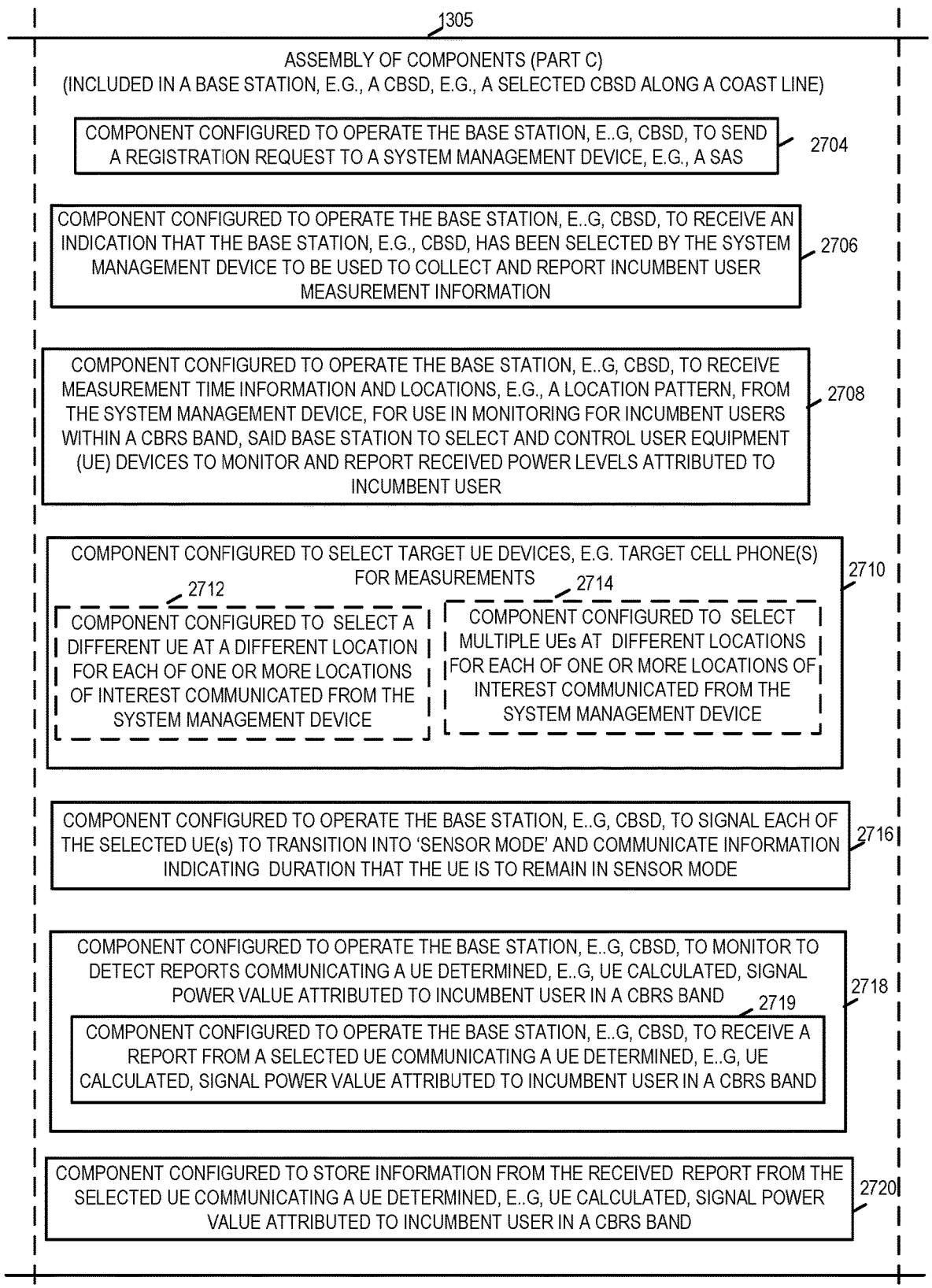
FIG. 13C is a drawing of a third part of an exemplary assembly of components which may be included in an exemplary base station, e.g., CBSD, in accordance with an exemplary embodiment.
Figure 13D:
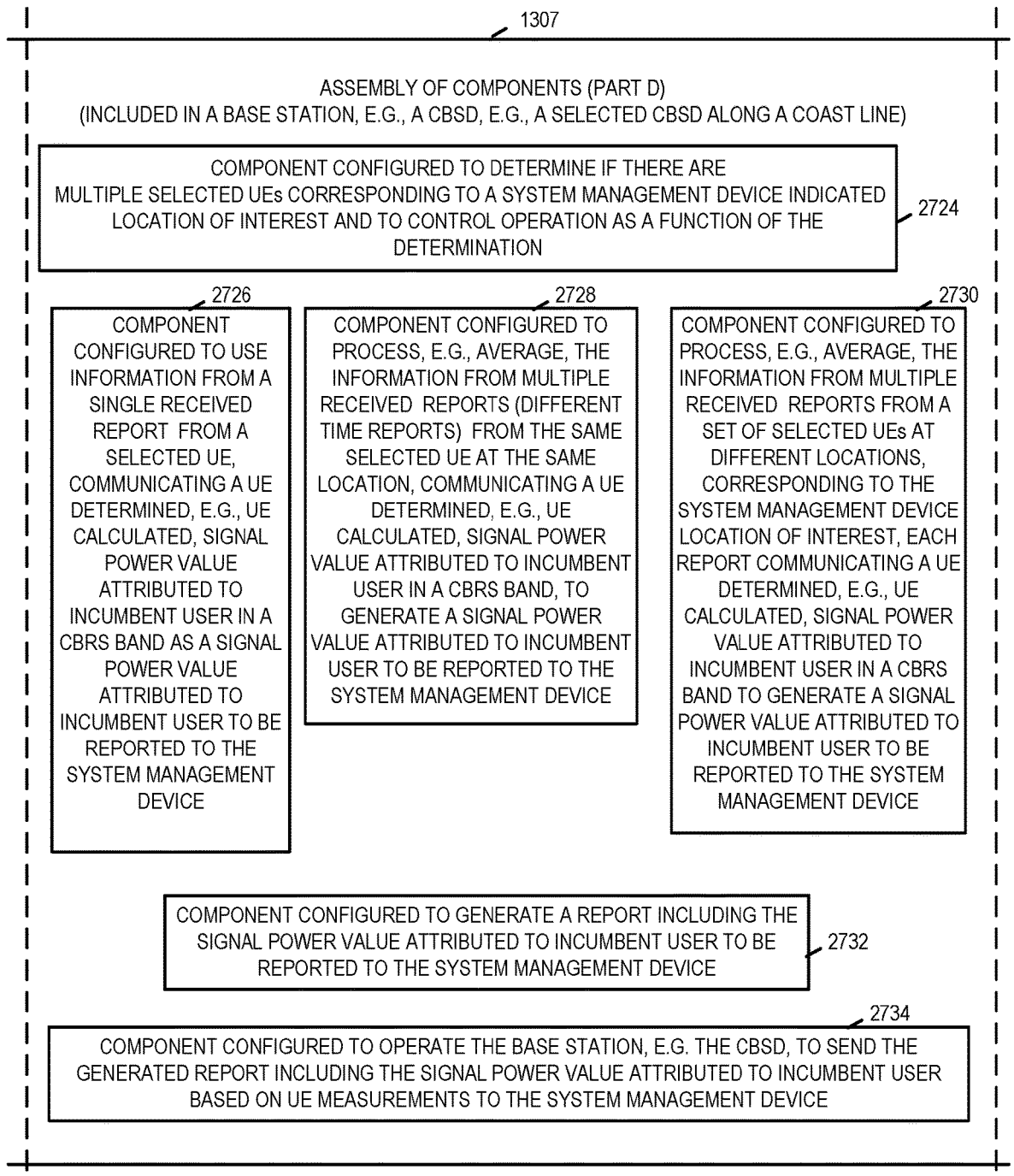
FIG. 13D is a drawing of a fourth part of an exemplary assembly of components which may be included in an exemplary base station, e.g., CBSD, in accordance with an exemplary embodiment.
Figures 13, 13E:
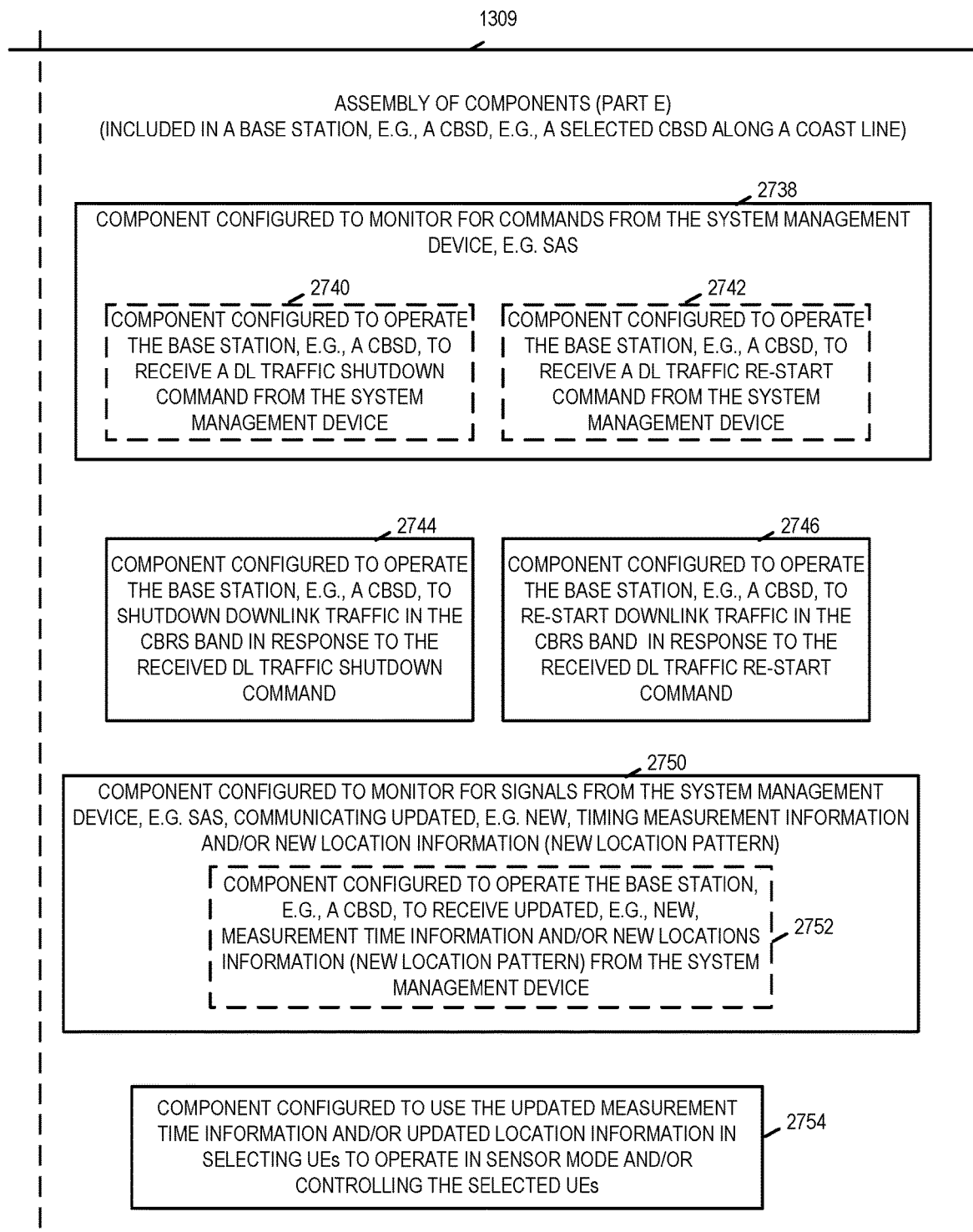
FIG. 13E is a drawing of a fifth part of an exemplary assembly of components which may be included in an exemplary base station, e.g., CBSD, in accordance with an exemplary embodiment.
FIG. 13 comprises the combination of FIG. 13A, FIG. 13B, FIG. 13C, FIG. 13D and FIG. 13E.

FIG. 13, comprising the combination of FIG. 13A, FIG. 13B, FIG. 13C, FIG. 13D and FIG. 13E, is a drawing of an exemplary assembly of components 1300, comprising the combination of Part A 1301, Part B 1303, Part C 1305, Part D 1307 and Part E 1309, which may be included in an exemplary base station, e.g., a CBSD, e.g., a selected CBSD along a coast line, in accordance with an exemplary embodiment. Exemplary assembly of components 1300 is, e.g., included in base station 1000, e.g., a CBSD, any of CBSDs (102, 104) of FIG. 1, CBSD 210 of FIG. 2, any of CBSDs (304, 306, 308) of FIG. 3, a CBSD implementing steps of the method of FIG. 4, a base station, e.g., a first base station, e.g. a first CBSD, implementing steps of the method of FIG. 5, a base station, e.g. a CBSD implementing the steps of flowchart 700 of FIG. 7, and/or any of the CBSDs (910, 912, 914, 916) of FIG. 9 and/or a base station, e.g. a CBSD described with respect to any of the Figures.

FIG. 13 is a drawing of an exemplary assembly of components 1300 which may be included in an exemplary base station, e.g., CBSD, 1000 of FIG. 10, in accordance with an exemplary embodiment. The components in the assembly of components 1300 can, and in some embodiments are, implemented fully in hardware within a processor, e.g., processor 1002, e.g., as individual circuits. The components in the assembly of components 1300 can, and in some embodiments are, implemented fully in hardware within the assembly of hardware components 1008, e.g., as individual circuits corresponding to the different components. In other embodiments some of the components are implemented, e.g., as circuits, within processor 1002 with other components being implemented, e.g., as circuits within assembly of components 1008, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1012 of the base station 1000, with the components controlling operation of base station 1000 to implement the functions corresponding to the components when the components are executed by a processor e.g., processor 1002. In some such embodiments, the assembly of components 1300 is included in the memory 1012 as assembly of software components 1016. In still other embodiments, various components in assembly of components 1300 are implemented as a combination of hardware and software, e.g., with another circuit external to the processor providing input to the processor which then under software control operates to perform a portion of a component's function. When implemented in software the components include code, which when executed by a processor, e.g., processor 1002, configure the processor to implement the function corresponding to the component. In embodiments where the assembly of components 1300 is stored in the memory 1012, the memory 1012 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 13 control and/or configure the base station 1000 or elements therein such as the processor 1002, to perform the functions of corresponding steps illustrated and/or described in the method of one or more of the flowcharts, signaling diagrams and/or described with respect to any of the Figures. Thus the assembly of components 1300 includes various components that perform functions of corresponding one or more described and/or illustrated steps of an exemplary method.

Assembly of components 1300 includes a component 2404 configured to register the base station, e.g., CBSD, with a system management device, e.g. a SAS, and a component 2410 configured to select target phone(s) for measurements. Component 2410 includes a component 2412 configured to select a different phone at a different location for each of one or more locations of interest communicated to the CBSD from the SAS. Component 2412 includes a component 2414 configured to select only one phone at a location corresponding to a selected location communicated from the SAS. Assembly of components 1300 further includes a component 2416 configured to operate the CBSD to signal its selected phone(s) to transition into "sensor mode' and communicate information indicating duration that the phone is to remain in sensor mode, a component 2424 configured to operate the CBSD to send the information, e.g., measurement information and/or measurement derived information, received from the phones to the SAS, a component 2435 configured to operate the CBSD to receive a shutdown command (but uplink UL traffic still continues for constant monitoring reporting), and a component 2436 configured to operate the CBSD to halt downlink (DL) traffic in response to the received shutdown command (but UL traffic still continues for constant monitoring reporting).

Assembly of components 1300 further includes a component 2504 configured to select, at the first base station, e.g., a CBSD that uses a first frequency band, e.g., a 3.5 GHz band, for communications, one or more user equipment (UE) devices to operate as power measurement devices, said one or more UE devices including a first UE device, e.g., a first cell phone. Component 2504, in some embodiments, includes a component 2506 configured to select multiple UE devices to operate as received signal measurement devices. Component 2506 includes a component 2508 configured to select devices at different locations to operate as received signal power monitoring devices. In some embodiments, component 2504 includes a component 2510 configured to select one or more UE devices as a function of: UE device location, ii) UE battery level information, and/or iii) UE operation state information. In some embodiments, component 2510 includes one or both of a component 2512 configured to provide a preference in said selection for a UE device with more battery power than a device having less remaining battery power, and a component 2514 configured to provide a preference in said selection for a UE device which is in an idle stat as compared to a UE device which is in an active communications state. In some embodiments, assembly of components 1300 includes a component 2516 configured to determine, at the first base station, a frequency at which signal measurements are to be made by the first UE device based on whether the first base station is in a first mode of operation, e.g., an active state, in which the first base station provides uplink and downlink services to UEs or in a second mode of operation in which downlink service is not provided to UEs. Assembly of components 1300 further includes a component 2518 configured to operate the first base station to signal the first UE device that it is to operate in a monitoring mode of operation in which signal measurements are performed. Component 2518 includes a component 2519 configured to operate the first base station to signal a duration that the first UE device is to remain in the monitoring mode of operation, and a component 2520 configured to operate the first base station to signal the frequency at which signal measurements are to be made by the first UE. Assembly of components 1300 further includes a component 2522 configured to operate the first base station to receive, at the first base station, first received power measurement information from the first UE device, said first received power measurement information being based on a total received power in the first frequency band measured by the first UE device. Assembly of components 1300 further includes a component 2524 configured to operate the first base station to communicate to a system management device, e.g., a spectrum access system (SAS), received signal power measurement information, said received signal power measurement information being based on at least said first received power measurement information. Component 2524 includes a component 2526 configured to operate the first base station to communicate a received power generated by said first base station from received power information provided by two or more different UE devices. Assembly of components 1300 further includes a component 2538 configured to change the measurement frequency, a component 2540 configured to operate the first base station to receive a command to stop using the first frequency band for providing downlink communications to UE devices, said command being received from the system management system, a component 2542 configured to operate the first base station, in response to said command to cease using the first frequency band for UE data downlink communications while continuing to allow UE devices to use said first frequency band for reporting of power measurements, a component 2544 configured to operate the first base station, in response to said command, to continue using the first frequency band for control signaling relating to power measurements by not use the first frequency band for UE downlink data such as voice data, a component 2548 configured to operate the first base station to receive the command to re-start using the first frequency band for providing downlink communications to UE devices, said command being received from the system management system, and a component 2550 configured to operate the first base station, in response to said command to re-start, to re-start using the first frequency band for UE data downlink communications while continuing to allow UE devices to uses said first frequency band for reporting of power measurements.

Assembly of components 1300 includes a component 2704 configured to operate the base station, e.g., a CBSD, to send a registration request to a system management device, e.g., a SAS, a component 2706 configured to operate the base station, e.g., a CBSD, to receive an indication that the base station, e.g., CBSD, has been selected by the system management device to be used to collect and report incumbent user measurement information, and a component 2708 configured to receive measurement time information and locations, e.g. a location pattern, from the system management device, for use in monitoring for incumbent users in a CBRS band, said base station to select and control user equipment (UE) devices to monitor and report received power levels attributed to incumbent user. Component 1300 further includes a component 2710 configured to select target UE devices, e.g., target cell phones for measurements. Component 2710 includes one or both of a component 2712 configured to select a different UE at a different location for each of one or more location of interest communicated from the system management device and a component 2714 configured to select multiple UEs at different locations for each of one or more locations of interest communicated from the system management device.

Assembly of components 1300 further includes a component 2716 configured to operate the base station, e.g. CBSD, to signal each of the selected UEs to transition into 'sensor mode' and communicate information indicating the duration that the UE is to remain in sensor mode, a component 2718 configured to operate the base station, e.g., CBSD, to monitor to detect reports communicating a UE determined, e.g. UE calculated, signal power value attributed to incumbent users in a CBRS band. Component 2718 includes a component 2719 configured to operate the base station, e.g., CBSD, to receive a report from a selected UE communicating a UE determined, e.g., UE calculated, signal power measurement value attributed to incumbent user in a CBRS band, and a component 2720 configured to store information from the received report from the selected UE communicating a UE determined, e.g., UE calculated, signal power value attributed to incumbent user in a CBRS band. Assembly of components 1300 further includes a component 2724 configured to determine if there are multiple selected UEs corresponding to a system management device indicated location of interest and to control operation as a function of the determination, a component 2726 configured to use information from a single received report from a selected UE communicating a UE determined, e.g., UE calculated, signal power value attributed to incumbent user in a CBRS band as a signal power value attributed to incumbent user to be reported to the system management device, a component 2728 configured to process, e.g., average, the information from multiple received reports (different time reports) from the same selected UE at the same location, communicating a UE determined, e.g., UE calculated, signal power value attributed to incumbent user in a CBRS band, to generated signal power value attributed to incumbent user to be reported to the system management devices, and a component 2730 configured to process, e.g. average, the information from multiple received reports from a set of selected UEs at different locations, corresponding to the system management device location of interest, each report communicating a UE determined, e.g., UE calculated, signal power value attribute to include user in a CBRS band to generate a signal power value attributed to incumbent user to be reported to the system management device. Assembly of components 1300 further includes a component 2732 configured to generate a report including the signal power value attributed to incumbent user to be reported to the system management device and a component 2734 configured to operate the base station, e.g., CBSD, to send the generated report including the signal power value attributed to incumbent user based on measurements toe the system management device. Assembly of components 1300 further includes a component 2738 configured to monitor for commands from the system management device, e.g., a SAS. Component 2738 includes a component 2740 configured to operate the base station, e.g., CBSD, to received a DL traffic shutdown command from the system management device and a component 2742 configured to operate the base station, e.g., a CBSD, to receive a DL traffic re-start command from the system management device. Assembly of component 1300 further includes a component 2744 configured to operate the base station, e.g., a CBSD, to shown down downlink traffic in the CBRS band in response to the received DL traffic shutdown command, and a component 2746 configured to operate the base station, egg., a CBSD, to re-start downlink traffic in the CBRS band in response to the received DL traffic re-start command. Assembly of components 1300 further includes a component 2750 configured to monitor for signals from the system management device, e.g., a SAS, communicating update, e.g., new, timing measurement information and/or new location information (e.g., a new location pattern). Component 2750 includes a component 2750 configured to operate the base station, e.g., a CBSD, to receive updated, e.g., new measurement information and/or new location information (new location pattern) from the system management device, Assembly of components 1300 further includes a component 2754 configured to use the updated measurement time information and/or updated location information in selecting UEs to operate in sensor mode and/or controlling the selected UEs.

Figure 14A:
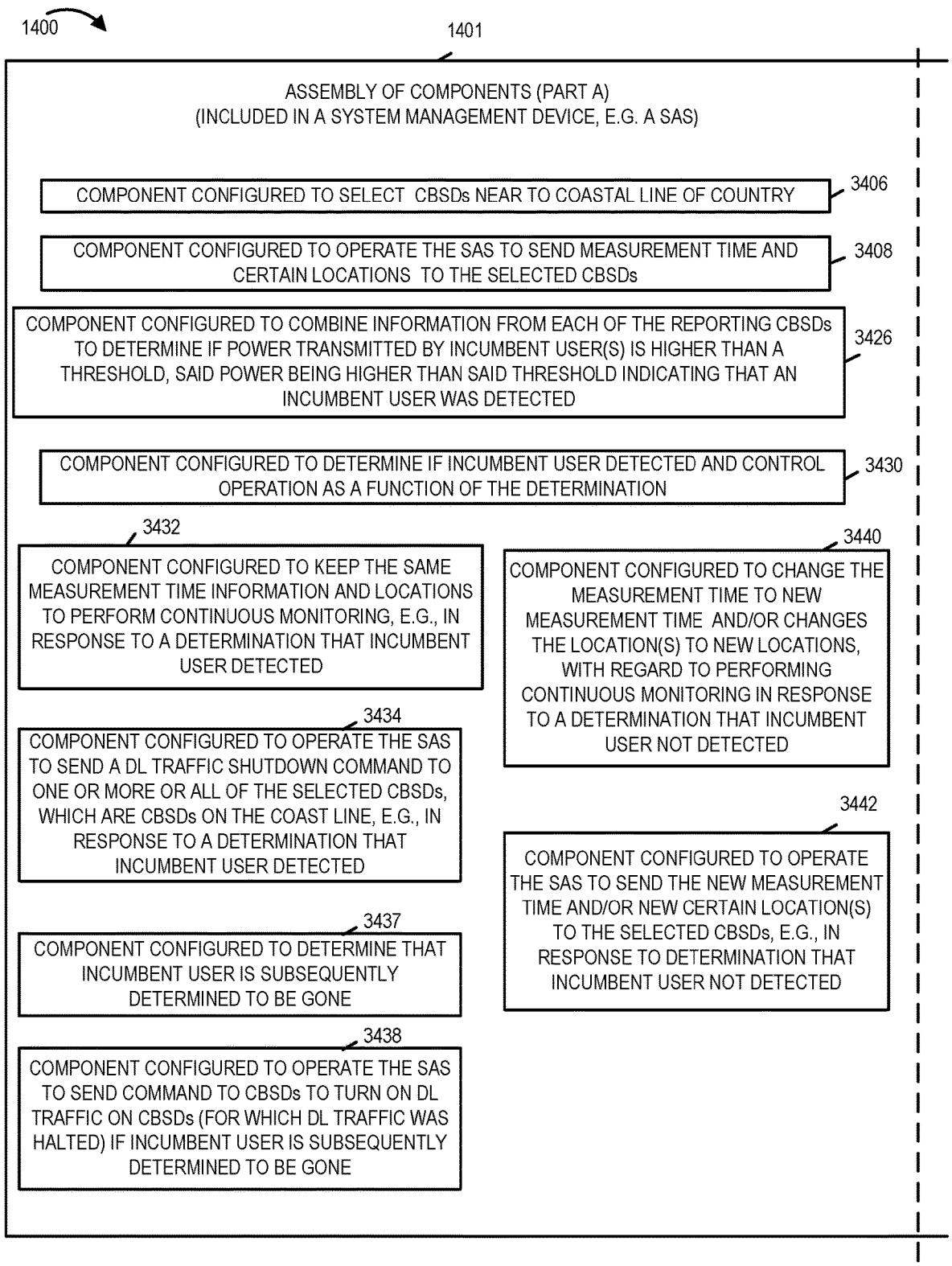
FIG. 14A is a drawing of a first part of an exemplary assembly of components which may be included in an exemplary system management device, e.g., a SAS, in accordance with an exemplary embodiment.
Figure 14B:
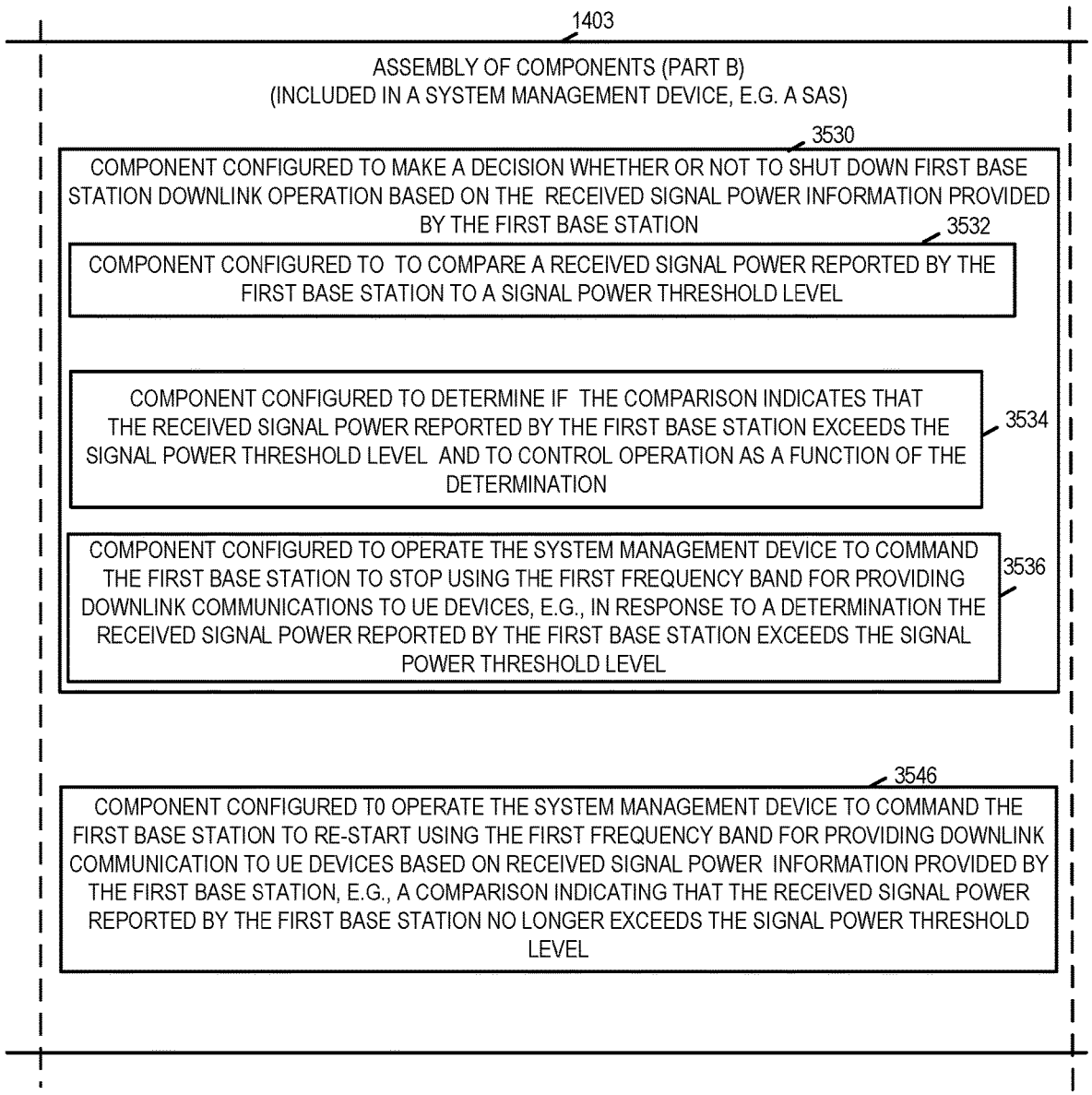
FIG. 14B is a drawing of a second part of an exemplary assembly of components which may be included in an exemplary system management device, e.g., a SAS, in accordance with an exemplary embodiment.
Figure 14C:
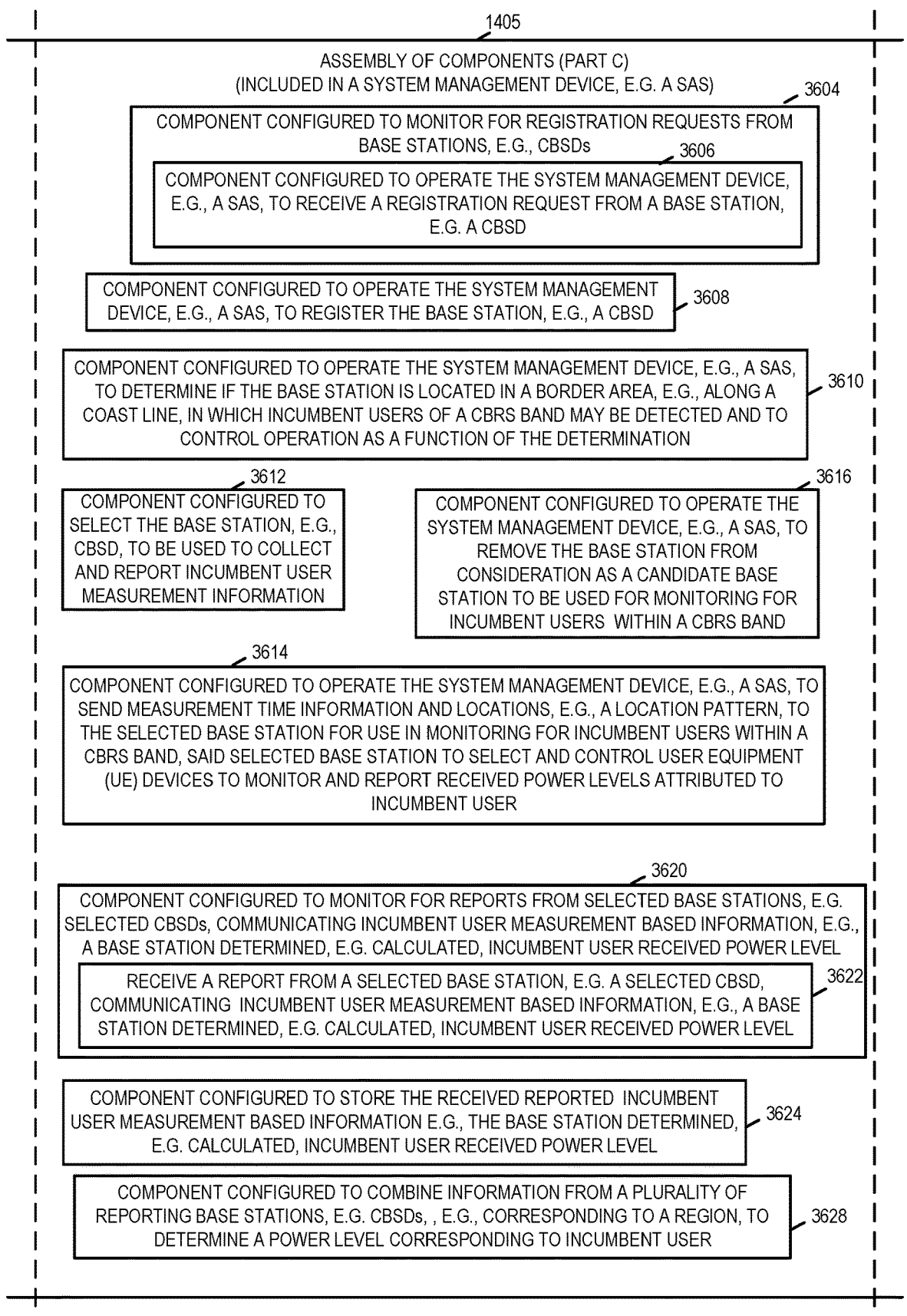
FIG. 14C is a drawing of a third part of an exemplary assembly of components which may be included in an exemplary system management device, e.g., a SAS, in accordance with an exemplary embodiment.
Figures 14, 14D:
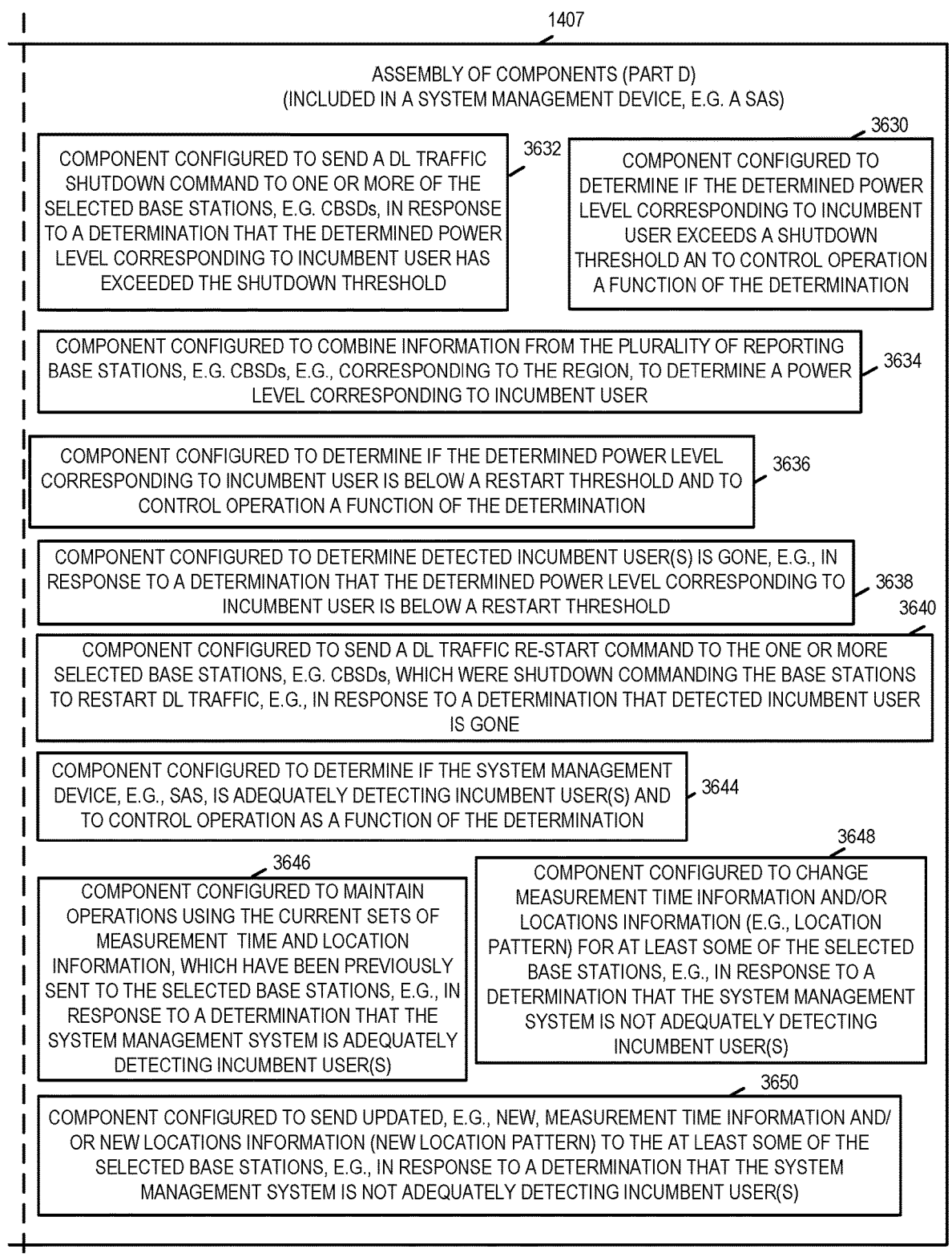
FIG. 14D is a drawing of a fourth part of an exemplary assembly of components which may be included in an exemplary system management device, e.g., a SAS, in accordance with an exemplary embodiment.
FIG. 14 comprises the combination of FIG. 14A, FIG. 14B, FIG. 14C and FIG. 14D.

FIG. 14, comprising the combination of FIG. 14A, FIG. 14B, FIG. 14C and FIG. 14D, is a drawing of an exemplary assembly of components 1400, comprising the combination of Part A 1401, Part B 1403, Part C 1405 and Part D 1407, which may be included in a system management device, e.g., a SAS, in accordance with an exemplary embodiment. Exemplary assembly of components 1400 is, e.g., included in, e.g., system management device 1200 of FIG. 12 e.g., a SAS, SAS 208 of FIG. 2, SAS 302 of FIG. 3, a SAS implementing steps of the method of FIG. 4, a system management device, e.g. a SAS, implementing steps of the method of FIG. 5, a base station, e.g. a system management device, e.g., a SAS, implementing the steps of flowchart 600 of FIG. 6, and/or SAS 908 of FIG. 9 and/or a system management device, e.g. a SAS, described with respect to any of the Figures.

FIG. 14 is a drawing of an exemplary assembly of components 1400 which may be included in an exemplary system management device, e.g., system management device 1200, e.g., a SAS, of FIG. 12, in accordance with an exemplary embodiment. The components in the assembly of components 1400 can, and in some embodiments are, implemented fully in hardware within a processor, e.g., processor 1202, e.g., as individual circuits. The components in the assembly of components 1400 can, and in some embodiments are, implemented fully in hardware within the assembly of hardware components 1208, e.g., as individual circuits corresponding to the different components. In other embodiments some of the components are implemented, e.g., as circuits, within processor 1202 with other components being implemented, e.g., as circuits within assembly of components 1208, external to and coupled to the processor 1202. As should be appreciated the level of integration of components on the processor and/or with some components being external to the processor may be one of design choice. Alternatively, rather than being implemented as circuits, all or some of the components may be implemented in software and stored in the memory 1210 of the system management device 1200, with the components controlling operation of system management device 1200 to implement the functions corresponding to the components when the components are executed by a processor e.g., processor 1202. In some such embodiments, the assembly of components 1400 is included in the memory 1210 as assembly of software components 1232. In still other embodiments, various components in assembly of components 1400 are implemented as a combination of hardware and software, e.g., with another circuit external to the processor providing input to the processor which then under software control operates to perform a portion of a component's function.

When implemented in software the components include code, which when executed by a processor, e.g., processor 1202, configure the processor to implement the function corresponding to the component. In embodiments where the assembly of components 1400 is stored in the memory 1210, the memory 1210 is a computer program product comprising a computer readable medium comprising code, e.g., individual code for each component, for causing at least one computer, e.g., processor 1202, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the system management device 1200 or elements therein such as the processor 1202, to perform the functions of corresponding steps illustrated and/or described in the method of one or more of the flowcharts, signaling diagrams and/or described with respect to any of the Figures. Thus the assembly of components 1400 includes various components that perform functions of corresponding one or more described and/or illustrated steps of an exemplary method.

Assembly of components 1400 includes a component 3406 configured to select CBSDs, e.g., CBSDs near the coast line of a country, a component 3408 configured to operate the SAS to send measurement time and certain locations to the selected CBSDs, a component 3426 configured to combine information for each of the reporting CBSDs to determine if power transmitted by incumbent user(s) is higher than a threshold, said power being higher than a threshold indicating that an incumbent user was detected, a component 3430 configured to determine if incumbent user detected and control operation as a function of the determination, a component 3432 configured to keep the same measurement time information and locations to perform continuous monitoring, in response to a determination that incumbent user was detected, a component 3434 configured to operate the SAS to send a DL traffic shutdown command to one or more or all of the selected CBSDs, which are CBSDs on the coast line, e.g., in response to a determination that incumbent user detected, a component 3437 configured to determine that the incumbent user is subsequently determined to be gone, a component 3738 configured to operate the SAS to send a command to CBSD(s) to turn on DL traffic on the CBSD(s) (for which DL traffic was previously halted) if incumbent user is subsequently determined to be gone, e.g. in response to incumbent user being subsequently determined to be gone, a component 3440 configured to change the measurement time to new measurement time and/or change the location(s) to new location(s) with regard to performing continuous monitoring in response to a determination that incumbent user is not detected, and a component 3442 configured to operate the SAS to send the new measurement time and/or new certain location(s) to the selected CBSDs, e.g., in response to a determination that incumbent user is not detected.

Assembly of components 1400 further includes a component 3530 configured to make a decision whether or not to shutdown first base station downlink operation based on the received signal power provided by the first base station and a component 3546 configured to operate the system management device to command the first base station to re-start using the first frequency band for providing downlink communion to UE devices based on received signal power information provided by the first base station, e.g., a comparison indication that the received signal power reported buy the first base station no longer exceeds the signal power threshold level.

Assembly of components 1400 includes a component 3604 configured to monitor for registration requests from base station, e.g., CBSDs. Component 3604 includes a component 3606 configured to operate the system management device, e.g., a SAS, to receive a registration request from a bases station, e.g. a CBSD. Assembly of components 1400 further includes a component 3608 configured to operate the system management device, e.g., a SAS, to register the base station, e.g., a CBSD, a component 3610 configured to operate the system management device, e.g., a SAS, to determine if the base station is located in a border areas, e.g., along a coast line, in which incumbent users of a CBRS band may be detected and to control operation as a function of the determination, a component 3612 configured to select the base station, e.g. CBSD, to be used to collect and report incument user measurement information, a component 3614 configured to operate the system management devices, e.g., a SAS, to send measurement information and locations, e.g., a location pattern, to the selected base station for use in monitoring for incumbent users within a CBRS band, said selected base station to select and control user equipment (UE) devices, e.g., cell phones, to monitor and report received power levels attributed to incumbent user, a component 3616 configured to operate the system management device, e.g., a SAS to remove the base station from consideration as a candidate base station to be used for monitoring for incumbent users with a CBRS band, e.g., in response to a determination that the base station is not location in a border area, e.g., along a coast line, e.g., the base station is an inland base station. Assembly of components 1400 further includes a component 3620 configured to monitor for reports from selected base station, e.g., selected CBSDs, communicating incumbent user measurement based information, e.g., a base station determined, e.g., calculated, incumbent user received power level. Component 3620 includes a component 3622 configured to receive a report from a selected base station, e.g., a selected CBSD, communicating incumbent user measurement based information, e.g., a base station determined, e.g., calculated, incumbent user received power level. Assembly of component 1400 further includes a component 3624 configured to store the received report4d incumbent user measurement based information, e.g., the base station determined, e.g. calculated, incumbent user received power level, a component 3628 configured to combine information from a plurality of reporting base stations, e.g. CBSDs, e.g., corresponding to a region, to determine a power level corresponding to incumbent user. Assembly of components 1400 further includes a component 3632 configured to send a DL traffic shutdown command to one or more or all of the selected base stations, e.g., CBSDs, in response to a determination that the determined power level corresponding to incumbent user has exceeded the shutdown threshold, a component 3634 configured to combine information from the plurality of reporting base stations, e.g. CBSDs, e.g., corresponding to a region, to determine a power level corresponding to incumbent user, a component 3636 configured to determine if the determined power level corresponding to incumbent user is below a restart threshold and to control operation as a function of the determination, a component 3638 configured to determine detected incumbent user(s) is gone, e.g., in response to a determination that the determined power level corresponding to incumbent user is below a restart threshold, a component 3640 configured to send a DL traffic re-start command to the one or more selected base stations, e.g. CBSDS, which were shut down commanding the base stations to re-start DL traffic, e.g., in respond to a determination that detected incumbent user is gone, a component 3644 configured to determine if the system management device, e.g., SAS, is adequately detecting incumbent user(s) and to control operation as a function of the determination, a component 3646 configured to maintain operation using the current sets of measurement time and location information, which have been previously sent to the selected base station, e.g., in response to a determination that the system management system is adequately detecting incumbent user(s), a component 3648 configured to change measurement time information and/or locations information (e.g., location pattern) for at least some of the selected base stations, e.g., in response to a determination that the system management system is not adequately detecting incumbent user(s), and a component 3650 configured to send updated, e.g. new measurement time information and/or new locations information (new location pattern) to the at least some of the selected base stations, e.g., in response to a determination that the system management system is not adequately detecting incumbent user(s).

Figure 15A:
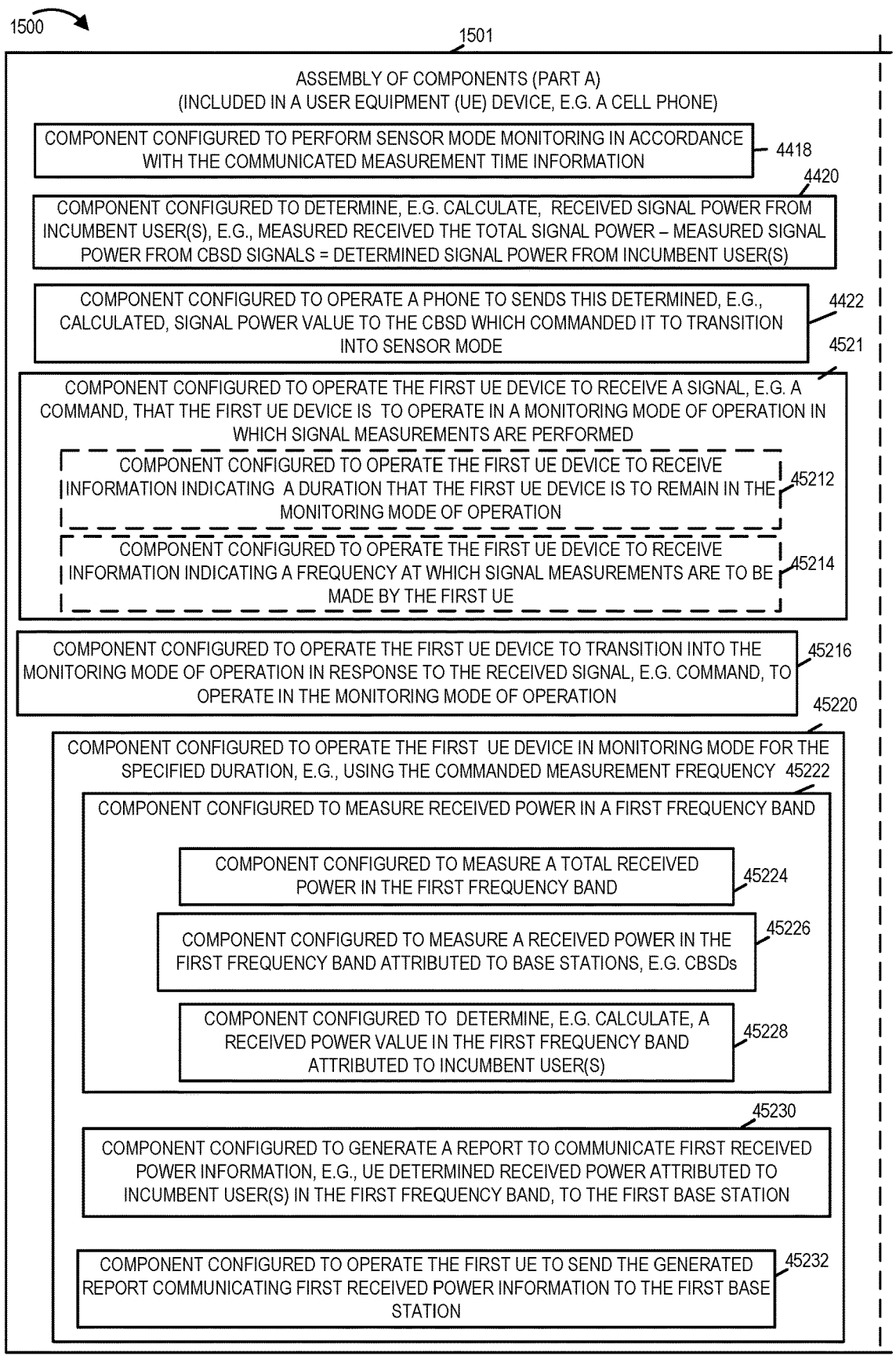
FIG. 15A is a drawing of a first part of an exemplary assembly of components which may be included in an exemplary user equipment (UE) device, e.g., a cell phone, in accordance with an exemplary embodiment.

FIG. 15, comprising the combination of FIG. 15A and FIG. 15, is drawing of an assembly of components 1500, compromising the combination of Part A 1501 and Part B 1503, which may be included in a user equipment (UE) device, e.g. a cell phone, in accordance with an exemplary embodiment. Exemplary assembly of components 1500 is, e.g., included in UE device 1100, e.g., a cell phone, any of cell phones (106, 108, 110) of FIG. 1, cell phone 202 of FIG. 2, any of cell phones (310, 312, 314) of FIG. 3, a cell phone implementing steps or described in steps of the method of FIG. 4, a UE, e.g., a first UE, e.g. a first cell phone, implementing steps of the method of FIG. 5, a UE device, e.g. a cell phone implementing the steps of flowchart 800 of FIG. 8, and/or any of the UEs (922, 923, 924, 925, 926, 927, 942, 943, 944, 945, 946, 947, 952, 953, 954, 955, 956, 957, 962, 963, 964, 965, 966, 967, 972, 974, 975, 976, 977) of FIG. 9 and/or a UE device, e.g. a cell phone, described with respect to any of the Figures.

FIG. 15 is a drawing of an exemplary assembly of components 1500 which may be included in an exemplary user equipment (UE) device, e.g., UE device 1100 of FIG. 11, in accordance with an exemplary embodiment. The components in the assembly of components 1500 can, and in some embodiments are, implemented fully in hardware within a processor, e.g., processor 1102, e.g., as individual circuits. The components in the assembly of components 1100 can, and in some embodiments are, implemented fully in hardware within the assembly of hardware components 1108, e.g., as individual circuits corresponding to the different components. In other embodiments some of the components are implemented, e.g., as circuits, within processor 1102 with other components being implemented, e.g., as circuits within assembly of components 1108, external to and coupled to the processor 1102. As should be appreciated the level of integration of components on the processor and/or with some components being external to the processor may be one of design choice. Alternatively, rather than being implemented as circuits, all or some of the components may be implemented in software and stored in the memory 1112 of the UE device 1100, with the components controlling operation of UE device 1100 to implement the functions corresponding to the components when the components are executed by a processor e.g., processor 1102. In some such embodiments, the assembly of components 1500 is included in the memory 1112 as assembly of software components 1136. In still other embodiments, various components in assembly of components 1500 are implemented as a combination of hardware and software, e.g., with another circuit external to the processor providing input to the processor which then under software control operates to perform a portion of a component's function. When implemented in software the components include code, which when executed by a processor, e.g., processor 1102, configure the processor to implement the function corresponding to the component. In embodiments where the assembly of components 1500 is stored in the memory 1112, the memory 1112 is a computer program product comprising a computer readable medium comprising code, e.g., individual code for each component, for causing at least one computer, e.g., processor 1102, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 15 control and/or configure the UE device 1100 or elements therein such as the processor 1102, to perform the functions of corresponding steps illustrated and/or described in the method of one or more of the flowcharts, signaling diagrams and/or described with respect to any of the Figures. Thus the assembly of components 1500 includes various components that perform functions of corresponding one or more described and/or illustrated steps of an exemplary method.

Assembly of components 1500 includes a component 4418 configured to perform sensor mode monitoring in accordance with the communicated measurement time information, a component 4420 configured to determine, e.g. calculate, received signal power form incumbent user(s), e.g., measured received total signal power−measured signal power from CBSD signal=determined signal power from incumbent user(s). Assembly of components 1500 further includes a component 4422 configured to operate a UE, e.g. a phone, to send this determined, e.g., calculated, signal power value to the CBSD which commanded the UE into sensor mode.

Assembly of components 1500 further includes a component 4521 configured to operate a first UE device to receive a signal, e.g., a command, that the first UE device is to operate in a monitoring mode of operation in which signal measurements are performed. Component 4521 includes a component 45212 configured to operate the first UE device to receive information indicating a duration that first UE is to remain in the monitoring mode of operation, and component 45214 configured to operate the first UE device to receive information indicating a frequency at which signal measurements are to be made by the first UE device. Assembly of components 1500 further includes a component 45216 configured to operate the first UE device to transition into the monitoring mode of operation in response to the received signal, e.g., command, to operate in the monitoring mode of operation, a component 45220 configured to operate the first UE device in monitoring mode for the specified duration, e.g., using the commanded measurement frequency. Component 45220 includes a component 45222 configured to measure received power in a first frequency band, e.g. a first CBRS frequency band, e.g. a 3.5 GHz frequency band, a component 45224 configured to measure a total received power in the first frequency band, a component 45226 configured to measure a received power in the first frequency band attributed to base stations, e.g. CBSDs, and component 45228 configured to determine, e.g. calculate, a received power value in the first frequency band attributed to incumbent user(s). Assembly of components 1500 further includes a component 45230 configured to generate a report to communicate first received power, e.g. UE determined received power attributed to incumbent user(s) in the first frequency band, to the first base station, and a component 45232 configured to operate the first UE to send the generated report communicating the first received power information to the first base station.

Assembly of components 1500 further includes a component 4804 configured to operate the UE to connection to a base station, e.g., a CBSD, a component 4806 configured to operate the UE in normal mode, a component 4808 configured to operate the UE to monitor for a signal from a base station, e.g. a CBSD, to which the UE is connected commanding the UE to enter sensor mode. Component 4808 includes a component 4810 configured to operate the UE to receive a signal from a base station, e.g., a CBSD, to which the UE is connected, commanding the UE to enter sensor mode. Assembly of components 1500 further includes a component 4812 configured to operate the UE to received information indicating the duration that the UE should remain in sensor mode, a component 4814 configured to transition the UE into sensor mode, and a component 4816 configured to operate the UE in sensor mode for the indicated duration. Component 4816 includes a component 4818 configured to measure total received power in a CBRS band, a component 4820 configured to measure received power in the CBRS band attributable to base stations, e.g., CBSDs, e.g., based on received pilot signal and/or other know signals being transmitted by the CBSDS, and a component 4822 configured to determine, e.g. calculate a received power attributable to incumbent user, a component 4824 configured to process, e.g. average, multiple determined received power values attributable to incumbent user to determine a received power value attributable to incumbent user to report to the base station, and a component 4826 configured to operate the UE to send a message to base station, e.g. CBSD, reporting the determined, e.g., calculated, received power in the CBRS band attributable to incumbent user.

Numbered List of Exemplary Method Embodiments:

Method Embodiment 1 A method, the method comprising: selecting (504), at a first base station (e.g., a first CBSD) that uses a first frequency band for communication (e.g., 3.5 GHz band used for CBSD communication), one or more user equipment (UE) devices (e.g., cell phones) to operate as power measurement devices, said one or more UE devices including a first UE device (e.g. a first cell phone); receiving (522), at the first base station, first received power measurement information from the UE device, said first received power measurement information being based on a total received power in the first frequency band measured by the first UE device; and communicating (524) to a system management device (e.g., a SAS), received signal power information, said received signal power information being based on at least said first received power measurement information.

Method Embodiment 2 The method of Method Embodiment 1, further comprising: operating the first base station to signal (518) to the first UE device that it is to operate in a monitoring mode of operation (sensor mode) in which signal measurements are performed.

Method Embodiment 3 The method of Method Embodiment 2, wherein signaling (518) to the first UE device that it is to operate in the monitoring mode of operation includes: signaling (520) a frequency at which signal measurements are to be made by the first UE device.

Method Embodiment 4 The method of Method Embodiment 3, further comprising: determining (516), at the first base station, (prior to signaling (520) the frequency at which signal measurements are to be made) the frequency at which signal measurements are to be made by the first UE based on whether the first base station (e.g., first CBSD) is in a first mode of operation (e.g., an active state) in which the first base station provides uplink and downlink services to UEs or in a second mode of operation (e.g., an inactive state) in which downlink service is not provided to UEs (the first base station (e.g., the first CBSD, has monitoring occur more frequently in some embodiments when it is in the inactive state with the hope that cell phones will rapidly detect that the first frequency band (a CBSD frequency band) has become available for use)

Method Embodiment 5 The method of Method Embodiment 1, wherein selecting (504) one or more UE devices includes: selecting (506) multiple UE devices to operate as received signal power monitoring devices.

Method Embodiment 6 The method of Method Embodiment 5, wherein selecting (506) multiple UE devices includes selecting (508) devices at different locations to operate as received signal power monitoring devices.

Method Embodiment 7 The method of Method Embodiment 6, wherein said selected one or more UE devices is a subset of UE devices attached to said first base station (wherein said one or more UE devices do not include at least some UE devices attached to said first base station and which are receiving service from the first base station).

Method Embodiment 8 The method of Method Embodiment 7, wherein said selecting (504) one or more UE devices is performed (510) as a function of: i) UE device location, ii) UE battery level information, and/or iii) UE operation state information (e.g., active or idle state information indicating what mode the UE is in).

Method Embodiment 9 The method of Method Embodiment 8 wherein said selecting (510) includes providing (512) a preference in said selection for a UE device with more remaining battery power (a first remaining battery power level) than a UE device having less remaining battery power (e.g., a second remaining battery power level which is lower than said first battery power level).

Method Embodiment 19 The method of Method Embodiment 8 wherein said selecting (510) includes providing (514) a preference in said selection for a UE device which is in an idle state (e.g., a device in which voice traffic is not supported) as compared to a UE device which is an active communications state (e.g., in which uplink voice traffic is supported).

In various embodiments a UE can report total received energy or total received energy less CBSD detected signal energy.

Method Embodiment 11 The method of Method Embodiment 6, wherein the first received power measurement information includes signal energy information indicating a first total received signal energy in the first frequency band.

Method Embodiment 12 The method of Method Embodiment 6, wherein the first received power measurement information includes signal energy information indicating a first total received signal energy in the first frequency band reduced by an amount of signal energy of CBSD signals (as determined from pilot signals measured by the first UE device (e.g., first cell phone), said pilot signals being received by the first UE device (e.g., first cell phone)).

Method Embodiment 13 The method of Method Embodiment 5, wherein communicating (524) to the system management device (e.g., a SAS), received signal power information includes: communicating (526) a received power generated by said first base station from received power information provided by two or more different UE devices.

Method Embodiment 14 The method of Method Embodiment 13, wherein said received signal power information includes an average received power generated by said first base station from multiple reported received powers.

Method Embodiment 15 The method of Method Embodiment 14, wherein said average power excludes from consideration received signal power corresponding to CBSD signals detected as being received by the UE devices providing the UEs reporting received signal power information.

Method Embodiment 16 The method of Method Embodiment 14, further comprising: operating (530) the system management device (e.g., a SAS) to make a decision whether or not to shut down first base station downlink operation based on the received signal power information provided by the first base station.

Method Embodiment 17 The method of Method Embodiment 16, wherein operating (530) the system management device (SAS) to make a decision whether or not to shut down first base station downlink operation based on the received signal power information provided by the first base station includes operating (532) the system management device to compare a received signal power reported by the first base station to a signal power level threshold.

Method Embodiment 18 The method of Method Embodiment 17 further comprising: operating (536) the system management system, in response to determining that the received signal power reported by the first base station exceeds the signal power level threshold, to command the first base station to stop using the first frequency band for providing downlink communications to UE devices.

Method Embodiment 19 The method of Method Embodiment 18, further comprising: operating (540) the first base station to receive a command to stop using the first frequency band for providing downlink communications to UE devices, said command being received from the system management device (e.g., a SAS); and operating (542) the first base station, in response to said command, to cease using the first frequency band for UE data downlink communications while continuing to allow UE devices to use said first frequency band for reporting of power measurements (and optionally emergency communications such as 911 uplink signals).

Method Embodiment 20 The method of Method Embodiment 19, further comprising operating (544) the first base station, in response to said command, to continue using the first frequency band for control signaling to UEs relating to power measurements but not to use the first frequency band for UE downlink data such as voice data.

Method Embodiment 21 The method of Method Embodiment 2, further comprising: operating (521) the first UE device to receive a signal (e.g., a command) indicating that the first UE device is to operate in said monitoring mode of operation (sensor mode) in which signal measurement are performed.

Method Embodiment 22 The method of Method Embodiment 21, wherein said signal indicating that the first UE device is to operate in said monitoring mode of operation includes information indicating a duration that the first UE device is to remain in the monitoring mode of operation.

Method Embodiment 23 The method of Method Embodiment 22, wherein said signal indicating that the first UE device is to operate in said monitoring mode of operation includes information indicates one of: i) a frequency that the first UE device is to perform measurements or ii) a frequency that the first UE device is to send measurement reports to the first base station.

Method Embodiment 24 The method of Method Embodiment 22, further comprising: operating (5216) the first UE device to transition into the monitoring mode of operation in response to said received signal indicating that the first UE device is to operate in said monitoring mode of operation.

Method Embodiment 25 The method of Method Embodiment 24, further comprising: operating (5222) the first UE device to measure received power in said first frequency band; operating (5230) the first UE device to generate a report to communicated first received power information; and operating (5232) the first UE device to send the generated report communicating first received power information to the first base station.

Method Embodiment 26 The method of Method Embodiment 25, wherein operating (5222) the first UE device to measure received power in said first frequency band includes: operating (5224) the first UE to measure a total received power in the first frequency band; operating (5226) the first UE to measure a received power attributed to one or more base stations (CBSDs); and operating (5228) the first UE to determine (e.g., calculate) a received power attributed to incumbent user in the first frequency band based on the measure a total received power in the first frequency band and the measure received power attributed to one or more base stations (CBSDs) in the first frequency band.

Method Embodiment 27 The method of Method Embodiment 25, wherein said first received power information in said generated report includes a first UE determined received power level attributed to incumbent user.

Numbered List of Exemplary System Embodiments:

System Embodiment 1 A communications system (300 or 901) comprising: a first base station (1000) (e.g., a first CBSD) that uses a first frequency band for communication (e.g., 3.5 GHz band used for CBSD communication), said first base station including: a first processor (1002); and a first wireless receiver (1028); and wherein said first processor (1002) is configured to: select (504), one or more user equipment (UE) devices (e.g., cell phones) to operate as power measurement devices, said one or more UE devices including a first UE device (e.g. a first cell phone); operate the first base station to receive (522), via the first wireless receiver, first received power measurement information from the UE device, said first received power measurement information being based on a total received power in the first frequency band measured by the first UE device; operate the first base station to communicate (524) (e.g., via a network interface) to a system management device (e.g., a SAS), received signal power information, said received signal power information being based on at least said first received power measurement information.

System Embodiment 2 The communications system (300 or 901) of System Embodiment 1, wherein said first processor (1002) is further configured to: operate the first base station to signal (518) to the first UE device that it is to operate in a monitoring mode of operation (sensor mode) in which signal measurements are performed.

System Embodiment 3 The communications system (300 or 901) of System Embodiment 2, said first processor (1002) is configured to: operate the first base station to signal (520) a frequency at which signal measurements are to be made by the first UE device, as part of being configured to operate the first base station to signal (518) to the first UE device that it is to operate in the monitoring mode of operation includes:

System Embodiment 4 The communications system (300 or 901) of System Embodiment 3, wherein said first processor (1002) is configured to: determine (516), at the first base station, (prior to signaling (520) the frequency at which signal measurements are to be made) the frequency at which signal measurements are to be made by the first UE based on whether the first base station (e.g., first CBSD) is in a first mode of operation (e.g., an active state) in which the first base station provides uplink and downlink services to UEs or in a second mode of operation (e.g., an inactive state) in which downlink service is not provided to UEs (the first base station (e.g., the first CBSD, has monitoring occur more frequently in some embodiments when it is in the inactive state with the hope that cell phones will rapidly detect that the first frequency band (a CBSD frequency band) has become available for use)

System Embodiment 5 The communications system (300 or 901) of System Embodiment 1, wherein said first processor (1002) is configured to: select (506) multiple UE devices to operate as received signal power monitoring devices, as part of being configured to select (504) one or more UE devices.

System Embodiment 6 The communications system (300 or 901) of System Embodiment 5, wherein said first processor (1002) is configured to: select (508) devices at different locations to operate as received signal power monitoring devices, as part of being configured to select (506) multiple UE devices.

System Embodiment 7 The communications system (300 or 901) of System Embodiment 6, wherein said selected one or more UE devices is a subset of UE devices attached to said first base station (wherein said one or more UE devices do not include at least some UE devices attached to said first base station and which are receiving service from the first base station).

System Embodiment 8 The communications system (300 or 901) of System Embodiment 7, wherein said first processor (1002) is configured to perform (510) said selecting (504) one or more UE devices as a function of: i) UE device location, ii) UE battery level information, and/or iii) UE operation state information (e.g., active or idle state information indicating what mode the UE is in).

System Embodiment 9 The communications system (300 or 901) of System Embodiment 8 wherein said selecting (510) includes providing (512) a preference in said selection for a UE device with more remaining battery power (a first remaining battery power level) than a UE device having less remaining battery power (e.g., a second remaining battery power level which is lower than said first battery power level).

System Embodiment 10 The communications system (300 or 901) of System Embodiment 8 wherein said selecting (510) includes providing (514) a preference in said selection for a UE device which is in an idle state (e.g., a device in which voice traffic is not supported) as compared to a UE device which is an active communications state (e.g., in which uplink voice traffic is supported).

A UE can report total received energy or total received energy less CBSD detected signal energy.

System Embodiment 11 The communications system (300 or 901) of System Embodiment 6, wherein the first received power measurement information includes signal energy information indicating a first total received signal energy in the first frequency band.

System Embodiment 12 The communications system (300 or 901) of System Embodiment 6, wherein the first received power measurement information includes signal energy information indicating a first total received signal energy in the first frequency band reduced by an amount of signal energy of CBSD signals (as determined from pilot signals measured by the first UE device (e.g., first cell phone), said pilot signals being received by the first UE device (e.g., first cell phone)).

System Embodiment 13 The communications system (300 or 901) of System Embodiment 5, wherein said first processor (1002) is configured to: operate the first base station to communicate (526) a received power generated by said first base station from received power information provided by two or more different UE devices, as part of being configured to operate the first base station to communicate (524) to the system management device (e.g., a SAS), received signal power information.

System Embodiment 14 The communications system (300 or 901) of System Embodiment 13, wherein said received signal power information includes an average received power generated by said first base station from multiple reported received powers.

System Embodiment 15 The communications system (300 or 901) of System Embodiment 14, wherein said average power excludes from consideration received signal power corresponding to CBSD signals detected as being received by the UE devices providing the UEs reporting received signal power information.

System Embodiment 16 The communications system (300 or 901) of System Embodiment 14, further comprising: a system management device (e.g., a SAS) (1200) including: a second processor (1202); and wherein said second processor (1202) is configured to: operate (530) the system management device (e.g., a SAS) to make a decision whether or not to shut down first base station downlink operation based on the received signal power information provided by the first base station.

System Embodiment 17 The communications system (300 or 901) of System Embodiment 16, wherein said second processor (1202) is configured to: operate (532) the system management device to compare a received signal power reported by the first base station to a signal power level threshold, as part of being configured to operate (530) the system management device (SAS) to make a decision whether or not to shut down first base station downlink operation based on the received signal power information provided by the first base station.

System Embodiment 18 The communications system (300 or 901) of System Embodiment 17, wherein said second processor (1202) is configured to: operate (536) the system management system, in response to determining that the received signal power reported by the first base station exceeds the signal power level threshold, to command the first base station to stop using the first frequency band for providing downlink communications to UE devices.

System Embodiment 19 The communications system (300 or 901) of System Embodiment 18, wherein said first processor (1002) is further configured to: operate (540) the first base station to receive (e.g., via a receiver in a network interface) a command to stop using the first frequency band for providing downlink communications to UE devices, said command being received from the system management device (e.g., a SAS); and operate (542) the first base station, in response to said command, to cease using the first frequency band for UE data downlink communications while continuing to allow UE devices to use said first frequency band for reporting of power measurements (and optionally emergency communications such as 911 uplink signals).

System Embodiment 20 The communications system (300 or 901) of System Embodiment 19, wherein said first processor (1002) is further configured to: operate (544) the first base station, in response to said command, to continue using the first frequency band for control signaling to UEs relating to power measurements but not to use the first frequency band for UE downlink data such as voice data.

System Embodiment 21 The communications system (300 or 901) of System Embodiment 2, further comprising:
a user equipment (UE) device (1100) including a third processor (1102); and a UE wireless receiver (1124); and wherein said third processor (1102) is configured to: operating (521) the first UE device to receive (e.g., via the UE wireless receiver) a signal (e.g., a command) indicating that the first UE device is to operate in said monitoring mode of operation (sensor mode) in which signal measurement are performed.

System Embodiment 22 The communications system (300 or 901) of System Embodiment 21, wherein said signal indicating that the first UE device is to operate in said monitoring mode of operation includes information indicating a duration that the first UE device is to remain in the monitoring mode of operation.

System Embodiment 23 The communications system (300 or 901) of System Embodiment 22, wherein said signal indicating that the first UE device is to operate in said monitoring mode of operation includes information indicates one of: i) a frequency that the first UE device is to perform measurements or ii) a frequency that the first UE device is to send measurement reports to the first base station.

System Embodiment 24 The communications system (300 or 901) of System Embodiment 22, wherein said third processor (1102) is further configured to: operate (5216) the first UE device (1100) to transition into the monitoring mode of operation in response to said received signal indicating that the first UE device is to operate in said monitoring mode of operation.

System Embodiment 25 The communications system (300 or 901) of System Embodiment 24, wherein said third processor (1102) is further configured to: operate (5222) the first UE device to measure received power in said first frequency band; operate (5230) the first UE device to generate a report to communicated first received power information; and operate (5232) the first UE device to send (e.g., via a UE wireless transmitter) the generated report communicating first received power information to the first base station.

System Embodiment 26 The communications system (300 or 901) of System Embodiment 25, wherein said third processor (1102) is configured to: operate (5224) the first UE to measure a total received power in the first frequency band; operate (5226) the first UE to measure a received power attributed to one or more base stations (CBSDs); and operate (5228) the first UE to determine (e.g., calculate) a received power attributed to incumbent user in the first frequency band based on the measure a total received power in the first frequency band and the measure received power attributed to one or more base stations (CBSDs) in the first frequency band, as part of being configured to operate (5222) the first UE device to measure received power in said first frequency band includes:

System Embodiment 27 The communications system (300 or 901) of System Embodiment 25, wherein said first received power information in said generated report includes a first UE determined received power level attributed to incumbent user.

Numbered List of Exemplary Non-Transitory Computer Readable Medium Embodiments:

Non-transitory Computer Readable Medium Embodiment 1: A non-transitory computer readable medium (1012) including a first set of computer executable instructions which when executed by a processor (1002) of a first base station (1000) (e.g., first Citizens Broadband Radio Service Device (CBSD)) cause the first base station to perform the steps of: selecting (504), at the first base station (e.g., a first CBSD) that uses a first frequency band for communication (e.g., 3.5 GHz band used for CBSD communication), one or more user equipment (UE) devices (e.g., cell phones) to operate as power measurement devices, said one or more UE devices including a first UE device (e.g. a first cell phone); receiving (522), at the first base station, first received power measurement information from the UE device, said first received power measurement information being based on a total received power in the first frequency band measured by the first UE device; and communicating (524) to a system management device (e.g., a SAS), received signal power information, said received signal power information being based on at least said first received power measurement information Non-transitory Computer Readable Medium Embodiment 2: A non-transitory computer readable medium (1210) including a first set of computer executable instructions which when executed by a processor (1202) of a system management device (1200) (e.g. a SAS) cause the system management device to perform the steps of: operating (530) the system management device (e.g., a SAS) to make a decision whether or not to shut down first base station downlink operation based on received signal power information provided by the first base station.

Non-transitory Computer Readable Medium Embodiment 3: A non-transitory computer readable medium (1112) including a first set of computer executable instructions which when executed by a processor (1102) of a user equipment (UE) device (1200) (e.g. a cell phone) cause the user equipment device to perform the steps of: operating (521) the UE device to receive a signal (e.g., a command) indicating that the UE device is to operate in a monitoring mode of operation (sensor mode) in which signal measurements (e.g., signal measurements used to detect incumbent user in a CBRS band) are performed.

The techniques of various embodiments may be implemented using software, hardware and/or a combination of software and hardware. Various embodiments are directed to apparatus, e.g., base stations such as CBSDs, user equipment devices such as cell phones, network management devices such as SAS, network nodes, and/or network equipment devices. Various embodiments are also directed to methods, e.g., method of controlling and/or operating base station, e.g., a CBSD, network nodes, a network management device, e.g., a SAS, nodes, servers, user equipment devices, e.g., cell phones, controllers, mobility management entities or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of the elements or steps are implemented using hardware circuitry.

In various embodiments devices, servers, nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as base stations, e.g., CBSDs, UEs, e.g., cell phones, network management devices, e.g., a SAS, etc., are configured to perform the steps of the methods described as being performed by the device, e.g., base station, e.g., CBSD, UE, e.g., cell phone, network management device, e.g., SAS, etc. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., base station, e.g. a CBSD, UE device, e.g., a cell phone, a network management device, e.g. a SAS device, etc., with a processor which includes a component corresponding to each of the steps of the various described methods performed by the device in which the processor is included. In some but not all embodiments a device, e.g., base station, e.g. a CBSD, UE device, e.g., a cell phone, a network management device, e.g. a SAS device, etc., includes a processor corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a node, a base station, e.g. a CBSD, a UE device, e.g., a cell phone, a network management device, e.g. a SAS device, etc. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a base station, e.g. a CBSD, a UE device, e.g., a cell phone, a network management device, e.g., a SAS, or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method, the method comprising:
selecting, at a first base station that uses a first frequency band for communication, one or more user equipment (UE) devices to operate as power measurement devices, said one or more UE devices including a first UE device, said step of selecting one or more UE devices including selecting multiple UE devices to operate as received signal power monitoring devices;
receiving, at the first base station, first received power measurement information from the first UE device, said first received power measurement information being based on a total received power in the first frequency band measured by the first UE device; and
communicating to a system management device received signal power information, said received signal power information being based on at least said first received power measurement information.

2. The method of claim 1, wherein selecting multiple UE devices includes selecting devices at different locations to operate as received signal power monitoring devices.

3. The method of claim 2, wherein the first received power measurement information includes signal energy information indicating a first total received signal energy in the first frequency band.

4. The method of claim 2, wherein the first received power measurement information includes signal energy information indicating a first total received signal energy in the first frequency band reduced by an amount of signal energy of Citizens Broadband Radio Service Device (CBSD) signals.

5. The method of claim 1, wherein communicating to the system management device received signal power information includes:
communicating a received power generated by said first base station from received power information provided by two or more different UE devices.

6. The method of claim 5, further comprising:
operating the system management device to make a decision whether or not to shut down first base station downlink operation based on the received signal power information provided by the first base station.

7. The method of claim 1, further comprising:
operating the first UE device to receive a signal indicating that the first UE device is to operate in a monitoring mode of operation in which signal measurements are performed.

8. The method of claim 7, wherein said signal indicating that the first UE device is to operate in said monitoring mode of operation includes information indicating a duration that the first UE device is to remain in the monitoring mode of operation.

9. The method of claim 8, wherein said signal indicating that the first UE device is to operate in said monitoring mode of operation includes information indicates one of: i) a frequency that the first UE device is to perform measurements or ii) a frequency that the first UE device is to send measurement reports to the first base station.

10. The method of claim 8, further comprising:
operating the first UE device to transition into the monitoring mode of operation in response to said received signal indicating that the first UE device is to operate in said monitoring mode of operation.

11. The method of claim 10, further comprising:
operating the first UE device to measure received power in said first frequency band;
operating the first UE device to generate a report to communicate first received power information; and
operating the first UE device to send the generated report communicating first received power information to the first base station.

12. A communications system comprising:
a first base station that uses a first frequency band for communication, said first base station including:
a first processor; and
a first wireless receiver; and
wherein said first processor is configured to:
select, one or more user equipment (UE) devices to operate as power measurement devices, said one or more UE devices including a first UE device;
operate the first base station to receive, via the first wireless receiver, first received power measurement information from the first UE device, said first received power measurement information being based on a total received power in the first frequency band measured by the first UE device; and
operate the first base station to communicate to a system management device, received signal power information, said received signal power information being based on at least said first received power measurement information.

13. The communications system of claim 12, wherein said first processor is configured to:
select multiple UE devices to operate as received signal power monitoring devices, as part of being configured to select one or more UE devices.

14. The communications system of claim 13, wherein said first processor is configured to: select devices at different locations to operate as received signal power monitoring devices, as part of being configured to select multiple UE devices.

15. The communications system of claim 14, wherein the first received power measurement information includes signal energy information indicating a first total received signal energy in the first frequency band.

16. The communications system of claim 14, wherein the first received power measurement information includes signal energy information indicating a first total received signal energy in the first frequency band reduced by an amount of signal energy of Citizens Broadband Radio Service Device (CBSD) signals.

17. The communications system of claim 13, wherein said first processor is configured to:
operate the first base station to communicate a received power generated by said first base station from received power information provided by two or more different UE devices, as part of being configured to operate the first base station to communicate to the system management device received signal power information.

18. The communications system of claim 17, further comprising:
said system management device including:
a second processor; and
wherein said second processor is configured to:
operate the system management device to make a decision whether or not to shut down first base station downlink operation based on the received signal power information provided by the first base station.

19. A non-transitory computer readable medium including a first set of computer executable instructions which when executed by a processor of a first base station cause the first base station to perform the steps of:
selecting, at the first base station that uses a first frequency band, one or more user equipment (UE) devices to operate as power measurement devices, said one or more UE devices including a first UE device;
receiving, at the first base station, first received power measurement information from the first UE device, said first received power measurement information being based on a total received power in the first frequency band measured by the first UE device; and
communicating to a system management device received signal power information, said received signal power information being based on at least said first received power measurement information.

* * * * *